United States Patent
Moritani et al.

(10) Patent No.: US 7,400,601 B2
(45) Date of Patent: Jul. 15, 2008

(54) MOBILE COMMUNICATION SYSTEM, MOBILE TERMINAL, AND MOBILE COMMUNICATION METHOD

(75) Inventors: Yuki Moritani, Yokohama (JP); Yukio Atsumi, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 789 days.

(21) Appl. No.: 10/810,079

(22) Filed: Mar. 26, 2004

(65) Prior Publication Data

US 2004/0213177 A1 Oct. 28, 2004

(30) Foreign Application Priority Data

Mar. 28, 2003 (JP) ............................. P2003-091324
Feb. 20, 2004 (JP) ............................. P2004-045347

(51) Int. Cl.
H04Q 7/00 (2006.01)
H04Q 7/24 (2006.01)
H04L 12/28 (2006.01)
H04L 12/56 (2006.01)

(52) U.S. Cl. ....................... 370/331; 370/338; 370/400; 370/401

(58) Field of Classification Search ................. 370/331, 370/338, 443, 401, 400
See application file for complete search history.

(56) References Cited

U.S. PATENT DOCUMENTS

| 2002/0191562 | A1* | 12/2002 | Kumaki et al. ............. 370/331 |
| 2003/0083087 | A1* | 5/2003 | Ekl et al. .................... 455/518 |
| 2003/0227907 | A1* | 12/2003 | Choi et al. .................. 370/352 |
| 2006/0268873 | A1* | 11/2006 | Tonjes et al. ............... 370/392 |
| 2007/0171865 | A1* | 7/2007 | Kato ........................... 370/329 |

FOREIGN PATENT DOCUMENTS

JP 2003-258826 A 9/2003

OTHER PUBLICATIONS

Christensen, M. et al., "Considerations for IGMP and MLD Snooping Switches", *Network Working Group*, Jan. 2003, 17 pages.
Wu, J. "An IP Mobility Support Architecture for the 4GW Wireless Infrastructure", *Proceedings of the 1999 Personal Computing and Communication Workshop*, 1999, 6 pages.

(Continued)

*Primary Examiner*—Melvin Marcelo
*Assistant Examiner*—Farah Faroul
(74) *Attorney, Agent, or Firm*—Brinks Hofer Gilson & Lione

(57) ABSTRACT

It is an object of the present invention to provide a mobile communication system capable of shortening a delay time preceding the reception of a multicast packet at a radio base station which has been reached by a movement of a mobile terminal. The mobile communication system includes a multicast router, a data layer link switch, a radio base station, and a mobile terminal. In cases where the mobile terminal detects switching of the radio base station but does not detect switching of the multicast router, a path establishing request, a withdrawal request, and another path establishing request are sequentially output. When the switching of the radio base station and the switching of the multicast router is detected, a path establishing request is transmitted to the new multicast router, and a withdrawal request is transmitted to the previous multicast router thereafter.

10 Claims, 48 Drawing Sheets

OTHER PUBLICATIONS

Moritani, Y. et al., "A Study of IP Multicast Reception Method on Mobile Networks", *Technical Report of IEICE (the Institute of Electronics, Information and Communication Engineers)*, No. NS2001-245, Mar. 2002, pp. 157-162.

Hashimoto, T. et al., "A Study on Multicast Communications over Mobile IP Network", *Information Processing Society of Japan, Report of Research on Mobile Computing and Wireless Communication*, No. 16-6, Feb. 14, 2001, pp. 39-46.

* cited by examiner

MOBILE COMMUNICATION SYSTEM, MOBILE TERMINAL, AND MOBILE COMMUNICATION METHOD

BACKGROUND OF THE INVENTION

1. Field of the Invention

The present invention relates to a mobile communication system, a mobile terminal, and a mobile communication method.

2. Related Background Art

In the present specification, the term "transmission" is defined as generating and transmitting a packet to an apparatus itself, and the term "distribution" is defined as transmitting (and copying, if necessary) a packet generated by an another apparatus to a slave apparatus.

In a network (IP network) utilizing an IP (Internet Protocol) in a broad sense such as ICMP (Internet Control Message Protocol) and IGMP (Internet Group Management Protocol), a transmitter can perform multicast communication (IP multicast) for transmitting data of files and moving pictures to a plurality of receivers. A procedure for managing a multicast group utilizing IGMP is defined in the IFTF (Internet Engineering Task Force) RFC (Request for Comments) 1112.

In such multicast communication, a receiver is connected through a multicast router to a transmitter which transmits multicast data. In this case, the receiver and the multicast router are connected on a wired or wireless connection. Further, the receiver transmits an IGMP-join packet (path establishing request) or IGMP-Report packet (path establishing request) (hereinafter simply referred to as "a join packet") to the multicast router. Upon receipt of the join packet (path establishing request), the multicast router recognizes that there is a need for distributing a multicast packet to the receiver and distributes a multicast packet supplied by the transmitter to the receiver.

The establishment of a multicast packet's distribution path in an IP network proceeds from a receiver to a transmitter. Specifically, when a receiver transmits a join packet (path establishing request), the multicast router that received the join packet (path establishing request) adds the multicast group that was requested by the join packet (path establishing request) to a distribution table of the router itself, and then transmits a multicast distribution path establishing request upstream towards a transmitter's end when viewed from the receiver. When an upstream multicast router receives the multicast distribution path establishing request, the router similarly updates its distribution table and transmits the multicast distribution path establishing request toward a further upstream multicast router.

When the multicast distribution path establishing a request reaches a multicast router that is connected to the transmitter, a multicast distribution path from the receiver to the transmitter is established. Let us assume that when a certain receiver transmits a join packet to a multicast group, another receiver has already received a multicast packet, and a multicast distribution path has thus already been established by a multicast router that is located on the multicast distribution path between the first receiver and the transmitter. Then, the multicast distribution path from the transmitter to the first receiver is established when the multicast distribution path establishing the request reaches that multicast router.

When a multicast distribution path is established, the transmitter transmits a multicast packet to the multicast router to which the transmitter itself is connected. In the case that the multicast router has a plurality of receivers in its coverage (located downstream of the same on an assumption that the transmitter is upstream of the same) and needs a plurality of multicast distribution paths to distribute the multicast packet to the plurality of receivers, the router makes a copy of the received multicast packet and distributes it to each of the multicast distribution paths.

In this manner, a multicast router that is in the position of having a plurality of multicast distribution paths to cover, i.e., a position where the multicast distribution path branches out, makes copies of a multicast packet and transmits the packet to multicast distribution paths that are in need of distribution. This eliminates any unnecessary increase in traffic on multicast distribution paths to allow the band of the network to be efficiently utilized.

IP multicast as described above is achieved when a multicast router capable of IP layer processes copies and distributes a packet. In the case of a data link layer switch used in a LAN (Local Area Network) for connecting multicast routers and receivers, since it does not normally performs IP layer process, a multicast packet distributed by a multicast router is distributed to all paths whether any receiver exists in the paths or not, which results in an inefficient use of the band.

As a method for distributing a multicast packet to paths in which receivers exist for preventing such inefficient use of a band, studies are being conducted on a method called IGMP snooping in which a data link layer switch records the ports where the join packets transmitted by the receivers have arrived to recognize paths in which receivers exist; and, when a multicast packet is distributed from a multicast router, the switch distributes the multicast packet only to the paths in which receivers exist. For example, such a method is disclosed in Considerations for IGMP and MLD snooping switches, IETF Internet-draft by Morten Jagd Christensen (Thrane & Thrane) et al. (Non-Patent Document 1).

The use of the method makes it possible to distribute a multicast packet only to paths in which receivers exist even in a LAN and to thereby utilize the band efficiently.

When a receiver is connected to a repeater such as a data link layer switch on a wired basis, the receiver cannot receive a multicast packet unless the multicast packet is distributed to the path to which the receiver is connected. Therefore, the repeater is required to make and distribute copies of the multicast packet in the quantity of multicast distribution paths that have receivers downstream. In cases where the repeater is a radio base station through which a plurality of receivers receive multicast packets, the plurality of receivers can simultaneously receive an electric wave signal of a multicast packet distributed from the radio base station. Therefore, the radio base station is not required to make copies of the multicast packet in the quantity of the receivers, and it can distribute the packet to the plurality of receivers using the same band as that used for distributing a packet to a single receiver.

When a receiver receiving multicast packets is connected to a data link layer switch through a radio base station, the receiver may move to another radio base station. When the receiver has moved between the radio base stations, the path connecting the previous radio base station to the data link layer switch is different from the path connecting the current radio base station to the data link layer switch. Therefore, in order to receive a multicast packet through the current radio base station, a new multicast distribution path to the current radio base station must be established at the data link layer switch. However, as described above, a multicast distribution path is established when a receiver transmits a join packet, and a data link layer switch recognizes the path in which the receiver exists from the port where the join packet (path establishing request) arrives. Normally, a receiver transmits a join packet only when it joins a multicast group and when it responds to an IGMP query packet (hereinafter simply referred to as "query packet") that it receives, an IGMP query being a request for a check of the presence of receivers which is issued by a multicast router to the receivers downstream to check whether there is another receiver belonging to an associated multicast group. Therefore, when a receiver has moved, the receiver cannot receive a multicast packet until a query packet is transmitted by a multicast router that is present upstream of the relevant data link layer switch, and the receiver transmits a join packet (path establishing request) in response to the query packet. Since a default value of the interval at which query packets are transmitted is 120 seconds, the receiver cannot receive a multicast packet for a period of about 60 seconds on average when there is no other receiver belonging to the same multicast group downstream of the radio base station into which the receiver has moved.

When there is no other receiver belonging to the same multicast group downstream of the radio base station that the receiver has left, the data link layer switch cannot recognize that the receiver does not exist any more on the paths to which the previous radio base station is connected until a query packet is transmitted by the multicast router, and no receiver responds by a join packet to the query packet through the path to which the previous radio base station is connected. Therefore, even after the receiver has moved out, multicast packets are distributed to the path to which the previous radio base station is connected in spite of the fact that there is no receiver to receive the multicast packets, the packets being also distributed on wireless basis. Thus, the band is similarly wastefully used for a period of about 60 seconds on average.

As a method for deleting a multicast distribution path quickly so as to prevent such wasteful use of a band, there is a method for IGMP in which a receiver transmits an IGMP leave packet (or a withdrawal request, which is hereinafter simply referred to as "leave packet") for requesting withdrawal from a multicast group to a multicast router. Upon receipt of a leave packet (withdrawal request), a multicast router transmits a query packet to check whether there is any receiver and, if there is no receiver, it performs a process for deleting multicast distribution paths. However, since a receiver must receive multicast packets until a point in time immediately before it moves, it is very difficult for the receiver to transmit a leave packet (withdrawal request) immediately before it moves.

In this manner and in order to solve the problem that multicast packets are not distributed to a receiver from a radio base station into the coverage where the receiver has moved and that distribution of multicast packets to the paths connected to the radio base station from which the receiver has left cannot be stopped, a method is being studied in which an MSA (Mobility Support Agent) is provided at each radio base station to establish and delete multicast distribution paths using the MSA. Specifically, before a receiver moves, it transmits packets requesting establishment of a multicast distribution path at the destination to an MSA present on a path to which the radio base station at the destination, a sufficient time being accommodated for the transmission. After the receiver moves, lit transmits a packet requesting deletion of a multicast distribution path at the previous location to an MSA present on a path to which the radio base station at the previous location is connected. Upon receipt of such packets, the MSA, as an agent of the receiver, transmits a join packet (path establishing request) or a leave packet (withdrawal request) to a multicast router. Thus, a multicast distribution path is established at the destination before the receiver moves, and a multicast distribution path is deleted at the previous location after the receiver moves. For example, such a method is disclosed in Non-Patent Document 2 listed later.

Another method has been conceived in which a join packet (path-establishing request) and a leave packet (withdrawal request) are directly transmitted to multicast routers at the destination of a movement and the point of departure without providing MSAs. According to this method, the strength of the connection of radio links is used to predict the destination, and a join packet (path-establishing request) is transmitted to a multicast router present on a path connected to the radio base station to which the movement is likely to occur. After the movement, a leave packet (withdrawal request) is transmitted to a multicast router present on a path connected to the radio base station at the previous location. Thus, multicast distribution paths are established and deleted without providing MSAs. For example, such a method is disclosed on Patent Document 1 and Non-Patent Document 3.

According to another method currently under study and unlike the methods disclosed in the two Non-Patent Documents in which a multicast distribution path is established before a receiver moves, a receiver that has moved detects the movement and transmits a join packet (path establishing request) to establish a multicast distribution path before a query packet is transmitted by a multicast router. According to this method, when a receiver receives an advertisement packet transmitted by a multicast router after it has moved and the multicast router which has provided the advertisement is different from multicast routers at the previous location of the receiver, the receiver detects that it has moved and transmits a join packet (path establishing request). Thus, the time required to receive a multicast packet after the movement is reduced. For example, such a method is disclosed in Non-Patent Document 4.

Patent Document 1: Japanese Laid-Open Patent Publication No. 2003-258826

Non-Patent Document 1: Considerations for IGMP and MLD snooping switches, IETF Internet-draft, draft-ietf-magma-snoop-05.txt, January 2003 by Morten Jagd Christensen (Thrane & Thrane) et al.

Non-Patent Document 2: AN IP Mobility Support Architecture for the 4GW Wireless Infrastructure, Proceedings of the 1999 Personal Computing and Communication Workshop (PCC '99) by Jiang Wu (Department of Teleinformatics, Royal Institute of Technology, Stockholm)

Non-Patent Document 3: Study on Method of IP Multicast Reception in Mobile Network, The Institute of Electronics, Information and Communication Engineers (IEICE), Technical Research Report No. NS2001-245, IN2001-201 by Yuki Moritani et al.

Non-Patent Document 4: Study on Multicast Communication on Mobile IP Network, Information Processing Society of Japan (IPSJ), Report of Research on Mobile Computing and Wireless Communication No. 16-6 by Takashi Hashimoto et al.

SUMMARY OF THE INVENTION

Referring to the technique disclosed in Non-Patent Document 2, in order to implement the method disclosed in Non-Patent Document 2 in an environment formed by data link layer switches connected downstream of multicast routers, radio base stations connected downstream of the data link layer switches, and receivers present downstream of the radio base stations, an MSA must be provided at each radio base station, and the address of the MSA at a destination of a movement must be known before the movement by predicting the destination.

According to the technique disclosed in Non-Patent Document 3, in an environment in which data link layer switches are connected downstream of multicast router and radio base stations are connected downstream of the data link layer switches, when a receiver is only connected to a different port of a data link layer switch after a movement of the receiver between radio base stations and no change occurs in the multicast routers connected upstream of the switch, a join packet (path establishing request) and a leave packet (withdrawal request) must be transmitted to respective ports of the data link layer switch. A problem arises in that the terminal cannot join and leave by specifying ports because addresses are not necessarily assigned to a data link layer switch and, even if addresses are assigned, each port is not assigned a different address.

According to the technique disclosed in Non-Patent Document 4, a movement of a receiver is detected using an address of a multicast router included in an advertisement packet. In an environment in which data link layer switches are connected downstream of multicast router and radio base stations are connected downstream of the data link layer switches, when a receiver is connected to a different radio base station after a movement between radio base stations and no change occurs in the multicast routers located upstream, a join packet (path establishing request) cannot be transmitted, and multicast packets cannot be received immediately after the movement from the radio base station at the destination. There is no mention to the deletion of a multicast distribution path at a radio base station from which a receiver leaves in the document.

As thus described, the methods in the related art have a problem in that, in an environment formed by data link layer switches connected downstream of multicast routers, radio base stations connected downstream of the data link layer switches, and receivers present downstream of the radio base stations, a receiver which has moved between radio base stations cannot receive a multicast packet until a query packet is transmitted by a multicast router after the movement unless the destination is predicted before the movement. There is another problem in that distribution of multicast packets from the previous radio base station cannot be stopped unless a special node apparatus, such as an MSA, is provided at each radio base station. Under such circumstances, there are demands for a method which solves the problems without predicting a destination of a movement or providing additional node apparatus.

It is an object of the invention to provide a mobile communication system, a mobile terminal, and a mobile communication method which allow a receiver to receive a multicast packet with a reduced delay time at the destination of a movement between radio base stations without predicting the destination and providing any special node apparatus at each radio base station in an environment formed by data link layer switches connected downstream of multicast routers, radio base stations connected downstream of the data link layer switches, and receivers present downstream of the radio base stations.

A mobile communication system according to the invention is a mobile communication system including: a multicast router, which receives an information signal addressed to a predetermined multicast group transmitted from a transmitter, and which can make a copy of the received information signal and distribute it to a network downstream when a mobile terminal belonging to the multicast group is present downstream of the router; a data link layer switch, which receives the information signal distributed by the multicast router and which can distribute a copy of the received information signal only to a multicast distribution path in which a mobile terminal belonging to the multicast group is present; a radio base station, which is connected to the data link layer switch and which can distribute the information signal distributed by the data link layer switch to a radio network downstream; and a mobile terminal, which receives the information signal distributed by the radio base station, characterized in that the mobile terminal includes:

(1) a station switching detection means which detects that the radio base station connected to the terminal itself has been switched;

(2) a router switching detection means which detects that the multicast router connected to the terminal itself has been switched;

(3) an establishment request transmission means which transmits a path-establishing request for requesting at least the data link layer switch to establish a multicast distribution path for distributing the information signal to the radio base station connected to the terminal itself;

(4) a withdrawal request transmission means which transmits a withdrawal request for requesting at least the multicast router to withdraw from the multicast group to which the terminal itself belongs; and (5) a transmission control means which transmits a first instruction signal for instructing the establishment request transmission means to transmit the path-establishing request and a second instruction signal for instructing the withdrawal request transmission means to transmit the withdrawal request in response to the detection by the station switching detection means, and in that:

(a) when the station switching detection means detects the switching of the radio base station but the router switching detection means does not detect the switching of the multicast router, the transmission control means sequentially outputs the first instruction signal, the second instruction signal, and the first instruction signal again; and (b) when the station switching detection means detects the switching of the radio base station, and the router switching detection means detects the switching of the multicast router, the transmission control means outputs the first instruction signal to transmit the path establishing request to the new multicast router and thereafter outputs the second instruction signal to transmit the withdrawal request to the previous multicast router.

In the mobile communication system according to the invention, when the radio base station has been switched but the multicast router has not been switched, the transmission control means sequentially outputs the first instruction signal, the second instruction signal, and the first instruction signal. Thus, the path establishing request, the withdrawal request, and the path establishing request are sequentially transmitted from the mobile terminal. Since the path establishing request is transmitted first, a delay time preceding the reception of an information signal after switching of the radio base station can be reduced. Since the path establishing request is transmitted again after the transmission of the withdrawal request, the data link layer switch can be notified of the party located downstream of the switch. Further, when both of the radio base station and the multicast router are switched, the transmission control means outputs the second instruction signal to transmit the withdrawal request to the previous multicast router, which makes it possible to provide the multicast router with information which gives an opportunity to confirm the presence of a mobile terminal as a receiver downstream of the same.

In the mobile communication system according to the invention, the multicast router preferably includes a check request transmission means which transmits a presence check request for checking whether there is a mobile terminal belonging to the downstream multicast group when the withdrawal request is received. Since a presence check request is transmitted in response to the transmission of a withdrawal request from the mobile terminal, a path in which no mobile terminal as receiver exists can be identified to prevent transmission of an information signal to the path.

In the mobile communication system according to the invention, the data link layer preferably includes: a path establishing means which establishes a multicast distribution path in a path according to the path establishing request when the path establishing request is received; and a distribution path reconfiguration means which distributes a presence check request to a downstream network when the presence check request is received and reconfigures the multicast distribution path according to a path establishing request returned in response to the distribution. Since a multicast distribution path is established according to a path establishing request transmitted by the mobile terminal, multicast distribution can be performed only to a path in which a mobile terminal as a receiver exists. Since a presence check request transmitted by the multicast router is distributed to the mobile terminal, and a multicast distribution path is reconfigured according to a path establishing request returned as a result, it is possible to avoid transmission of an information signal to a path in which no mobile terminal as a receiver exists.

A mobile terminal according to the invention is a mobile terminal belonging to a multicast group that receives an information signal transmitted on a multicast basis through a multicast router, a data link layer switch, and a radio base station, characterized in that it includes: a station switching detection means, which detects that the radio base station connected to the terminal itself has been switched; a router switching detection means, which detects that the multicast router connected to the terminal itself has been switched; an establishment request transmission means, which transmits a path establishing request for requesting at least the data link layer switch to establish a multicast distribution path for distributing an information signal to the radio base station connected to the terminal itself; a withdrawal request transmission means, which transmits a withdrawal request for requesting at least the multicast router to withdraw from the multicast group to which the terminal belongs; and a transmission control means, which transmits a first instruction signal for instructing the establishment request transmission means to transmit the path establishing request and a second instruction signal for instructing the withdrawal request transmission means to transmit the withdrawal request, in response to the detection by the station switching detection means, and in that: when the station switching detection means detects the switching of the radio base station but the router switching detection means does not detect the switching of the multicast router, the transmission control means sequentially outputs the first instruction signal, the second instruction signal, and the first instruction signal again; and when the station switching detection means detects the switching of the radio base station and the router switching detection means detects the switching of the multicast router, the transmission control means outputs the first instruction signal to transmit the path establishing request to the new multicast router and thereafter outputs the second instruction signal to transmit the withdrawal request to the previous multicast router.

With the mobile terminal according to the invention, when the radio base station has been switched but the multicast router has not been switched, the transmission control means sequentially outputs the first instruction signal, the second instruction signal, and the first instruction signal. Thus, the path establishing request, the withdrawal request, and the path establishing request are sequentially transmitted from the mobile terminal. Since the path establishing request is transmitted first, a delay time preceding the reception of an information signal after switching of the radio base station can be reduced. Since the path establishing request is transmitted again after the transmission of the withdrawal request, the data link layer switch can be notified of the party located, the location of which is under the switch. Further, when both of the radio base station and the multicast router are switched, the transmission control means outputs the second instruction signal to transmit the withdrawal request to the previous multicast router, making it possible to provide the multicast router with information that provides an opportunity to confirm the presence of a mobile terminal as a receiver downstream of the same.

A mobile communication method according to the invention is a method for a mobile terminal belonging to a multicast group for receiving an information signal transmitted on a multicast basis through a multicast router, a data link layer switch, and a radio base station, characterized in that it includes: a station switching detection step at which the station switching detection means of the mobile terminal detects that the radio base station connected to the terminal itself has been switched; a router switching detection step at which the router switching detection means of the mobile terminal detects that the multicast router connected to the terminal itself has been switched; a first updating step at which, when the station switching detection means detects the switching of the radio base station but the router switching detection means does not detect the switching of the multicast router, establishment of a request transmission means of the mobile terminal transmits a path establishing request for requesting the data link layer switch to establish a path for distributing an information signal to the radio base station connected to the mobile terminal itself, at which a withdrawal request transmission means of the mobile terminal successively transmits a withdrawal request for requesting the multicast router to withdraw from the multicast group to which the mobile terminal itself belongs, and at which the establishment request transmission means transmits the path establishing request; and a second updating step at which, when the station switching detection means detects the switching of the radio base station and the router switching detection means detects the switching of the multicast router, the establishment request means transmits the path establishing request to the new multicast router, and the withdrawal request transmission means transmits the withdrawal request to the previous multicast router.

In the mobile communication method according to the invention, when the radio base station has been switched but the multicast router has not been switched, the mobile terminal sequentially outputs the path establishing request, the withdrawal request, and the path establishing request in order. Since the path establishing request is transmitted first, the delay time preceding the reception of an information signal after the switching of the radio base station can be reduced. Since the path establishing request is transmitted again after the transmission of the withdrawal request, the data link layer switch can be notified of the party located downstream of the switch. Further, when both of the radio base station and the multicast router are switched, the withdrawal request is transmitted to the previous multicast router, which makes it possible to provide the multicast router with information which gives an opportunity to confirm the presence of a mobile terminal as a receiver downstream of the same.

Preferably, the mobile communication system according to the invention includes a substitute server which is connected at least downstream of a multicast router and which receives a withdrawal request from the mobile terminal and transmits the withdrawal request to the multicast router, and the withdrawal request transmission means transmits a withdrawal request to the substitute server. When the multicast router connected to the mobile terminal has been switched, the substitute server transmits a withdrawal request to the multicast router on behalf of the mobile terminal. Since the request for withdrawal thus reaches the multicast router from the downstream side of the multicast packet distribution, it is possible to faithfully obey the general rule of multicast communication. Thus, high conformity with other protocols associated with multicast communication can be achieved.

The mobile communication system according to the invention preferably includes a plurality of the data link layer switches connected in the form of a tree under the data link layer switches. Each of the data link layer switches receives a path establishing request and a presence check request to independently manage multicast distribution by itself, which makes it possible to distribute multicast packets only to a path in which a receiver exists.

A mobile communication system according to the invention is a mobile communication system characterized in that it includes: a multicast router which receives an information signal addressed to a predetermined multicast group transmitted from a transmitter which can make a copy of the received information signal and distribute it to a downstream network when a mobile terminal belonging to the multicast group is present downstream of the router; a data link layer switch which receives the information signal distributed by the multicast router and which can distribute a copy of the received information signal only to a multicast distribution path in which a mobile terminal belonging to the multicast group is present; a radio base station which is connected to the data link layer switch and which can distribute the information signal distributed by the data link layer switch to a radio network downstream thereof; and a mobile terminal which receives the information signal distributed by the radio base station, in that the mobile terminal includes:

(11) a station switching detection means which detects that the radio base station connected to the terminal itself has been switched;

(12) a router switching detection means which detects that the multicast router connected to the terminal itself has been switched;

(13) an establishment request transmission means which transmits a path establishing request for requesting at least the data link layer switch to establish a multicast distribution path for distributing the information signal to the radio base station connected to the terminal itself;

(14) a withdrawal request transmission means which transmits a withdrawal request for requesting at least the multicast router to withdraw from the multicast group to which the terminal itself; and

(15) transmission control means which transmits a first instruction signal for instructing the establishment request transmission means to transmit the path establishing request and a second instruction signal for instructing the withdrawal request transmission means to transmit the withdrawal request, in response to the detection by the station switching detection means and the router switching detection means, and in that:

(e) when the station switching detection means detects the switching of the radio base station but the router switching detection means does not detect the switching of the multicast router, the transmission control means sequentially outputs the first instruction signal, the second instruction signal, and the first instruction signal again; and (f) when the station switching detection means detects the switching of the radio base station and the router switching detection means detects the switching of the multicast router, the transmission control means outputs the first instruction signal to transmit the path establishing request to the new multicast router and thereafter sequentially outputs the second instruction signal and the first instruction signal to transmit the withdrawal request and the path establishing request to the previous multicast router.

In the mobile communication system according to the invention, when the radio base station has been switched but the multicast router has not been switched, the transmission control means sequentially outputs the first instruction signal, the second instruction signal, and the first instruction signal. Thus, the path establishing request, the withdrawal request, and the path establishing request are sequentially transmitted from the mobile terminal. Since the path establishing request is transmitted first, a delay time preceding the reception of an information signal after switching of the radio base station can be reduced. Since the path establishing request is transmitted again after the transmission of the withdrawal request, the data link layer switch can be notified of the party located downstream of the switch. Further, when both the radio base station and the multicast router are switched, the transmission control means outputs the first instruction signal to transmit the path establishing request to the new multicast router and thereafter outputs the second instruction signal and the first instruction signal to transmit the withdrawal request and the path establishing request, respectively, to the previous multicast router. This makes it possible to provide the multicast routers with information that gives an opportunity to confirm the presence of a mobile terminal as a receiver downstream of the same. When there is no other receiver downstream of the previous multicast router, the multicast distribution path at the data link layer switch is deleted. This makes it possible to reduce a delay time before the distribution of multicast packets through radio base stations having no receiver is stopped and to thereby prevent wasteful use of the band. In addition, since a multicast distribution path at the previous multicast router is maintained, a delay time preceding the start of reception of multicast packets can be reduced when the receiver is switched back to the previous radio base station.

In the mobile communication system according to the invention, the mobile terminal preferably includes:

(16) a connection strength determination means which determines whether the strength of connection with the radio base station connected to the terminal itself is equal to or higher than a predetermined threshold;

(17) a router detection means which detects the presence of the multicast router connected to another radio base station adjacent to the radio base station; and

(18) a recording means which records information identifying the multicast router which has established a multicast distribution path with the establishment request transmission means, and it is preferable that:

(c) in cases where the connection strength determination means determines that the strength of connection with the connected radio base station is lower than the predetermined threshold when the router detection means detects the presence of a multicast router which is not recorded in the recording means, the transmission control means outputs the first instruction signal to the detected multicast router and records information identifying the detected multicast router in the recording means; and (d) in cases where the connection strength determination means determines that the strength of connection with the connected radio base station has become equal to, or higher than, the threshold again after the recording, the transmission control means preferably outputs the second instruction signal to all multicast routers excluding the connected multicast router and deletes information identifying the multicast routers to which the second instruction signal has been output from the recording means.

When the strength of connection with the radio base station connected to the mobile terminal is lower than the predetermined threshold and switching of radio base stations is likely to occur, the transmission control means transmits the first instruction signal to a multicast router to which the mobile terminal is likely to be switched. This makes it possible to reduce a delay time preceding the start of reception of multicast packets when switching of the radio base stations occurs. When the strength of connection with the radio base station connected to the mobile terminal becomes equal to or higher than the predetermined threshold and switching of radio base stations is unlikely to occur, multicast routers which have established a multicast distribution path are provided with information that gives an opportunity to confirm the presence of a mobile terminal as a receiver downstream thereof, and a multicast distribution path is deleted where no receiver exists. Thus, wasteful use of the band can be prevented.

Preferably, the mobile communication system according to the invention includes a substitute server which is connected at least downstream of a multicast router and which receives a path establishing request and a withdrawal request from the mobile terminal and transmits the path establishing request and the withdrawal request to the multicast router, and the path establishing request transmission means and the withdrawal request transmission means transmit a path establishing request and a withdrawal request to the substitute server. Even when the mobile terminal does not exist downstream of the multicast router, the substitute server transmits a path establishing request and a withdrawal request to the multicast router on behalf of the mobile terminal. Since each of the requests thus reaches the multicast router from the downstream side of the multicast packet distribution, it is possible to faithfully obey the general rule of multicast communication. Thus, high conformity with other protocols associated with multicast communication can be achieved.

The mobile communication system according to the invention preferably includes a plurality of the data link layer switches connected in the form of a tree under the data link layer switch. Each of the data link layer switches receives a path establishing request and a presence check request to independently manage multicast distribution by itself, which makes it possible to distribute multicast packets only to a path in which a receiver exists.

A mobile terminal according to the invention is a mobile terminal belonging to a multicast group and receiving an information signal transmitted on a multicast basis through a multicast router, a data link layer switch, and a radio base station, characterized in that it includes: a station switching detection means which detects that the radio base station connected to the terminal itself has been switched; a router switching detection means which detects that the multicast router connected to the terminal itself has been switched; an establishment request transmission means which transmits a path establishing request for requesting at least the data link layer switch to establish a multicast distribution path for distributing an information signal to the radio base station connected to the terminal itself; a withdrawal request transmission means which transmits a withdrawal request for requesting at least the multicast router to withdraw from the multicast group to which the terminal belongs; and a transmission control means which transmits a first instruction signal for instructing the establishment request transmission means to transmit the path establishing request and a second instruction signal for instructing the withdrawal request transmission means to transmit the withdrawal request, in response to the detection by the station switching detection means and the router switching detection means, and in that: when the station switching detection means detects the switching of the radio base station but the router switching detection means does not detect the switching of the multicast router, the transmission control means sequentially outputs the first instruction signal, the second instruction signal, and the first instruction signal again; and when the station switching detection means detects the switching of the radio base station and the router switching detection means detects the switching of the multicast router, the transmission control means outputs the first instruction signal to transmit the path establishing request to the new multicast router and thereafter sequentially outputs the second instruction signal and the first instruction signal to transmit the withdrawal request and the path establishing request to the previous multicast router.

With the mobile terminal according to the invention, when the radio base station has been switched but the multicast router has not been switched, the transmission control means sequentially outputs the first instruction signal, the second instruction signal, and the first instruction signal. Thus, the path establishing request, the withdrawal request, and the path establishing request are sequentially transmitted from the mobile terminal. Since the path establishing request is transmitted first, a delay time preceding the reception of an information signal after switching of the radio base station can be reduced. Since the path establishing request is transmitted again after the transmission of the withdrawal request, the data link layer switch can be notified of the party located downstream of the switch. Further, when both the radio base station and the multicast router are switched, the transmission control means outputs the first instruction signal to transmit the path establishing request to the new multicast router and thereafter outputs the second instruction signal and the first instruction signal to transmit the withdrawal request and the path establishing request, respectively, to the previous multicast router. This makes it possible to provide the multicast routers with information which gives an opportunity to confirm the presence of a mobile terminal as a receiver downstream of the same. When there is no other receiver downstream of the previous multicast router, the multicast distribution path at the data link layer switch is deleted. This makes it possible to reduce the delay time before the distribution of multicast packets through radio base stations having no receiver is stopped, thereby preventing wasteful use of the band. In addition, since a multicast distribution path at the previous multicast router is maintained, a delay time preceding the start of reception of multicast packets can be reduced when the receiver is switched back to the previous radio base station.

The mobile terminal according to the invention preferably includes: a connection strength determination means which determines whether the strength of connection with the radio base station connected to the terminal itself is equal to or higher than a predetermined threshold; a router detection means which detects the presence of the multicast router connected to another radio base station adjacent to the radio base station; and a recording means which records information identifying the multicast router which has established a multicast distribution path with the establishment request transmission means, and it is preferable that: in cases where the connection strength determination means determines that the strength of connection with the connected radio base station is lower than the predetermined threshold when the router detection means detects the presence of a multicast router which is not recorded in the recording means, the transmission control means outputs the first instruction signal to the detected multicast router and records information identifying the detected multicast router in the recording means; and in cases where the connection strength determination means determines that the strength of connection with the connected radio base station has become equal to or higher than the threshold again after the recording, the transmission control means outputs the second instruction signal to all multicast routers excluding the connected multicast router and deletes information identifying the multicast routers to which the second instruction signal has been output from the recording means.

When the strength of connection with the radio base station connected to the mobile terminal is lower than the predetermined threshold and switching of radio base stations is likely to occur, the transmission control means transmits the first instruction signal to a multicast router to which the mobile terminal is likely to be switched. This makes it possible to reduce the delay time preceding the start of reception of multicast packets when switching of the radio base stations occurs. When the strength of connection with the radio base station connected to the mobile terminal becomes equal to or higher than the predetermined threshold and switching of radio base stations is unlikely to occur, multicast routers which have established a multicast distribution path are provided with information that gives an opportunity to confirm the presence of a mobile terminal as a receiver downstream thereof, and a multicast distribution path is deleted where no receiver exists. Thus, wasteful use of the band can be prevented.

A mobile communication method according to the invention is a mobile communication method for a mobile terminal belonging to a multicast group to receive an information signal transmitted on a multicast basis through a multicast router, a data link layer switch, and a radio base station, characterized in that it includes: a station switching detection step at which station switching detection means of the mobile terminal detects that the radio base station connected to the terminal itself has been switched; a router switching detection step at which router switching detection means of the mobile terminal detects that the multicast router connected to the terminal itself has been switched; a third updating step at which, when the station switching detection means detects the switching of the radio base station but the router switching detection means does not detect the switching of the multicast router, the establishment request transmission means of the mobile terminal transmits a path establishing a request for requesting the data link layer switch to establish a path for distributing an information signal to the radio base station connected to the mobile terminal itself, at which the withdrawal request transmission means of the mobile terminal successively transmits a withdrawal request for requesting the multicast router to withdraw from the multicast group to which the mobile terminal itself belongs, and at which the establishment request transmission means transmits the path establishing request; and a fourth updating step at which, when the station switching detection means detects the switching of the radio base station and the router switching detection means detects the switching of the multicast router, the establishment request means transmits the path establishing request to the new multicast router, at which the withdrawal request transmission means successively transmits the withdrawal request to the previous multicast router, and at which the establishment request transmission means further transmits the path establishing request to the previous multicast router thereafter.

According to the mobile communication method according to the invention, when the radio base station has been switched but the multicast router has not been switched, the transmission control means sequentially outputs the first instruction signal, the second instruction signal, and the first instruction signal. Thus, the path establishing request, the withdrawal request, and the path establishing request are sequentially transmitted from the mobile terminal. Since the path establishing request is transmitted first, a delay time preceding the reception of an information signal after the switching of the radio base station can be reduced. Since the path establishing request is transmitted again after the transmission of the withdrawal request, the data link layer switch can be notified of the party located downstream of the switch. Further, when both of the radio base station and the multicast router are switched, the transmission control means outputs the first instruction signal to transmit the path establishing request to the new multicast router and thereafter outputs the second instruction signal and the first instruction signal to transmit the withdrawal request and the path establishing request, respectively, to the previous multicast router. This makes it possible to provide the multicast routers with information which gives an opportunity to confirm the presence of a mobile terminal as a receiver downstream of the same. When there is no other receiver downstream of the previous multicast router, the multicast distribution path at the data link layer switch is deleted. This makes it possible to reduce a delay time before distribution of multicast packets through radio base stations having no receiver is stopped, thereby preventing wasteful use of the band. In addition, since a multicast distribution path at the previous multicast router is maintained, a delay time preceding the start of reception of multicast packets can be reduced when the receiver is switched back to the previous radio base station.

The mobile communication method according to the invention preferably includes: a connection strength determination step at which the connection strength determination means of the mobile terminal determines whether the strength of the connection with the radio base station connected to the terminal itself is equal to, or higher than, a predetermined threshold; a router detection step at which a router detection means of the mobile terminal detects the presence of multicast routers connected to the radio base station and a radio base station adjacent to the radio base station; a recording step at which the recording means of the mobile terminal records information identifying the multicast router which has established a multicast distribution path with the establishment request transmission means; a fifth updating step at which, in cases where the connection strength determination step determines that the strength of connection with the connected radio base station is lower than the predetermined threshold when the router detection step detects the presence of a multicast router which is not recorded in the recording means, the transmission control means outputs the first instruction signal to the detected multicast router and records information identifying the detected multicast router in the recording means; and a sixth updating step at which, in cases where the connection strength determination step determines that the strength of connection with the connected radio base station has become equal to or higher than the threshold again after the recording, the transmission control means outputs the second instruction signal to all multicast routers excluding the connected multicast router and deletes information identifying the multicast routers to which the second instruction signal has been output from the recording means. When the strength of connection with the radio base station connected to the mobile terminal is lower than the predetermined threshold and the switching of radio base stations is likely to occur, the transmission control means transmits the first instruction signal to a multicast router to which the mobile terminal is likely to be switched. This makes it possible to reduce a delay time preceding the start of reception of multicast packets when switching of the radio base stations occurs. When the strength of the connection with the radio base station connected to the mobile terminal becomes equal to or higher than the predetermined threshold and the switching of the radio base stations is unlikely to occur, multicast routers, excluding the connected multicast router, which have established a multicast distribution path are provided with information that gives an opportunity to confirm the presence of a mobile terminal as a downstream receiver, and a multicast distribution path is deleted where no receiver exists. Thus, wasteful use of the band can be prevented.

The invention has made it possible to provide a mobile communication system, a mobile terminal, and a mobile communication method which allow a receiver to receive a multicast packet with a reduced delay time at the destination of a movement between the radio base stations without predicting the destination and providing any special node apparatus at each radio base station, in an environment formed by data link layer switches connected downstream of multicast routers, radio base stations connected downstream of the data link layer switches, and receivers present downstream of the radio base stations.

BRIEF DESCRIPTION OF THE DRAWINGS

The present invention may be more readily described with reference to the accompanying drawings, in which.

DESCRIPTION OF THE PREFERRED EMBODIMENTS

Figure 1:
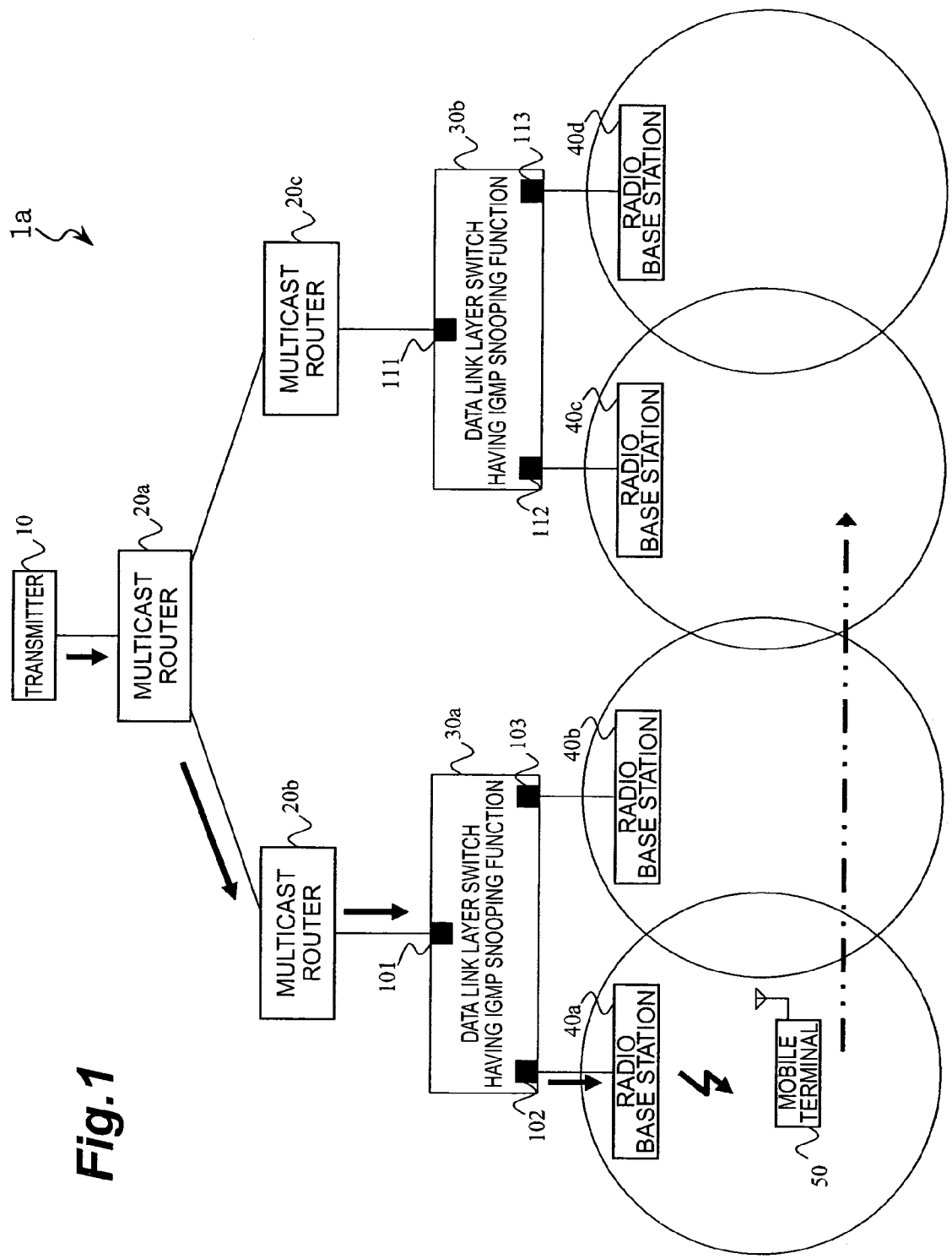
FIG. 1 is a view showing a configuration of a mobile communication system according to a first embodiment of the invention.

The invention will be easily understood by studying the following detailed description with reference to the accompanying drawings which are shown only by way of example. Preferred embodiments will now be described with reference to the accompanying drawings. The same parts will be indicated by the same reference numerals to avoid duplication of the description.

First Embodiment

FIG. 1 is a conceptual view of a mobile communication system 1a according to a first embodiment of the invention. The mobile communication system 1a includes a transmitter 10 which transmits multicast packets using multicast communication, multicast routers 20a, 20b, and 20c which copy and distribute multicast packets from the transmitter 10, data link layer switches 30a and 30b having an IMGP snooping function for making a copy of a packet distributed from a multicast router and distributing it only to a port which has a receiver downstream thereof, and radio base stations 40a, 40b, 40c, and 40d which transmit a packet distributed from a data link layer switch to a radio network downstream thereof.

The multicast router 20a is connected to the transmitter 10. The multicast routers 20b and 20c are connected to the multicast router 20a downstream thereof, and the multicast routers are provided in the form of a tree. While the present embodiment shows an example in which multicast routers are connected in the form of a tree for simplicity, a greater number of multicast routers may be used to form a complicated network having a structure other than the tree structure. The data link layer switches 30a and 30b are connected to LANs which are managed by the multicast routers 20b and 20c, respectively. The radio base stations 40a and 40b are connected to the data link layer switch 30a downstream thereof, and the radio base stations 40c and 40d are connected to the data link layer switch 30b downstream thereof. The circles drawn around the radio base stations indicate areas in which the radio base stations are available for communication, and a mobile terminal 50 is initially connected to the radio base station 40a to receive multicast packets.

For example, the transmitter 10 is an information processing terminal such as a personal computer or workstation. For example, the transmitter 10 transmits file data such as programs and dynamic images and moving pictures acquired real-time to the multicast router 20a as multicast packets.

The multicast router 20a makes a required number of copies of a received multicast packet and distributes the copied multicast packets to the multicast routers 20b and 20c downstream thereof. The multicast routers 20b and 20c distribute the received multicast packets to the data link layer switches downstream thereof if necessary. The data link layer switches make a required number of copies of the received multicast packets and distribute them to the radio base stations downstream thereof. The radio base stations distribute the received multicast packets to the radio networks downstream thereof. At this time, since the downstream of the radio base stations is a radio zone, even when there is a plurality of multicast receivers downstream of the radio base stations, the radio base stations can distribute a multicast packet to the multicast receivers by performing radio transmission only once.

Figure 16:
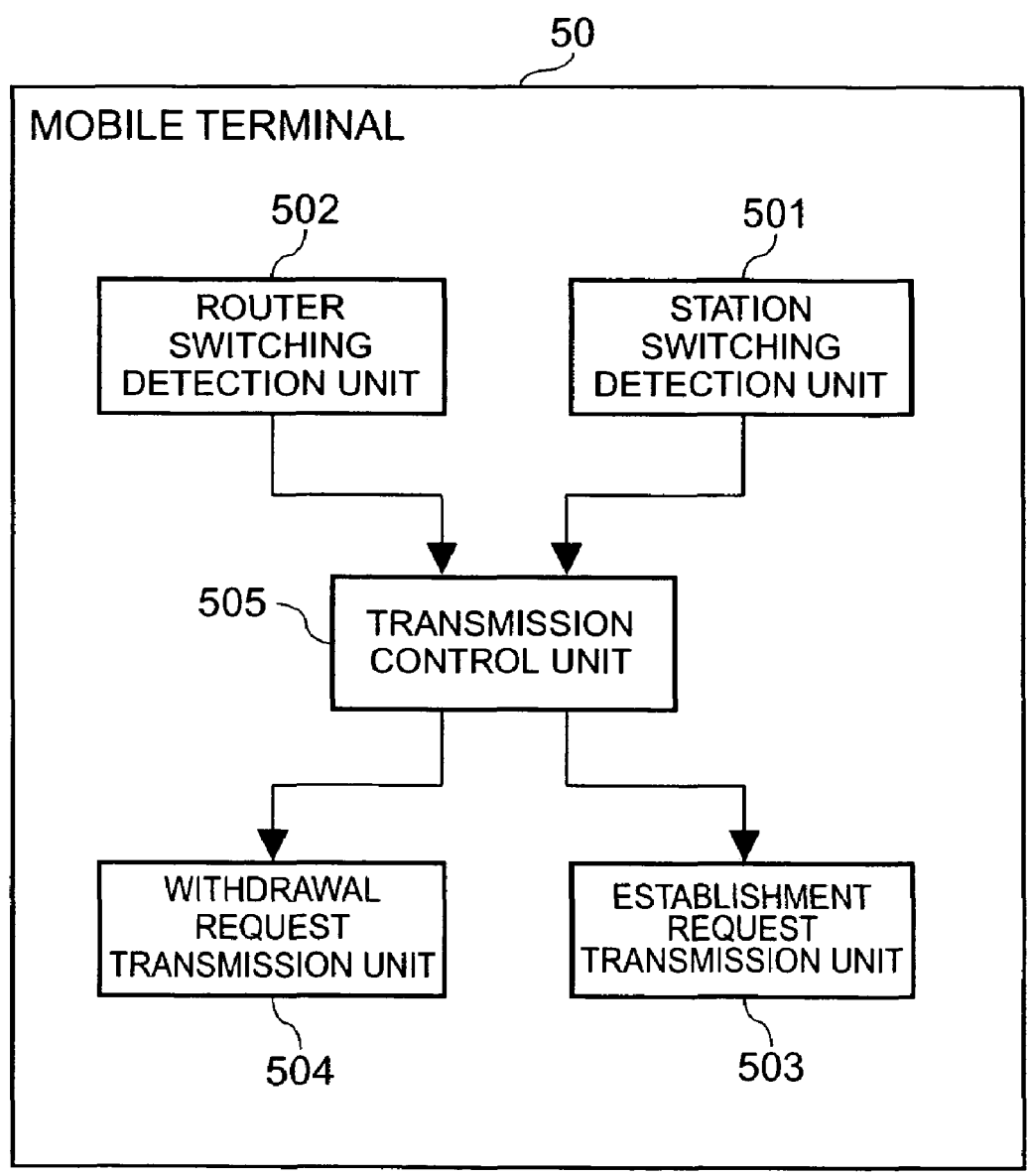
FIG. 16 is a view showing a configuration of a mobile terminal according to the first embodiment of the invention.

The mobile terminal 50 is a multicast receiver. As shown in FIG. 16, the mobile terminal 50 includes, as its functional elements, a station switching detection unit 501 (a station switching detection means), a router switching detection unit 502 (a router switching detection means), an establishment request transmission unit 503 (an establishment request transmission means), a withdrawal request transmission unit 504 (a withdrawal request transmission means), and a transmission control unit 505 (a transmission control means). The station switching detection unit 501 is a section which detects that the radio base station connected to the mobile terminal 50 has been switched to another. The router switching detection unit 502 is a section which detects that the multicast router connected to the mobile terminal 50 has been switched to another. The establishment request transmission unit 503 is a section which transmits a path establishing request for requesting at least the data link layer switches 30a and 30b to establish a path for distributing an information signal to the radio base station to which the mobile terminal 50 is connected. The withdrawal request transmission unit 504 is a section which transmits a withdrawal request for requesting at least the multicast router connected thereto to withdraw from the multicast group to which the mobile terminal 50 belongs. The transmission control unit 505 is a section which outputs a first instruction signal instructing the establishment request transmission unit 503 to transmit a path establishing request and a second instruction signal instructing the withdrawal request transmission unit 504 to transmit a withdrawal request depending on the detection by the station switching detection unit 501. Details of each of the units will be described later.

The establishment request transmission unit 503 of the mobile terminal 50 transmits a request for establishment of a multicast distribution path (a path establishing request) to the multicast router 20b present upstream of itself through the radio base station 40a to which it is connected such that multicast packets addressed to a desired multicast group can be received. The withdrawal request transmission unit 504 of the mobile terminal 50 transmits a request for withdrawal from a multicast group through the radio base station 40a to which it is similarly connected when there is no need for receiving multicast packets.

The multicast routers 20a to 20c have a check request transmission unit (a check request transmission means which is not shown) which transmits a presence check request for checking whether there is any mobile terminal belonging to a multicast group downstream thereof when it receives a withdrawal request transmitted by the mobile terminal 50 (a detailed description will be given later).

The data link layer switches 30a and 30b have a path establishing unit (a path establishing means which is not shown) for establishing a multicast distribution path in accordance with a path establishing request received from the mobile terminal 50 and a distribution path reconfiguring unit (a distribution path reconfiguring means) for distributing the presence check requests received from the multicast routers 20a to 20c to networks downstream thereof and for reconfiguring multicast distribution paths in accordance with a path establishing request returned in response to the distribution, the details of which will be described later.

Operations of the mobile communication system 1a and a mobile communication method carried out using the mobile communication system 1a will now be described with reference to an example in which the mobile terminal 50 receives multicast packets addressed to a predetermined multicast group in the mobile communication system 1a as thus described. For example, the address of the multicast group (let us call it multicast group G) is specified as "239. 1. 2. 3".

Referring to FIG. 1, a multicast distribution path to the mobile terminal 50 has already been established, and the establishment of the distribution path will be first described. In order to receive multicast packets addressed to the multicast group G, the establishment request transmission unit 503 of the mobile terminal 50 transmits a path establishing request for a multicast distribution path such that it reaches the multicast router connected to upstream of itself. The path establishing request addressed to multicast group G also plays the roles of a multicast packet distribution request addressed to the multicast group G and a request for entry into the multicast group G.

The path establishing request for a multicast distribution path transmitted by the mobile terminal 50 reaches a port 102 of the data link layer switch 30a through the radio base station 40a. At this time, the path establishing unit (not shown) of the data link layer switch 30a recognizes that a receiver of the multicast group exists downstream of the port 102 from the contents of the path establishing request for a multicast distribution path, records the fact that there is a need for distributing a multicast packet addressed to the multicast group in a multicast distribution management table, and transfers the path establishing request for a multicast distribution path which has thus arrived to the multicast router 20b through a port 101. When the multicast router 20b receives the path establishing request for a multicast distribution path, the multicast router 20b adds a description that it will distribute the requested multicast group in its own multicast distribution path management table and transmits the path establishing request for a multicast distribution path to the multicast router 20a upstream thereof. When the path establishing request for a multicast distribution path reaches the multicast router 20a to which the transmitter 10 is connected and the multicast router 20a adds the description that it will distribute the requested multicast group in is own multicast distribution path management table, a multicast distribution path from the transmitter 10 to the receiver 50 is established. Let us assume a situation unlike that shown in FIG. 1, in which a receiver of the same multicast group G other than the mobile terminal 50 exists downstream of another multicast router and a multicast distribution path has already been established up to the receiver unlike. Then, the above-described multicast distribution path is established when the path establishing request reaches the router to which a distribution path has already been established.

When the multicast distribution path from the transmitter 10 to the mobile terminal 50 is established, a multicast packet transmitted by the transmitter 10 reaches the mobile terminal 50 through the multicast routers 20a and 20b, the data link layer switch 30a, and the radio base station 40a. Since the multicast router 20a and the data link layer switch 30a do not distribute the multicast packet to paths in which the multicast distribution path does not exist, the multicast packet can be delivered to only to the receiver which is in need for the multicast packet without wasteful use of the band.

The withdrawal request transmission unit 504 of the mobile terminal 50 transmits a request for withdrawal from the multicast group such that it reaches the multicast router 20b that is similarly connected. The data link layer switch 30a does not delete any multicast distribution path when it only receives the request for withdrawal from the multicast group and transfers the request to the multicast router 20b. Upon receipt of the request for withdrawal from the multicast group, the check request transmission unit (not shown) of the multicast router 20b transmits a multicast receiver presence check request (presence check request) to check whether there is any other multicast receiver downstream of the same. When the presence check request is not responded to, the multicast router 20b deletes the multicast distribution path associated with that multicast group and transmits a multicast distribution path deletion request to the multicast router 20a. The distribution reconfiguring unit (not shown) of the data link layer switch layer 30a examines the contents of the presence check request transmitted by the multicast router 20b, records a maximum response time described therein, and distributes the presence check request to ports where multicast distribution paths exist. Since the receiver which has received the presence check request transmits a path establishing request within the maximum response time without fail, the multicast distribution path at a port which has not been responded to within the recorded maximum response time is deleted. Thus, multicast distribution paths for ports on which no receiver exist can be quickly deleted while maintaining multicast distribution paths for ports where receivers exist. The data link layer switches 30a and 30b may be allowed to perform distribution to all ports excluding reception ports not only to ports where multicast distribution paths exist as far as presence check requests.

Let us now consider a case in which the mobile terminal 50 is a member of the multicast group G and is receiving multicast packets through the radio base station 40a as shown in FIG. 1 and in which the mobile terminal 50 moves while switching the radio base station in connection thereto from the radio base station 40a to the radio base station 40b and then to the radio base station 40c as indicated by the two-dot chain line in the drawing. The router switching detection unit 502 of the mobile terminal 50 maintains IP address information of the multicast router upstream thereof by receiving advertisements and the like periodically transmitted by the multicast router. While the upstream multicast router is identified by an IP address in FIG. 1, any method of identification other than the use of an IP address may be employed as long as it allows multicast routers to be discriminated.

Figure 2:
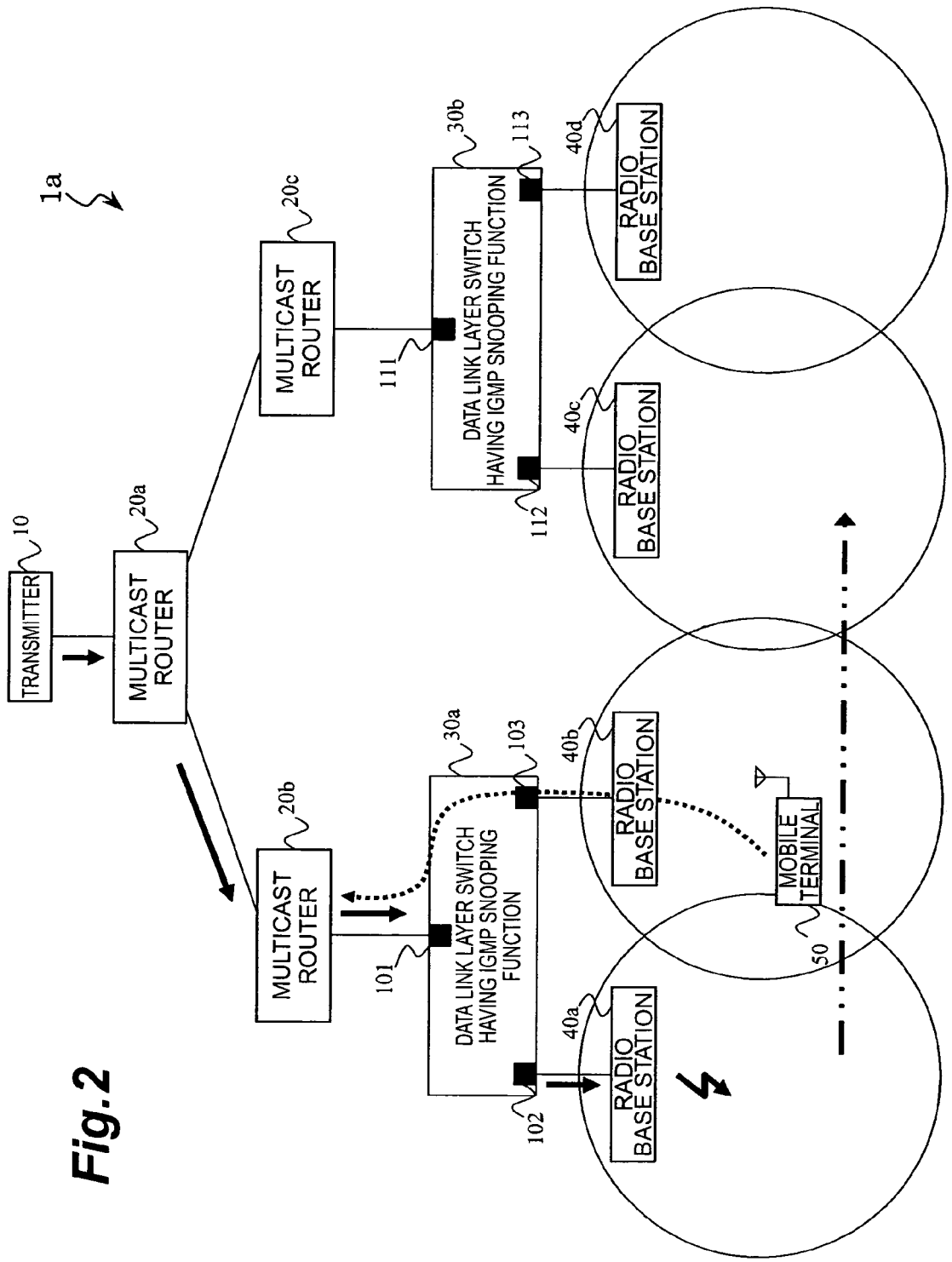
FIG. 2 is a view showing the configuration of the mobile communication system according to the first embodiment of the invention.

As shown in FIG. 2, when the radio base station connected to the mobile terminal 50 is switched from the radio base station 40a to the radio base station 40b, the station switching detection unit 501 of the mobile terminal 50 detects that the base station connected to itself has switched to another. The station switching detection unit 501 may be based on any physical principle as long as it is possible to detect switching of the radio base station to which the mobile terminal 50 is connected and, for example, a radio base station switching notice from a radio interface card may be detected for this purpose. When the mobile terminal 50 detects that the radio base station in connection to the same has been switched to the radio base station 40b, it transmits a path establishing request associated with the multicast group G through the radio base station 40b to which it has been switched, as indicated by the arrow in a dotted line in FIG. 2. As the data link layer switch 30a receives the path establishing request at a port 103, it recognizes that there is a receiver of the multicast group G downstream of the port 103 from the contents of the path establishing request for a multicast distribution path. It then records that there is a need for distributing multicast packets addressed to the multicast group G to the port 103 in the multicast distribution management table and transfers the path establishing request for a multicast distribution path which has arrived to the multicast router 20b through the port 101. Since the multicast router 20b already has a path for distribution addressed to the multicast group G, it does not transmit a new path establishing request upstream thereof. Since multicast packets (information signals) addressed to the multicast group G will therefore be distributed from both of the ports 102 and 103 of the data link layer switch 30a, the mobile terminal 50 will be able to receive multicast packets addressed to the multicast group G through the radio base station 40b.

Then, the router switching detection unit 502 of the mobile terminal 50 examines whether the multicast router upstream thereof has been switched from the previous multicast router. For example, such an examination may be carried out by transmitting a packet requesting a router advertisement to the multicast router and comparing information in a router advertisement packet transmitted in response with multicast router information that the detection unit itself has. However, it is not essential to transmit a router advertisement request packet, and any method may be employed as long as it allows detection of whether the multicast router has been switched or not.

Figure 3:
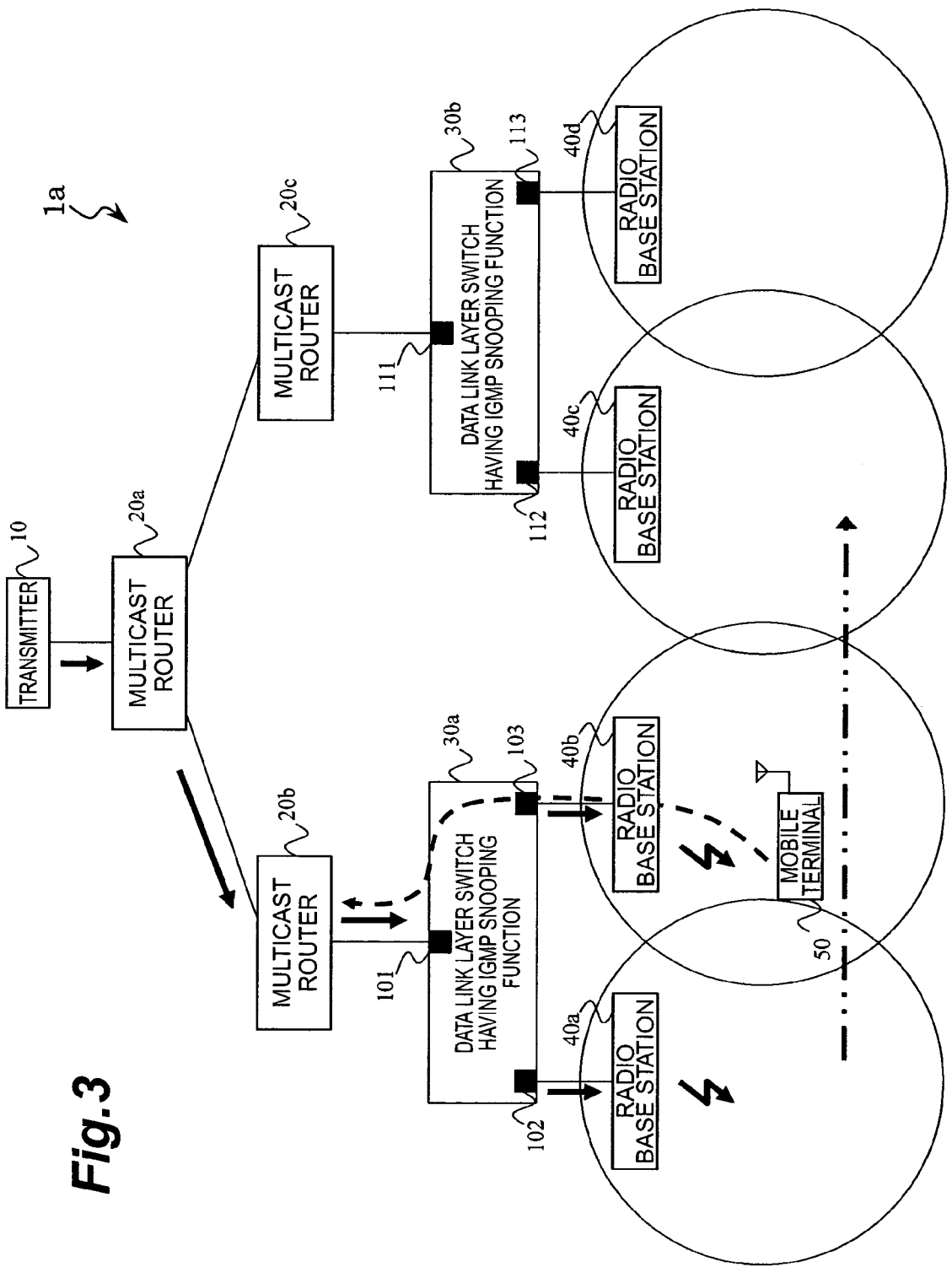
FIG. 3 is a view showing the configuration of the mobile communication system according to the first embodiment of the invention.

When the radio base station connected to the mobile terminal 50 is switched from the radio base station 40a to the radio base station 40b, the upstream multicast router is still the multicast router 20b. In such a case that the upstream multicast router remains unchanged, the mobile terminal transmits a request for withdrawal from the multicast group G to the multicast router 20b upstream of the same as indicated by the arrow in a broken line in FIG. 3.

Figure 4:
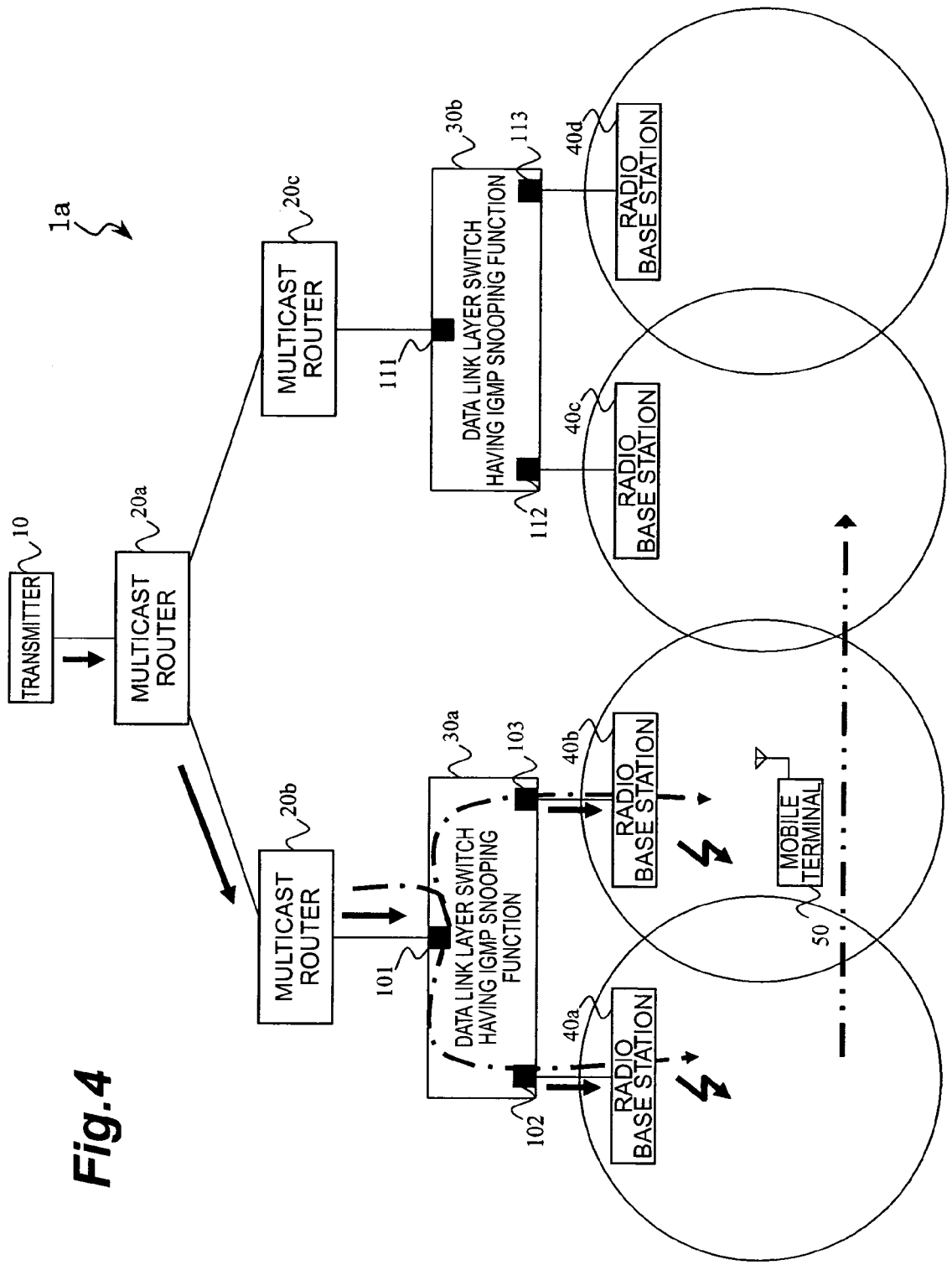
FIG. 4 is a view showing the configuration of the mobile communication system according to the first embodiment of the invention.

Upon receipt of the request for withdrawal from the multicast group G, the check request transmission unit (not shown) of the multicast router 20b transmits a presence check request as indicated by the arrow in chain lines in FIG. 4 to check whether there is another receiver as described above.

Figure 5:
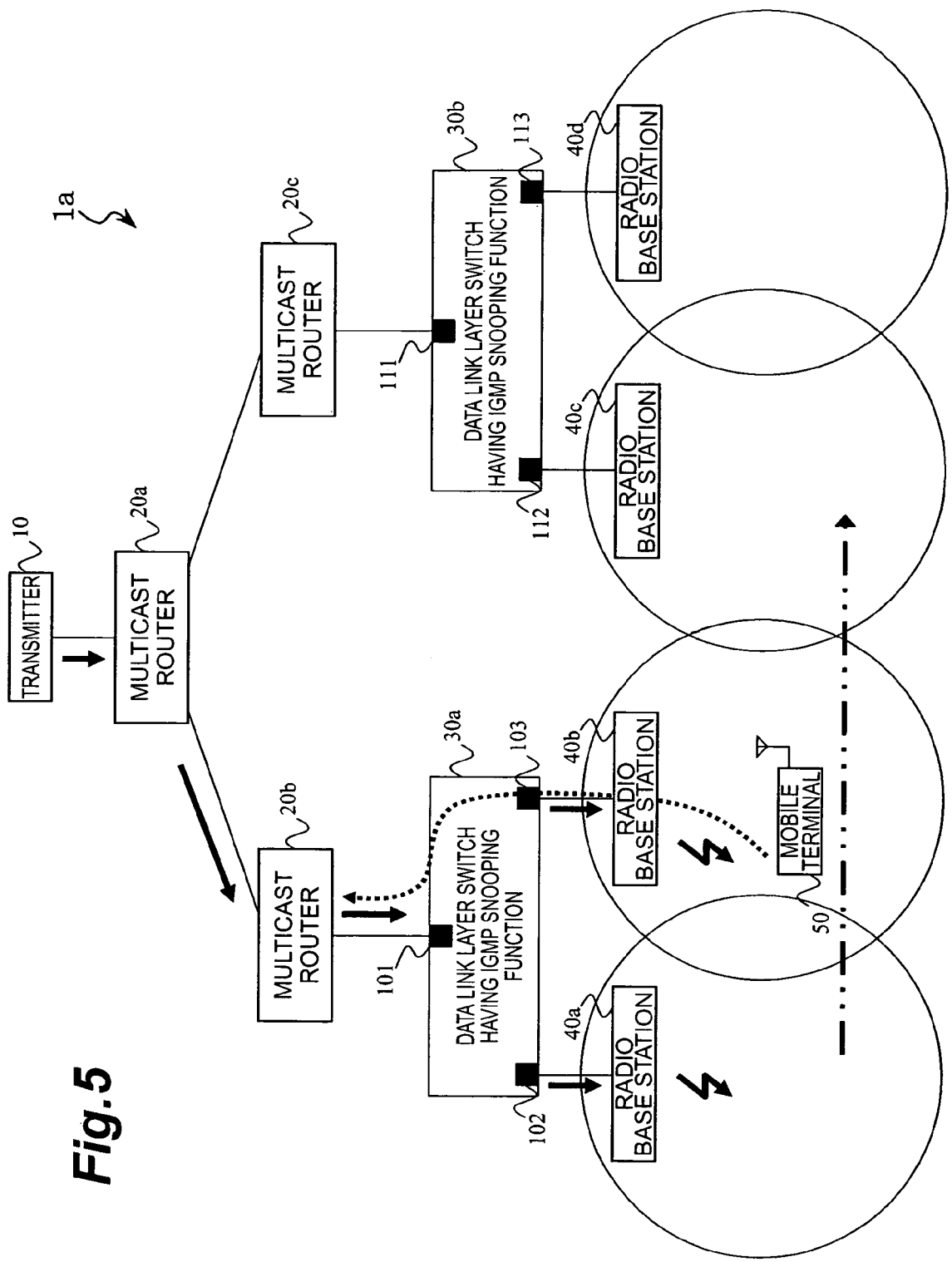
FIG. 5 is a view showing the configuration of the mobile communication system according to the first embodiment of the invention.

Since the mobile terminal 50 is a member of the multicast group G, when it receives the presence check request, it transmits a path establishing request through the port 103 of the data link layer switch 30a within the maximum response time as indicated by the arrow in a dotted line in FIG. 5. While the path establishing request may be transmitted in response to the presence check request form the multicast router, for simplicity, it may alternatively be transmitted after the above-described request for withdrawal from the multicast group G in succession.

Figure 6:
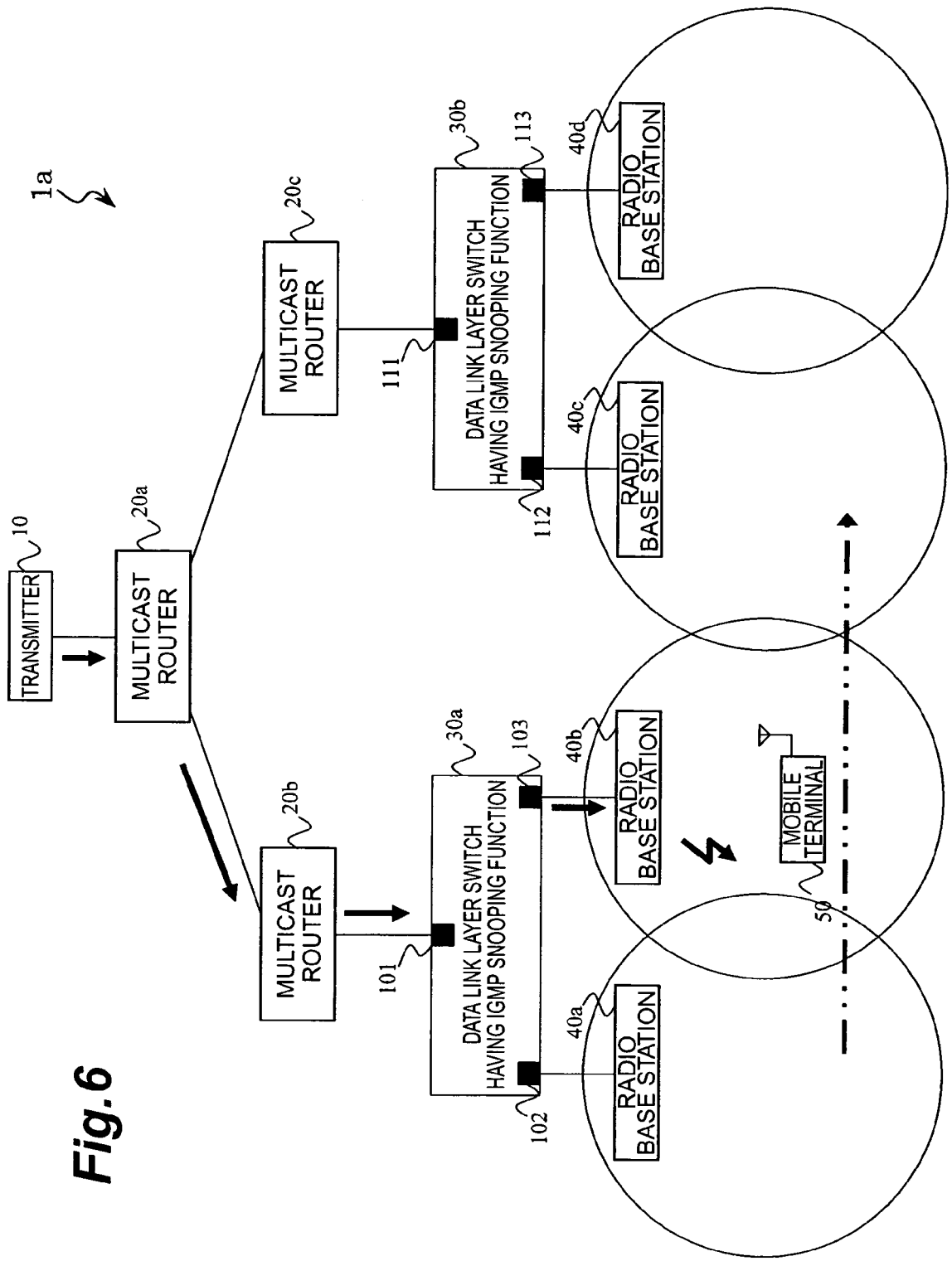
FIG. 6 is a view showing the configuration of the mobile communication system according to the first embodiment of the invention.

The data link layer switch 30a records only the port 103 which has a response within the maximum response time described in the multicast receiver presence check request in the multicast distribution management table and does not record the port 102 which has previously been listed on the distribution table. Therefore, multicast packets addressed to the multicast group G will be thereafter distributed only to the port 103 as shown in FIG. 6.

Thus, the mobile terminal 50 can receive multicast packets immediately after it moves, and no multicast packet will be distributed to the path in which no receiver exists as a result of the movement. Therefore, multicast packets can be distributed only to paths in which receivers exist, and this allows efficient utilization of the band. When another receiver has existed downstream of the radio base station 40a, the receiver transmits a path establishing request in response to the presence check request from the multicast router 20b. Thus, there is no possibility that a multicast distribution path is deleted by mistake in the presence of a receiver.

Figure 7:
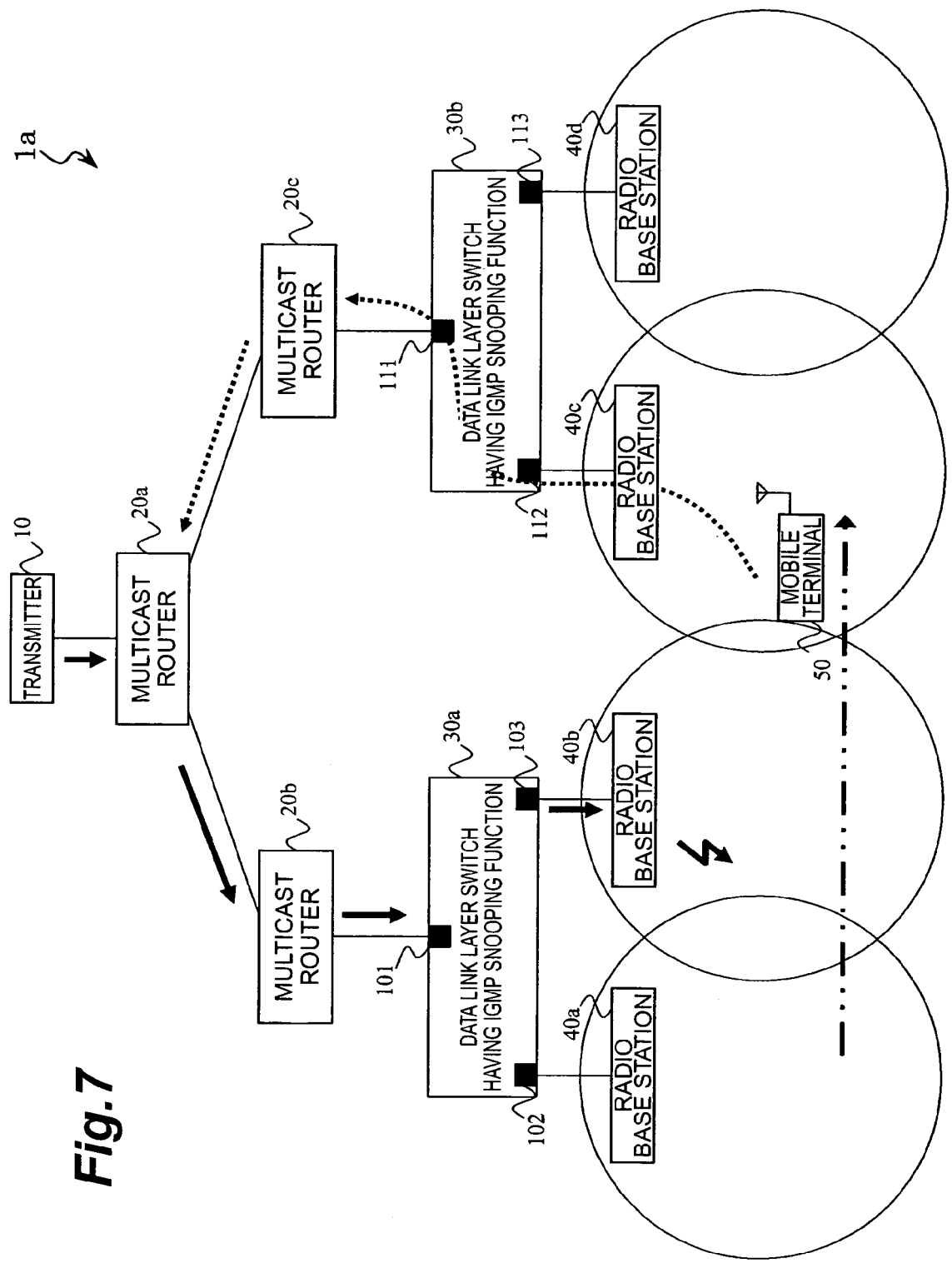
FIG. 7 is a view showing the configuration of the mobile communication system according to the first embodiment of the invention.

As FIG. 7, when the radio base station connected to the mobile terminal 50 is switched from the radio base station 40b to the radio base station 40c as a result of a further movement of the mobile terminal 50, the mobile terminal 50 detects the switching of the radio base station and transmits a path establishing request through the radio base station 40c to receive multicast packets addressed to the multicast group G at the radio base station 40c to be the new location. When the data link layer switch 30b receives the path establishing request at a port 112, it recognizes that a receiver requesting reception of the multicast group G has appeared downstream of the port 112 from the contents of the path establishing request for a multicast distribution path. It records that there is a need for distributing multicast packets addressed to the multicast group G in the multicast distribution management table and transfers the path establishing request for a multicast distribution path which has arrived to the multicast router 20c through a port 111.

Since the multicast router 20c has no path for distribution addressed to the multicast group G yet, it records that there is a need for distributing multicast packets addressed to the multicast group G in the multicast distribution management table and transmits a path establishing request to the multicast router 20*a* upstream thereof. Since a multicast distribution path is already available at the multicast router 20*a*, when the path establishing request from the multicast router 20*c* reaches the multicast router 20*a*, a multicast distribution path to the receiver 50 present downstream of the radio base station 40*c* is established. Thereafter, multicast packets can be received.

Then, the router switching detection unit 502 of the mobile terminal 50 examines whether the current multicast router upstream thereof has been switched from the previous multicast router and knows that the upstream multicast router has changed from the multicast router 20*b* to the multicast router 20*c*. Thereafter, as indicated by the arrow in a dotted line in FIG. 8, it transmits a request for withdrawal from the multicast group to delete the multicast distribution path present downstream of the previous multicast router 20*b*. At this time, since a request for withdrawal from a multicast group can normally be transmitted only to the multicast router to which the requester itself belongs, the request for withdrawal from the multicast group is transmitted by encapsulating it into a unicast packet addressed to the multicast router 20*b*, for example. The packet requesting withdrawal from the multicast group may be transmitted using methods other than the method involving encapsulation. For example, a packet requesting withdrawal from the multicast group in a form different from that of normal packets may be directly transmitted to the multicast router 20*b* provided that the multicast router 20*b* can recognize the presence of a receiver which wishes to withdraw from the multicast group.

Figure 9:
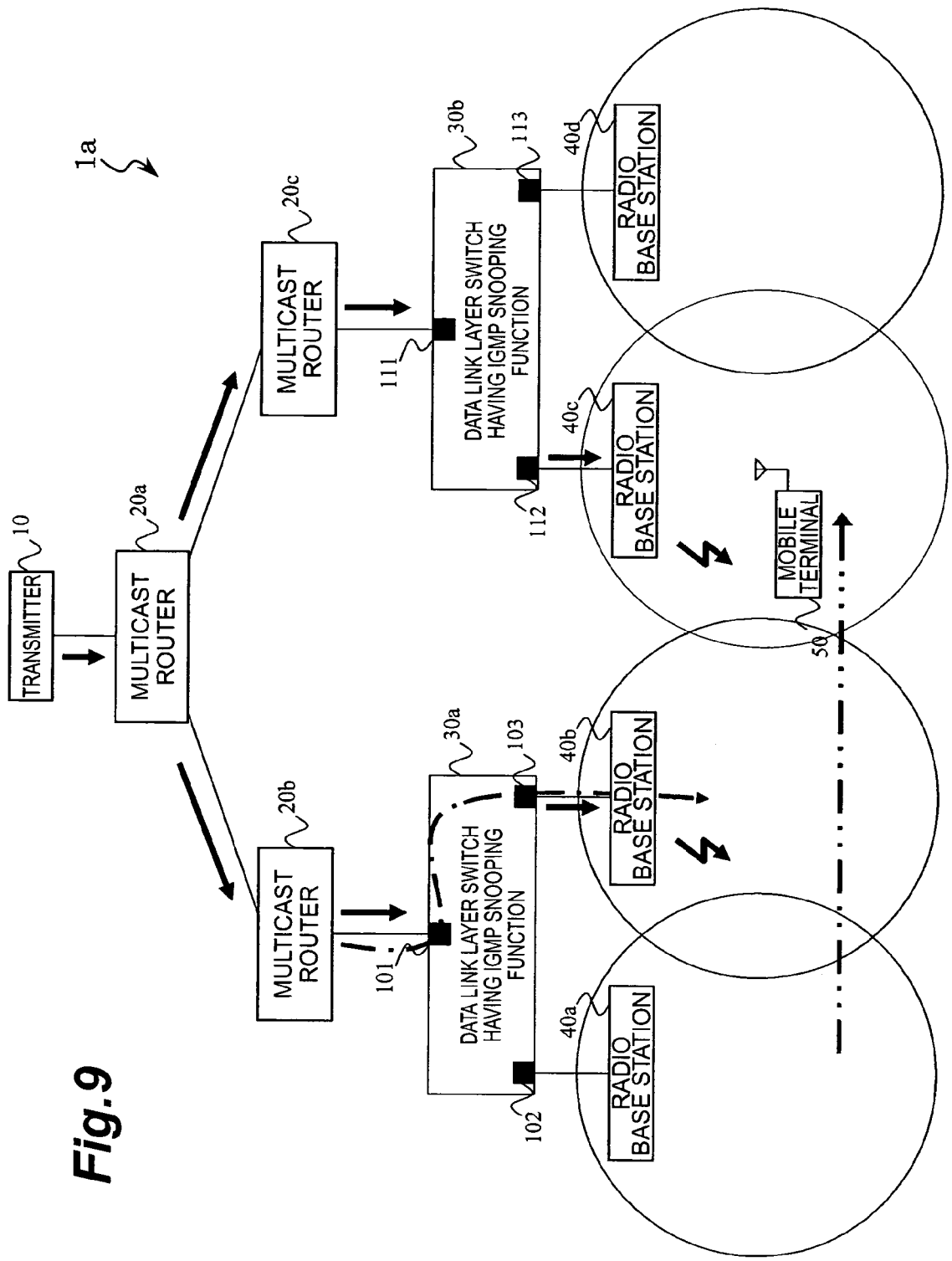
FIG. 9 is a view showing the configuration of the mobile communication system according to the first embodiment of the invention.

Upon receipt of the request for withdrawal from the multicast group, the multicast router 20*b* transmits a presence check request to check whether there is any other receiver, as indicated by the arrow in chain lines in FIG. 9. Since there is no multicast receiver downstream of the multicast router 20*b*, the presence check request is not responded to, and the multicast router 20*b* and the data link layer switch 30*a* delete the multicast distribution paths maintained by themselves after the maximum response time elapses.

Figure 10:
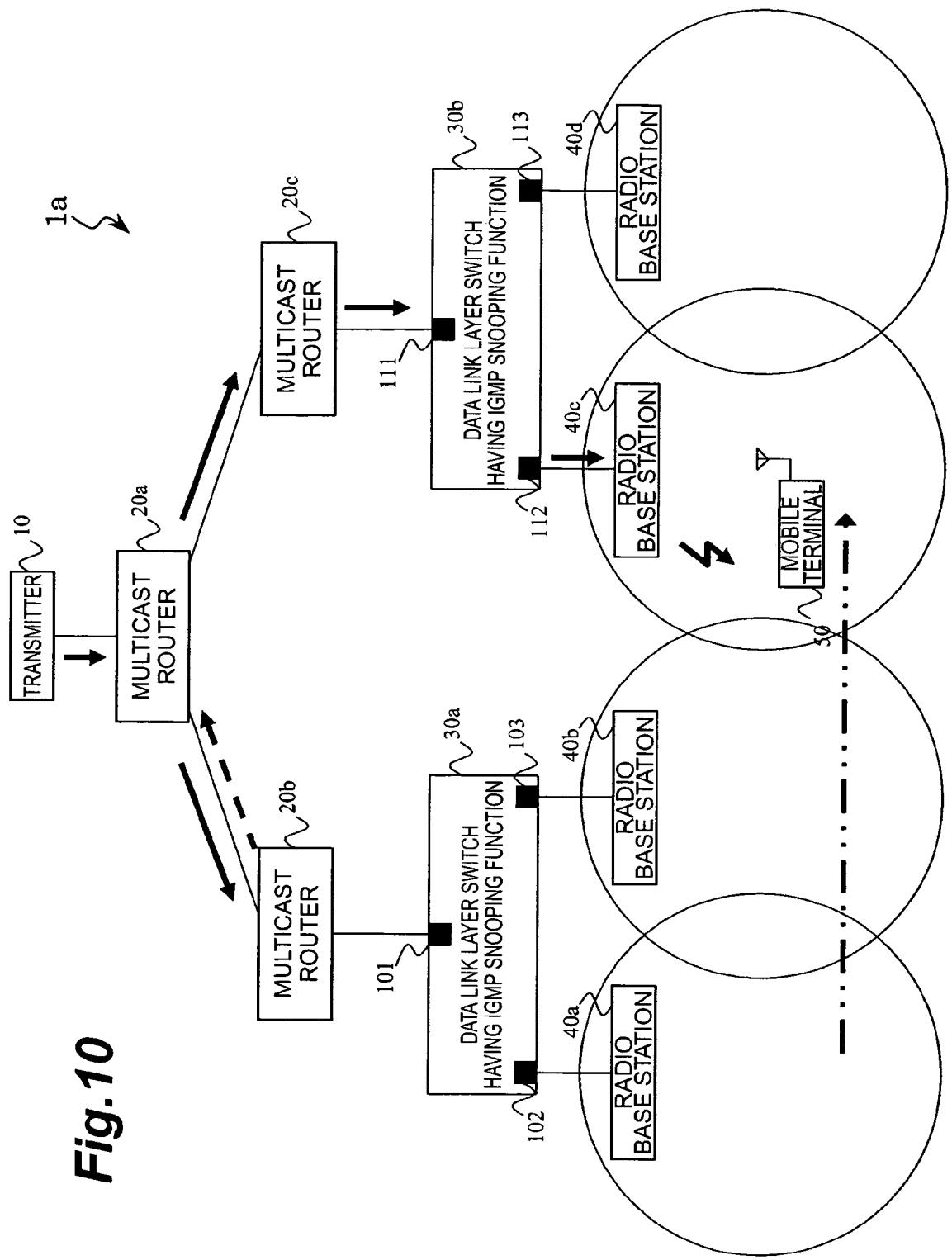
FIG. 10 is a view showing the configuration of the mobile communication system according to the first embodiment of the invention.

Thereafter, the multicast router 20*b* transmits a request for deletion of multicast distribution paths to the multicast router 20*a* as indicated by the arrow in a dotted line in FIG. 10.

Figure 11:
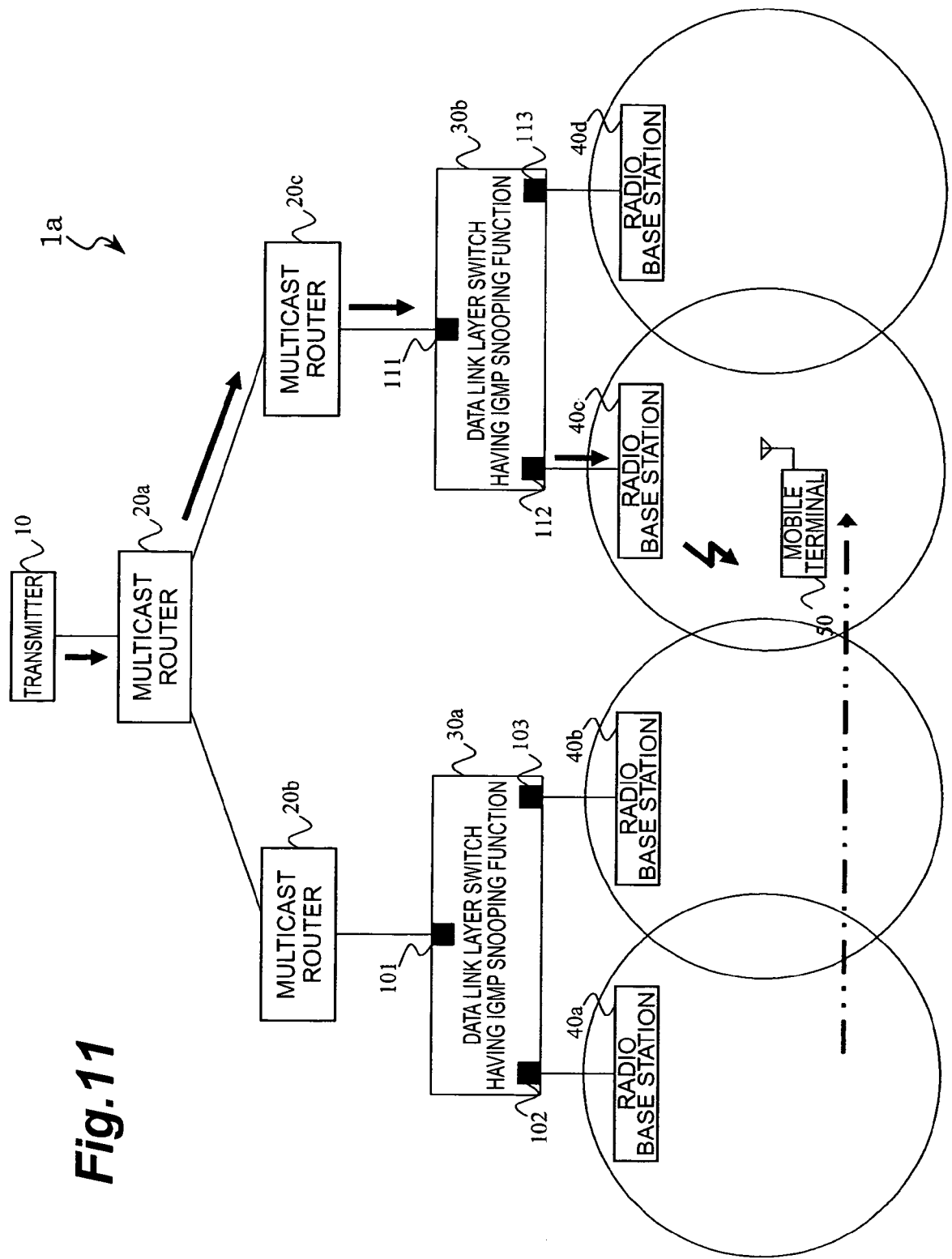
FIG. 11 is a view showing the configuration of the mobile communication system according to the first embodiment of the invention.

Upon receipt of the deletion request from the multicast router 20*b*, the multicast router 20*a* deletes multicast distribution paths associated with the path in which the multicast router 20*b* exists to stop distribution of multicast packets, and multicast packets are eventually distributed only to the path in which the receiver 50 exists as shown in FIG. 11.

Thus, even when both of the radio base station and multicast router connected to the mobile terminal 50 are switched, the mobile terminal 50 will be able to receive multicast packets immediately after moving, and no multicast packet will be distributed to the paths downstream of the multicast router where no receiver exists any more as a result of the movement. This makes it possible to distribute multicast packets only to the path in which the receiver exists and allows efficient utilization of the band. In this case again, when a receiver exists downstream of the multicast router 20*b*, since the receiver transmits a path establishing request in response to the presence check request from the multicast router 20*b*, the multicast distribution path will not be deleted by mistake in the presence of the receiver.

Figure 12:
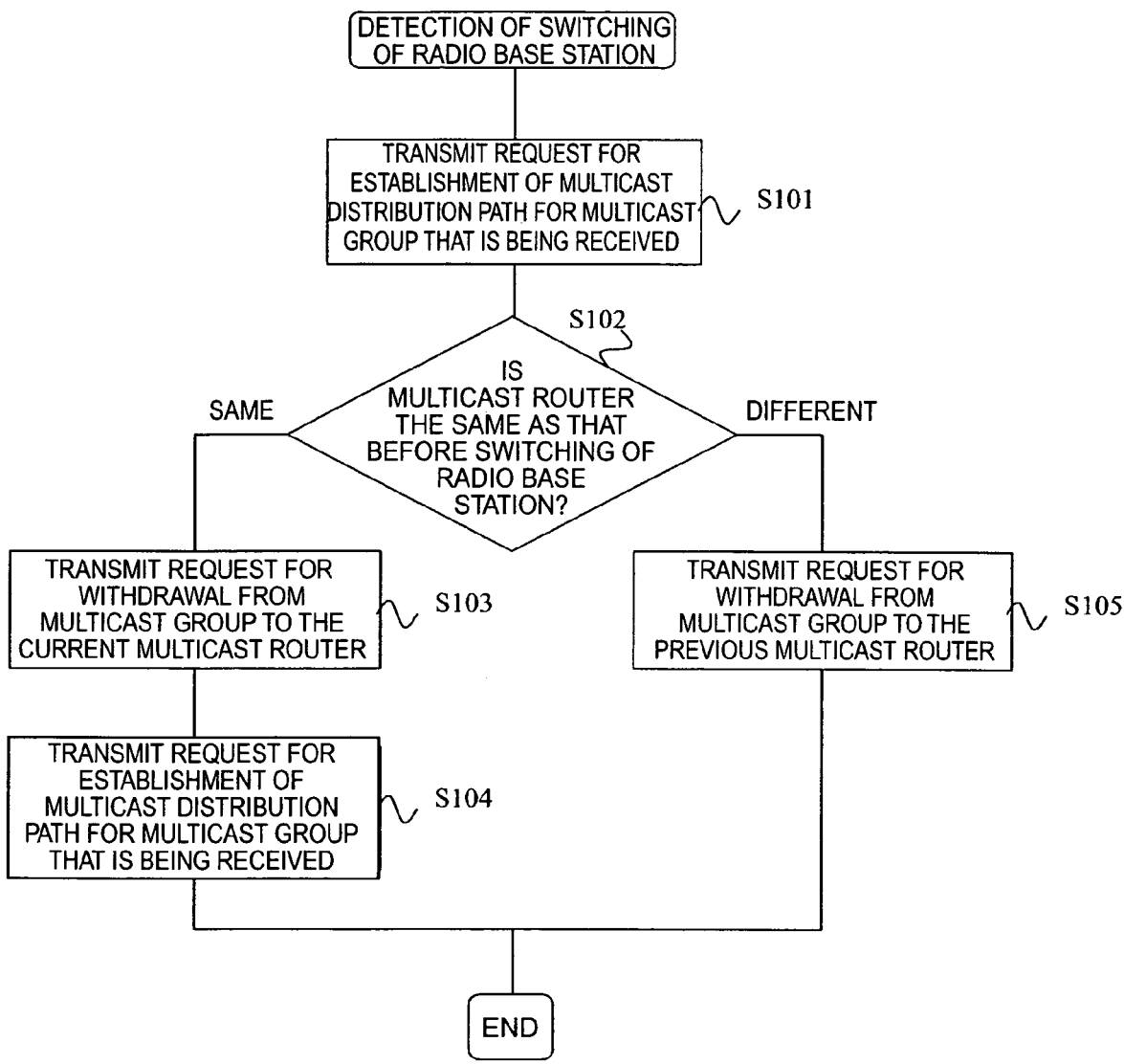
FIG. 12 is a flow chart showing a mobile communication method according to the first embodiment of the invention.

FIG. 12 is a flow chart showing operations of the mobile terminal 50 shown in FIGS. 1 to 11. When the mobile terminal 50 detects that its radio base station has been switched, it transmits a path establishing request through the radio base station to which the switching has occurred (step S101). Next, the mobile terminal 50 determines whether the multicast router connected to the same has been switched (step S102). If the multicast router has not been switched, a request for withdrawal from the multicast group is transmitted to the current multicast router to delete the multicast distribution path to the previous radio base station (step S103). Thereafter, a path establishing request for the multicast distribution path is transmitted again (step S104) If the connected multicast router has been switched, a request for withdrawal from the multicast group is transmitted to the previous multicast router to delete the multicast distribution path at the previous multicast router (step S105).

When the mobile terminal 50 follows this flow chart, it can start receiving multicast packets immediately after moving, and the multicast distribution path before the movement can be appropriately deleted to utilize the band efficiently. Further, since a multicast router transmits a presence check request before it deletes multicast distribution paths, no multicast distribution path will be deleted by mistake.

Figure 13:
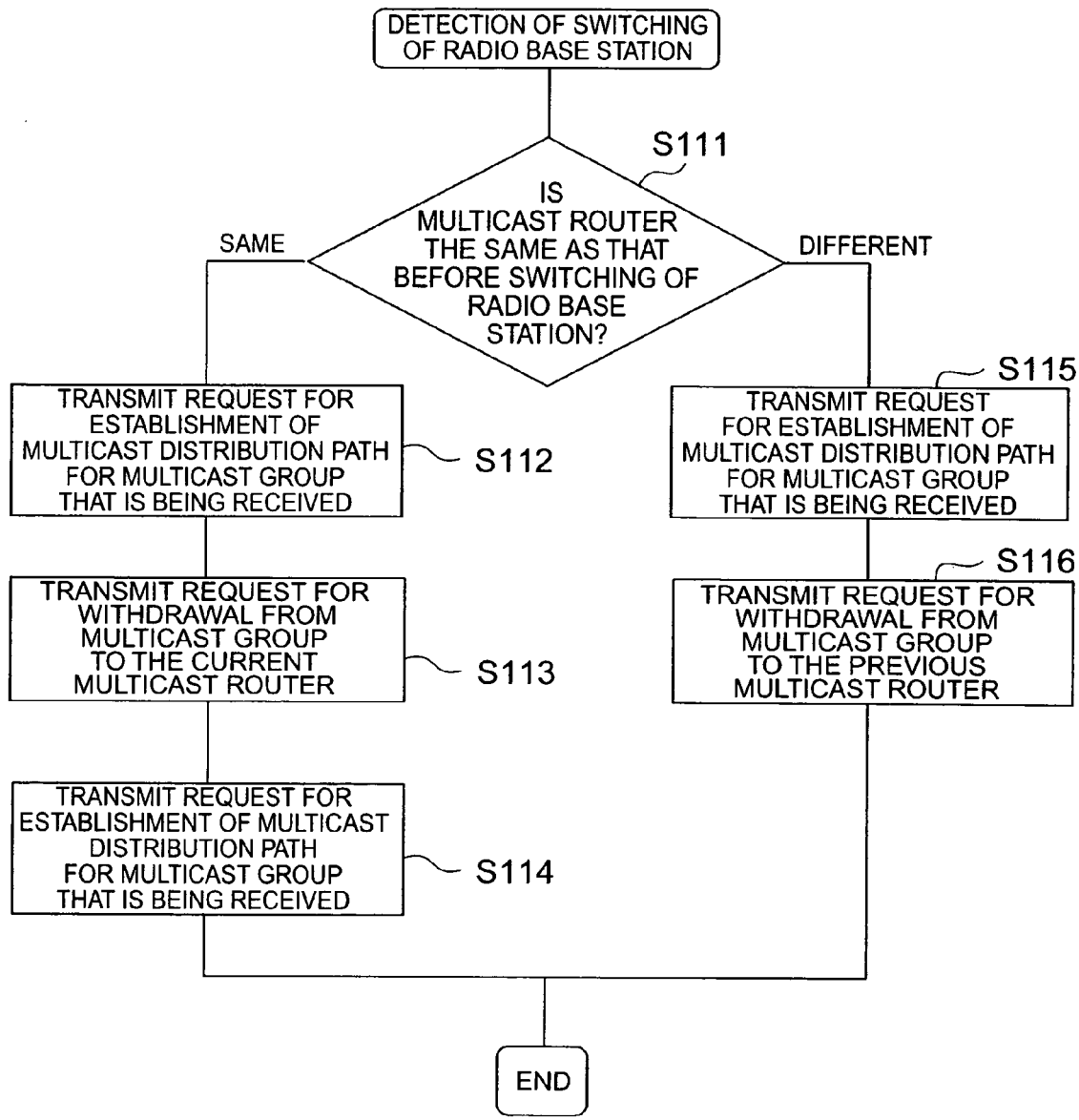
FIG. 13 is a flow chart showing a mobile communication method according to the first embodiment of the invention.

According to the above description, after the mobile terminal 50 detects that the radio base station has been switched, it first transmits a path establishing request and thereafter checks whether the multicast router has changed. As shown in the flow chart in FIG. 13, it may alternatively check whether the multicast router has changed first and may thereafter transmit a request for establishment of a multicast distribution path. What is required that a path establishing request, a withdrawal request, and a path establishing request are sequentially transmitted when the upstream multicast router has not changed although the radio base station has been switched to another and that a path establishing request and a withdrawal request are transmitted to the upstream multicast router and the multicast router before the switching, respectively when both of the radio base station and the multicast router have been switched.

More specifically, when the mobile terminal 50 detects that the radio base station has been switched, it determines whether the multicast router connected to it has been switched (step S111). If the multicast router has not been switched, the mobile terminal 50 transmits a path establishing request through the radio base station to which switching is to occur (step S112). In order to delete the multicast distribution path to the radio base station in the previous location, the mobile terminal 50 transmits a request for withdrawal from the multicast group to the current multicast router (step S113). Thereafter, it transmits a path establishing request for a multicast distribution path again (step S114). In the case that the multicast router has been switched, the mobile terminal 50 also transmits a path establishing request through the new radio base station (step S115). Thereafter, the mobile terminal 50 transmits a request for withdrawal from the multicast group to the previous multicast router to delete the multicast distribution path at the previous multicast router (step S116).

Second Embodiment

Figure 14:
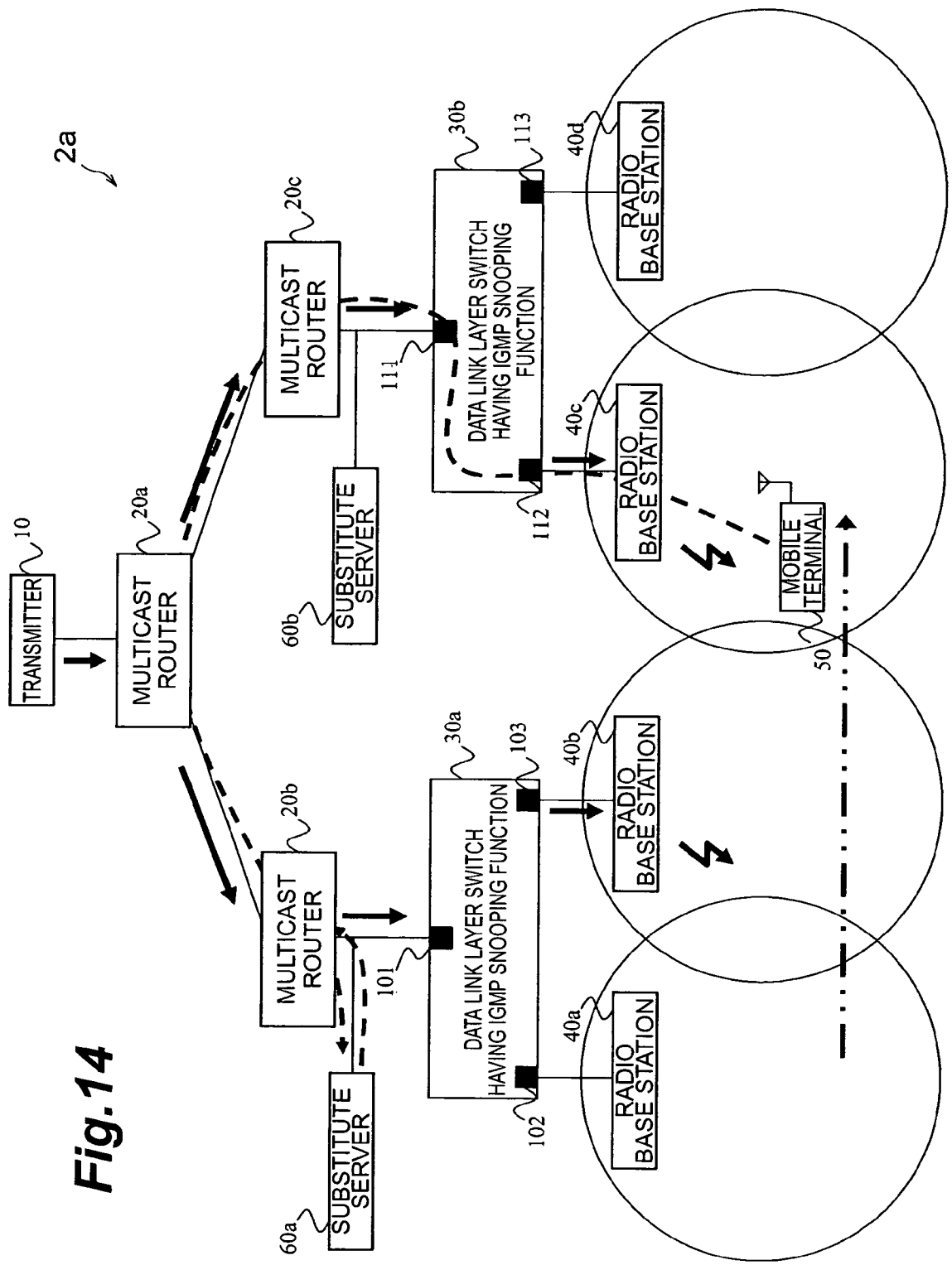
FIG. 14 is a view showing a configuration of a mobile communication system according to a second embodiment of the invention.

FIG. 14 is a conceptual view of a mobile communication system 2*a* according to a second embodiment of the invention. In this embodiment, substitute servers 60*a* and 60*b* which transmit a request for withdrawal from a multicast group on behalf of a mobile terminal 50 are provided downstream of multicast routers 20*b* and 20*c*. When the substitute server 60*a* or 60*b* receives a request for withdrawal from a multicast group from the mobile terminal 50, it transmits a request for withdrawal from the multicast group to the multicast router to which the server itself is connected.

Figure 8:
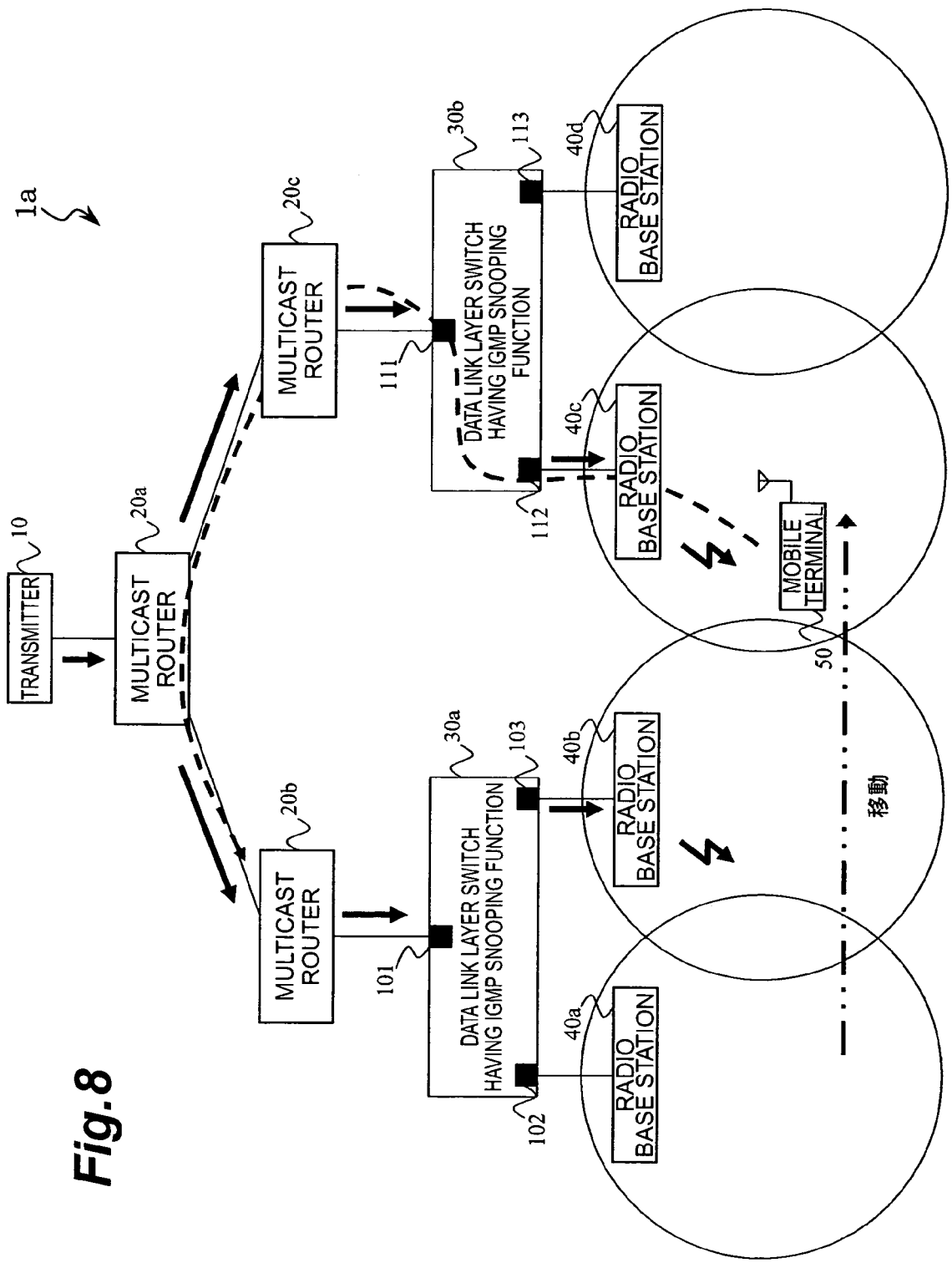
FIG. 8 is a view showing the configuration of the mobile communication system according to the first embodiment of the invention.

In FIG. 8 described above, when the multicast router connected to the mobile terminal 50 is switched, the mobile terminal 50 transmits a request for withdrawal from the multicast group directly to the previous multicast router 20b. In the present embodiment, the mobile terminal 50 transmits a request for withdrawal from the multicast group to the substitute server 60a. Upon receipt of the request for withdrawal from the multicast group from the mobile terminal 50, the substitute server 60a transmits a request for withdrawal from the multicast group to the multicast router 20b. Thus, when the connected multicast router has been switched to another, a request for withdrawal from the multicast group is transmitted to the multicast router to the previous multicast router using the substitute server 60a. Since the request for withdrawal from the multicast group thus reaches the multicast router from the downstream side of the multicast packet distribution, it is possible to faithfully obey the general rule of multicast communication that a request for withdrawal from a multicast group must be made by the party who requests the withdrawal. This is advantageous in that high conformity with other protocols associated with multicast communication can be achieved.

Third Embodiment

Figure 15:
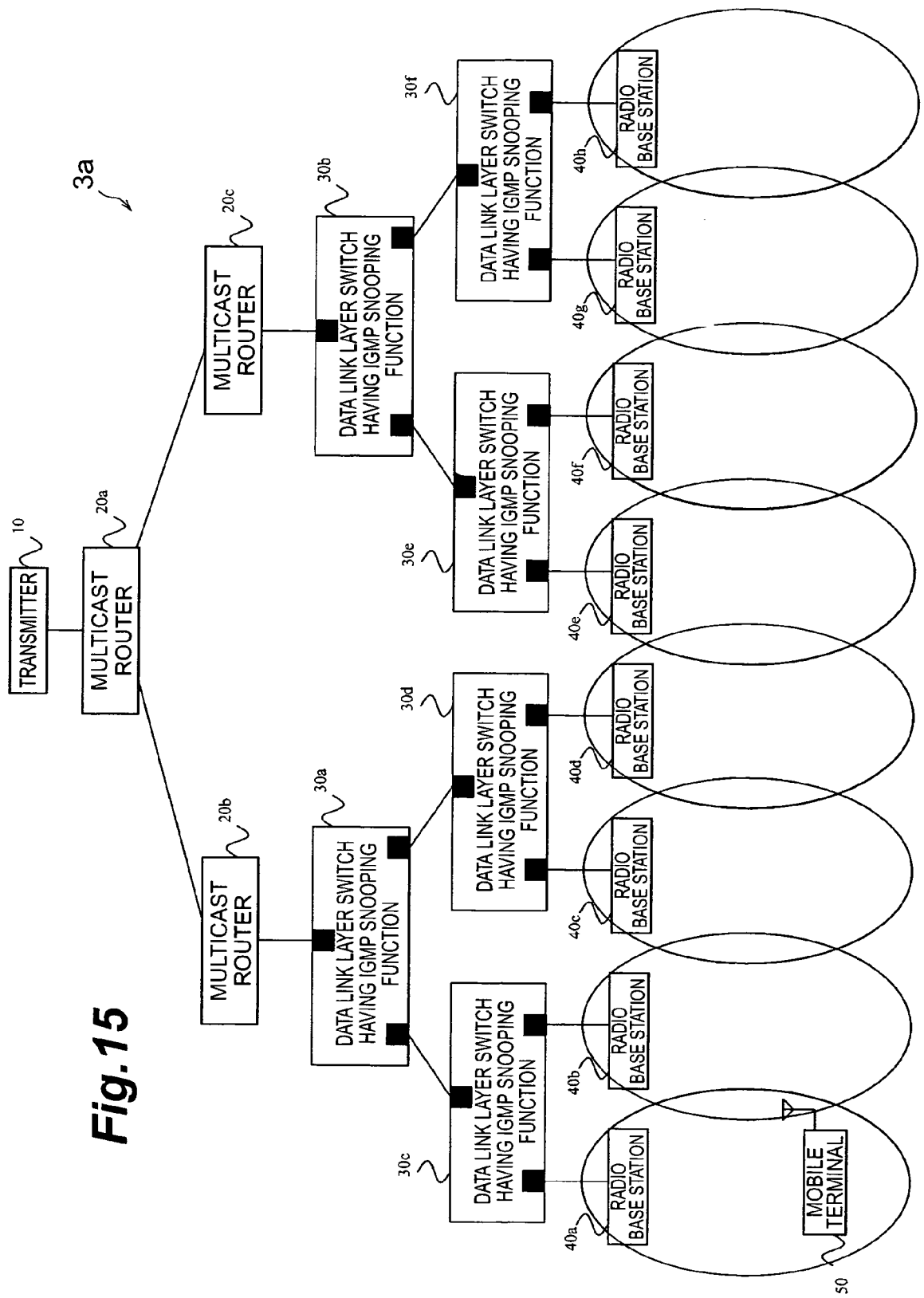
FIG. 15 is a view showing a configuration of a mobile communication system according to a third embodiment of the invention.

FIG. 15 is a conceptual view of a mobile communication system 3a according to a third embodiment of the invention. While only one data link layer switch is connected downstream of one multicast router in the above description, a plurality of data link layer switches may be connected in the form of a tree as shown in the drawing. Each data link layer switch independently performs processes associated with a multicast distribution management table of itself by examining the path establishing requests and the presence check requests as described above, and the multicast packets can be thus distributed only to paths in which receivers exist.

As described above, in each of the above embodiments, when the mobile terminal 50 detects that the radio base station connected to the same has been switched, it examines whether the multicast router connected to the same has been also switched. When the connected multicast router has not changed, the mobile terminal 50 sequentially transmits a path establishing request, a withdrawal request, and another path establishing request to the multicast router of the network to which it is connected. When multicast router connected to the same has changed, the mobile terminal 50 transmits a path establishing request to the multicast router of the network to which it is connected and a withdrawal request to the multicast router of the previous network. Thus, after a movement of the mobile terminal 50, a delay time preceding the start of reception of multicast packets can be reduced; distribution of multicast packets to paths in which no multicast receiver exists can be stopped early; and unnecessary distribution of multicast packets can be reduced to prevent wasteful use of the band.

Fourth Embodiment

Figure 17:
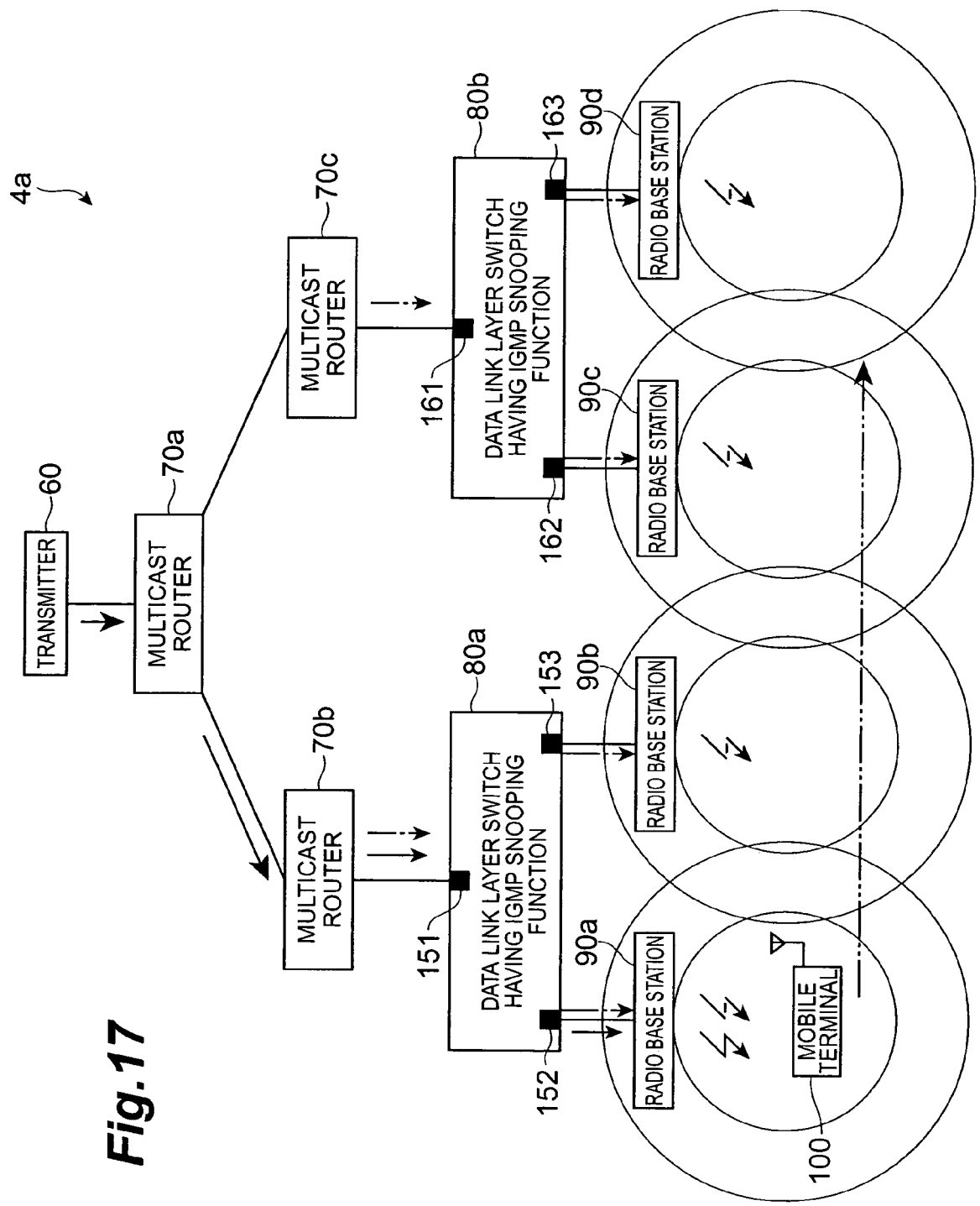
FIG. 17 is a view showing a configuration of a mobile communication system according to a fourth embodiment of the invention.

FIG. 17 is a conceptual view of a mobile communication system 4a according to a fourth embodiment of the invention. The mobile communication system 4a includes a transmitter 60 which transmits multicast packets using multicast communication, multicast routers 70a, 70b, and 70c which copy and distribute multicast packets from the transmitter 60, data link layer switches 80a and 80b having an IMGP snooping function for making a copy of a packet distributed from a multicast router and distributing it only to a port which has a receiver downstream thereof, and radio base stations 90a, 90b, 90c, and 90d which transmit a packet distributed from a data link layer switch to a radio network downstream thereof.

The multicast router 70a is connected to the transmitter 60. The multicast routers 70b and 70c are connected to the multicast router 70a downstream thereof, and the multicast routers are provided in the form of a tree. While the present embodiment shows an example in which multicast routers are connected in the form of a tree for simplicity, a greater number of multicast routers may be used to form a complicated network having a structure other than the tree structure. The data link layer switches 80a and 80b are connected to LANs which are managed by the multicast routers 70b and 70c, respectively. The radio base stations 90a and 90b are connected to the data link layer switch 80a downstream thereof, and the radio base stations 90c and 90d are connected to the data link layer switch 80b downstream thereof. The outer circles drawn around the radio base stations indicate areas in which the radio base stations are available for communication. The inner circles drawn around the radio base stations indicate that connection strength (signal quality) is equal to or higher than a threshold in the areas indicated by the circles.

The multicast routers 70b and 70c transmit advertisement packets including identification information for identifying the respective networks or areas covered by them as indicated by the chain lines in the figure, and the advertisement packets are also transmitted to radio networks through the radio base stations. A mobile terminal 100, which will be described later, can detect the presence of a multicast router by receiving identification information included in such an advertisement packet. It can also measure signal quality, determined by reception sensitivity and transmission power, when the advertisement packet is received. Signal quality can be known from packet signals other than advertisement packets.

For example, the transmitter 60 is an information processing terminal such as a personal computer or a workstation or so forth. For example, the transmitter 60 transmits file data such as programs and dynamic images and moving pictures acquired real-time to the multicast router 70a as multicast packets.

The multicast router 70a makes a required number of copies of a received multicast packet and distributes the copied multicast packets to the multicast routers 70b and 70c downstream thereof. The multicast routers 70b and 70c distribute the received multicast packets to the data link layer switches downstream thereof if necessary. The data link layer switches make a required number of copies of the received multicast packets and distribute them to the radio base stations downstream thereof. The radio base stations distribute the received multicast packets to the radio networks downstream thereof. At this time, since the downstream of the radio base stations is a radio zone, even when there is a plurality of multicast receivers downstream of the radio base stations, the radio base stations can distribute a multicast packet to the multicast receivers by performing radio transmission only once.

Figure 43:
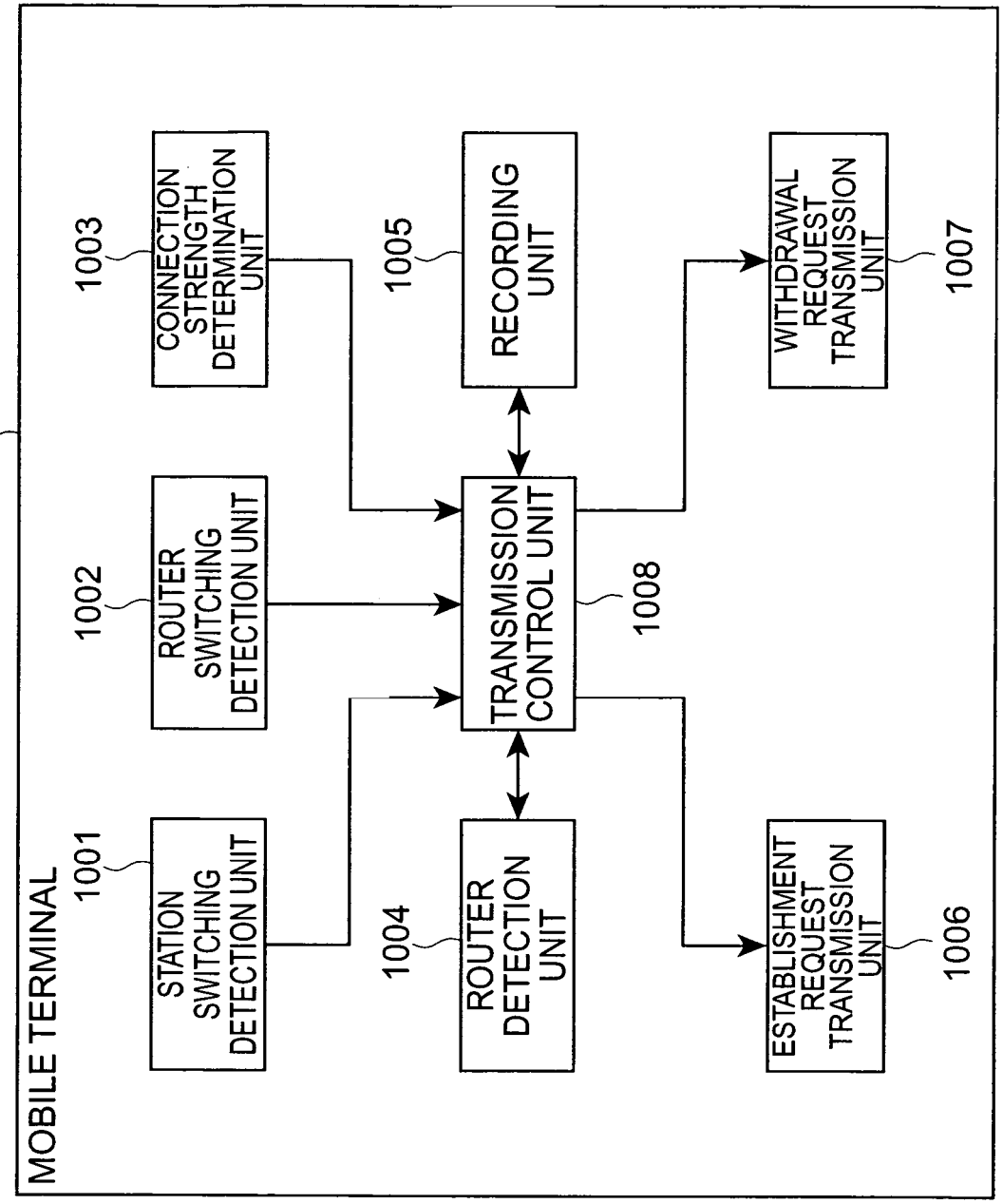
FIG. 43 is a view showing a configuration of a mobile terminal according to the fourth embodiment of the invention.

A mobile terminal 100 is a multicast receiver. As shown in FIG. 43, the mobile terminal 100 includes, as its functional elements, a station switching detection unit 1001 (a station switching detection means), a router switching detection unit 1002 (a router switching detection means), a connection strength determination unit 1003 (a connection strength determination means), a router detection unit 1004 (a router detection means), a recording unit 1005 (a recording means), an establishment request transmission unit 1006 (an establishment request transmission means), a withdrawal request transmission unit 1007 (a withdrawal request transmission means), and a transmission control unit 1008 (a transmission control means).

The station switching detection unit 1001 is a section which detects that the radio base station connected to the mobile terminal 100 has been switched to another. The router switching detection unit 1002 is a section which detects that the multicast router connected to the mobile terminal 100 has been switched to another. The connection strength determination unit 1003 is a section which determines the strength of connection to a radio base station. The router detection unit 1004 is a section which detects the presence of a multicast router. The recording unit 1005 is a section which records information for identifying a multicast router to which a multicast distribution path has been established and the radio base station and multicast router to which the terminal is connected. The establishment request transmission unit 1006 is a section which transmits a path establishing request for requesting at least the data link layer switches 80*a* and 80*b* to establish a path for distributing an information signal to the radio base station to which the mobile terminal 100 is connected. The withdrawal request transmission unit 1007 is a section which transmits a withdrawal request for requesting at least the multicast router connected thereto to withdraw from the multicast group to which the mobile terminal 100 belongs. The transmission control unit 1008 is a section which outputs a first instruction signal instructing the establishment request transmission unit 1006 to transmit a path establishing request and a second instruction signal instructing the withdrawal request transmission unit 1007 to transmit a withdrawal request according to results of the detection and determination by the station switching detection unit 1001, router switching detection unit 1002, the connection strength determination unit 1003, and the router detection unit 1004 and the contents of records in the recording unit 1005. Details of each of the units will be described later.

Referring to the circles drawn around the radio base stations, the outer circles indicate areas in which the radio base stations are available for communication, and the inner circles indicate areas in which the connection strength or signal quality is equal to or higher than a threshold. The mobile terminal 100 is initially connected to the radio base station 90*a* to receive multicast packets.

Operations of the mobile communication system 4*a* and a mobile communication method carried out using the mobile communication system 4*a* will now be described with reference to an example in which the mobile terminal 100 receives multicast packets addressed to a predetermined multicast group in the mobile communication system 4*a* as thus described. For example, the address of the multicast group (let us call it multicast group G) is specified as "239. 1. 2. 3".

Let us now consider a case in which the mobile terminal 100 is a member of the multicast group G and is receiving multicast packets through the radio base station 90*a* as shown in FIG. 17 and in which the mobile terminal 100 moves while switching the radio base station in connection thereto from the radio base station 90*a* to the radio base station 90*b* and then to the radio base station 90*c* as indicated by the two-dot chain line in the figure. The recording unit 1005 of the mobile terminal 100 maintains IP address information of the radio base station and multicast router connected to the same. In the state shown in FIG. 17, only the multicast router 70*b* which has established a multicast distribution path is recorded as a multicast router for which a path has been established. While the upstream multicast router is identified by an IP address in FIG. 17, any method of identification other than the use of an IP address may be employed as long as it allows multicast routers to be discriminated.

Figure 18:
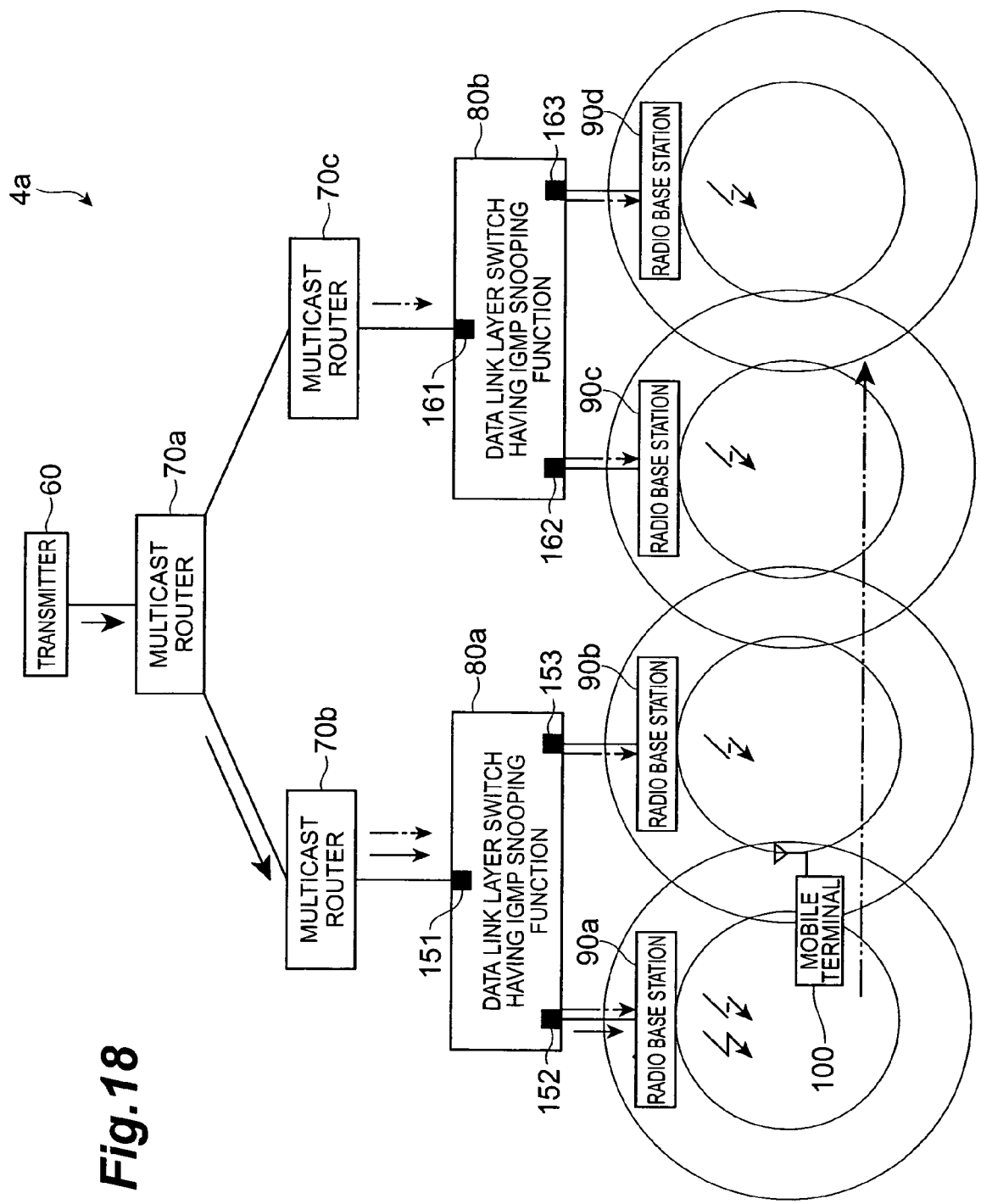
FIG. 18 is a view showing the configuration of the mobile communication system according to the fourth embodiment of the invention.

Let us assume that the mobile terminal 100 starts moving and arrives at a position which is in the reach of electric waves from both of the radio base stations 90*a* and 90*b* as shown in FIG. 18. While the mobile terminal 100 is receiving multicast packets through the radio base station 90*a*, it can receive advertisement packets form the multicast router 70*b* also through the radio base station 90*b*. However, since the multicast router 70*b* has already been recorded as a multicast router which has established a path, no particular process is performed in this state.

Figure 19:
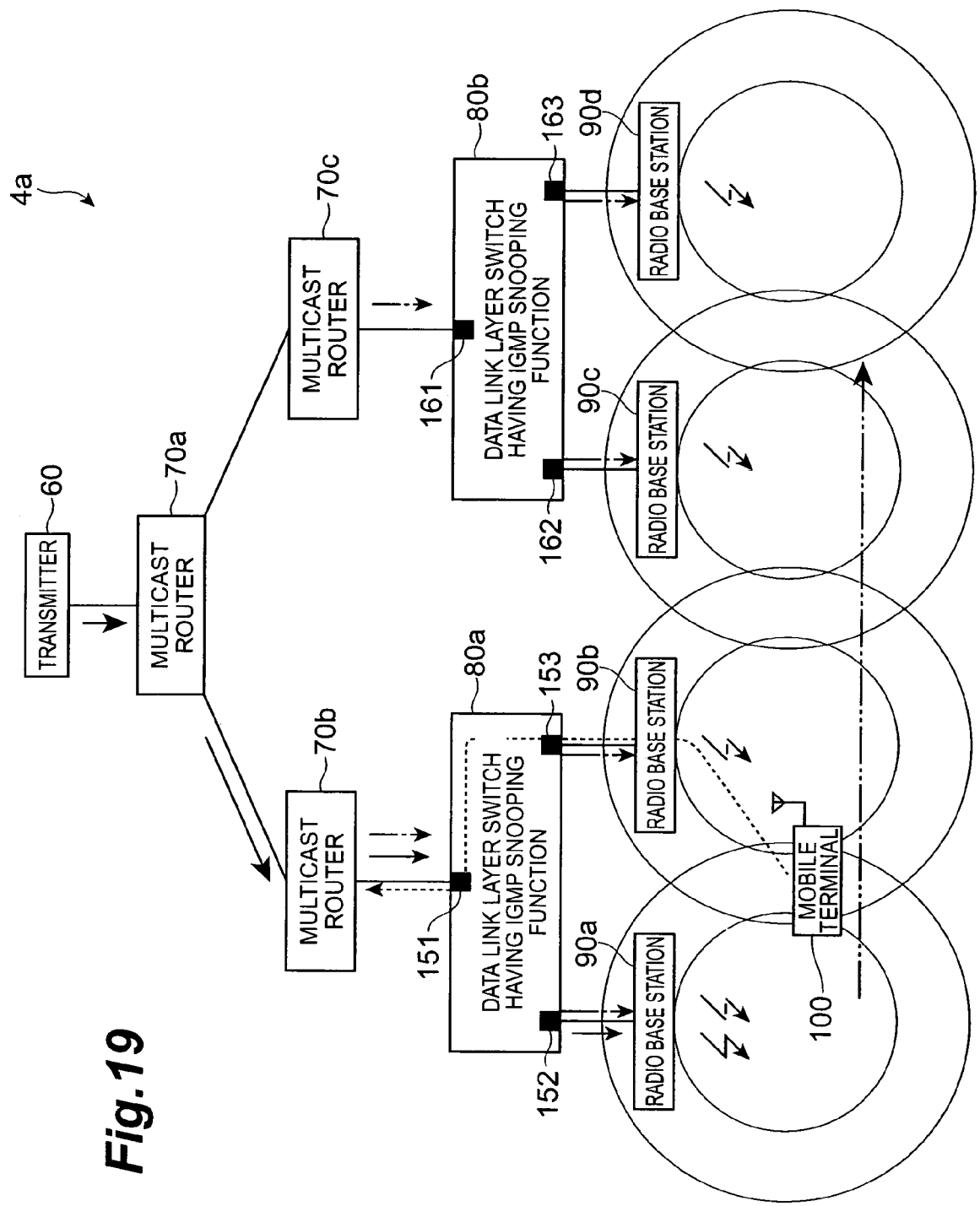
FIG. 19 is a view showing the configuration of the mobile communication system according to the fourth embodiment of the invention.
Figure 20:
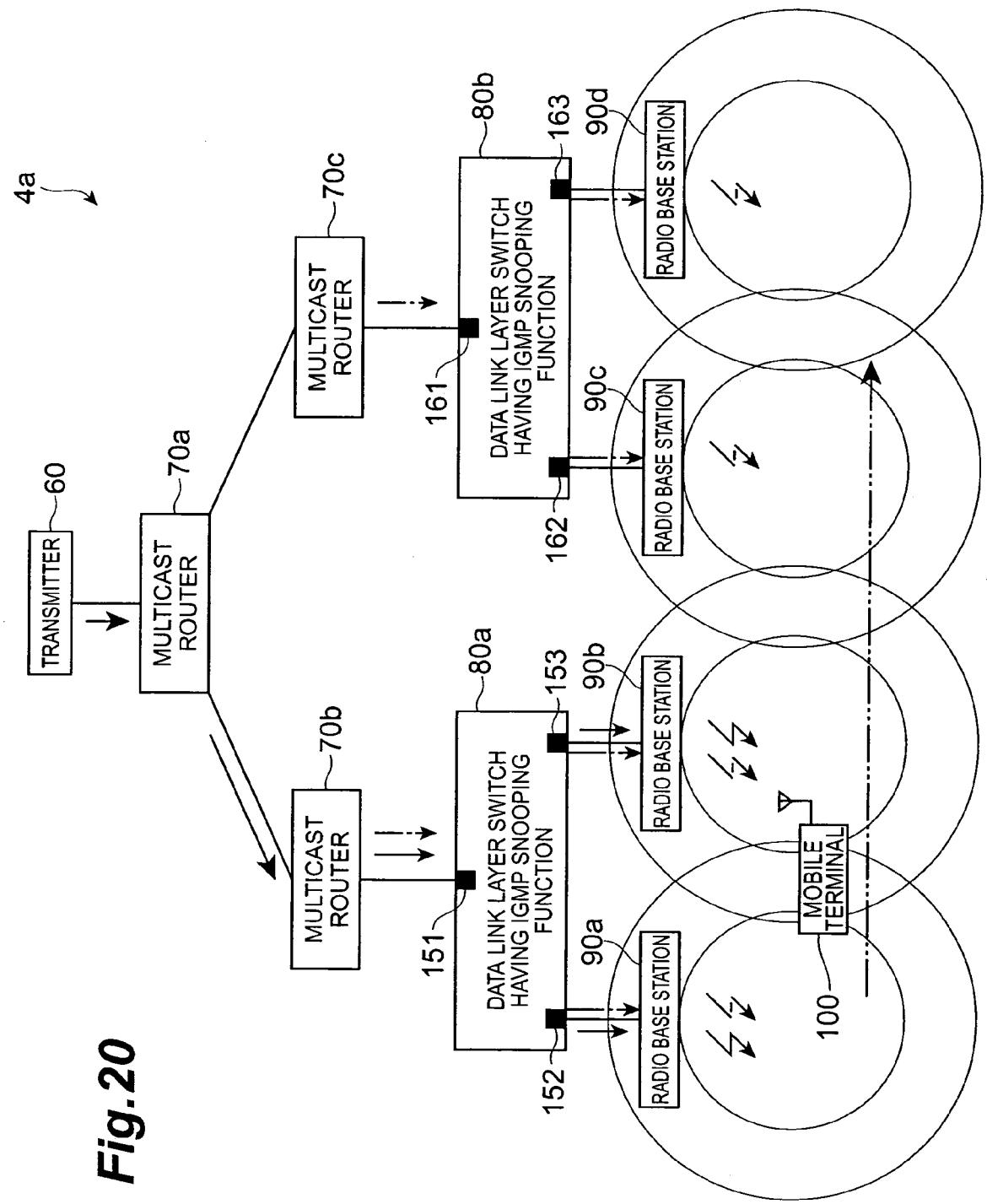
FIG. 20 is a view showing the configuration of the mobile communication system according to the fourth embodiment of the invention.

As shown in FIG. 19, when the radio base station connected to the mobile terminal 100 is switched from the radio base station 90*a* to the radio base station 90*b* as a result of a further movement of the mobile terminal 100, the station switching detection unit 1001 of the mobile terminal 100 detects that the base station connected to itself has switched to another. The station switching detection unit 1001 may be based on any physical principle as long as it is possible to detect switching of the radio base station to which the mobile terminal 100 is connected and, for example, a radio base station switching notice from a radio interface card may be detected for this purpose. When the mobile terminal 100 detects that the radio base station in connection with the same has been switched to the radio base station 90*b*, it transmits a path establishing request associated with the multicast group G through the radio base station 90*b* to which it has been switched, as indicated by the arrow in a dotted line in FIG. 19. As a path establishing unit (not shown) of the data link layer switch 80*a* receives the path establishing request at a port 153, it recognizes that there is a receiver of the multicast group G downstream of the port 153 from the contents of the path establishing request. It then records that there is a need for distributing multicast packets addressed to the multicast group G to the port 153 in a multicast distribution management table and transfers the path establishing request which has arrived to the multicast router 70*b* through a port 151. Since the multicast router 70*b* already has a path for distribution addressed to the multicast group G, it does not transmit a new path establishing request upstream thereof. Since multicast packets (information signals) addressed to the multicast group G will therefore be distributed from both of ports 152 and 153 of the data link layer switch 80*a* as shown in FIG. 20, the mobile terminal 100 will be able to receive multicast packets addressed to the multicast group G through the radio base station 90*b*.

Figure 21:
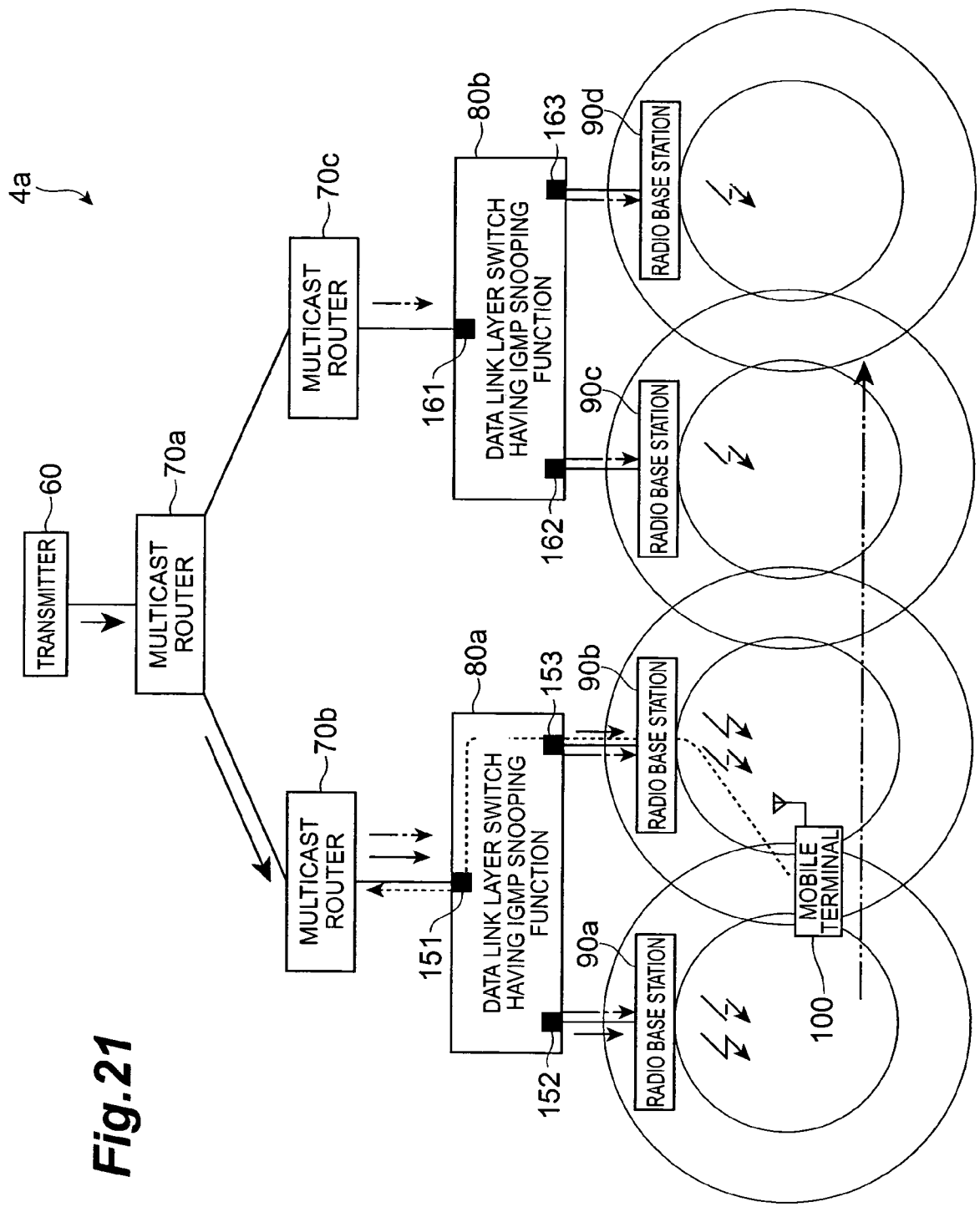
FIG. 21 is a view showing the configuration of the mobile communication system according to the fourth embodiment of the invention.
Figure 22:
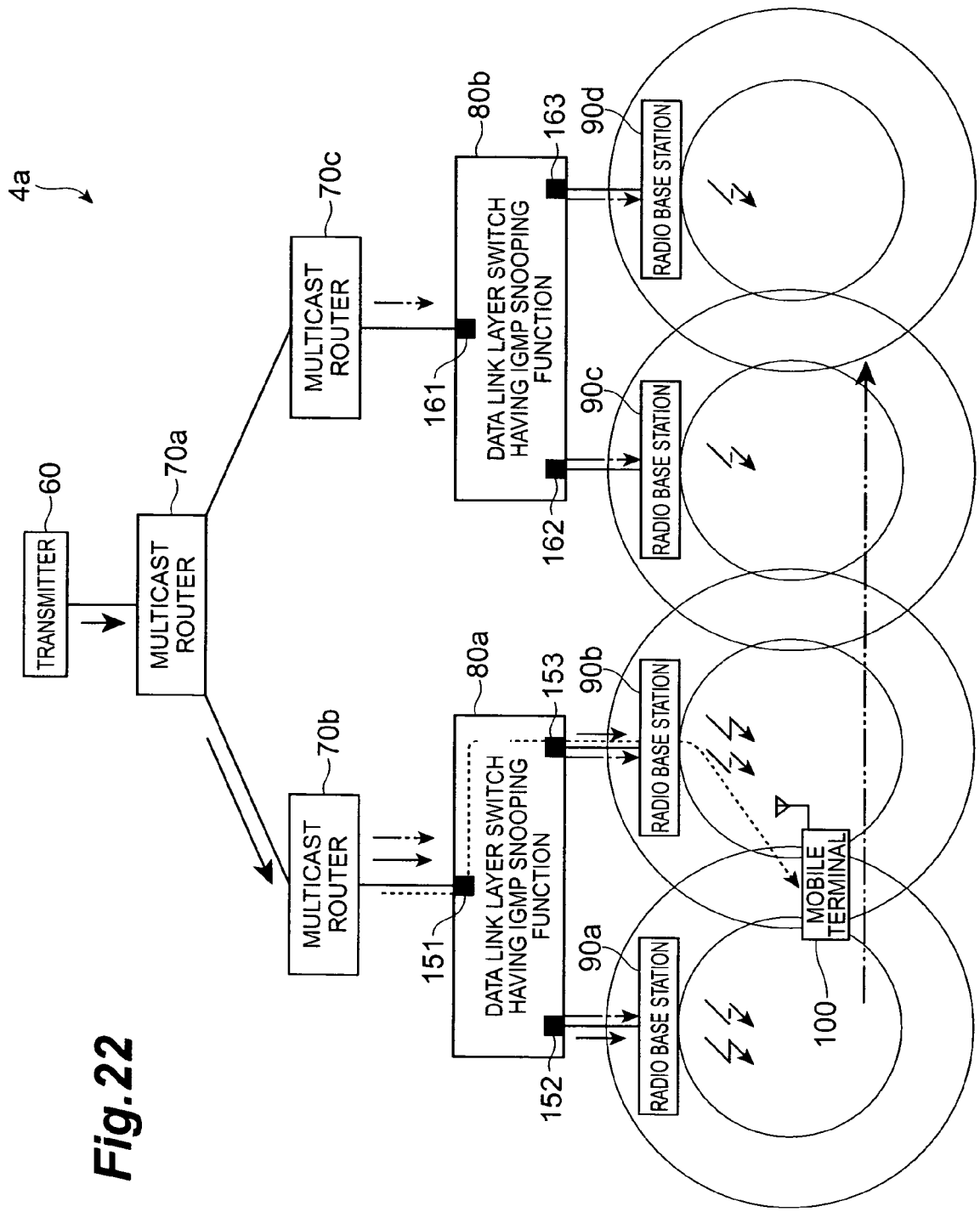
FIG. 22 is a view showing the configuration of the mobile communication system according to the fourth embodiment of the invention.

Then, the router switching detection unit 1002 of the mobile terminal 100 examines whether the current multicast router upstream thereof has been switched from the previous multicast router. For example, such an examination may be carried out by transmitting a packet requesting an advertisement to the multicast router 70*b* as indicated by the arrow in a dotted line in FIG. 21 and comparing identification information included in an advertisement packet transmitted by the multicast router 70*b*, as indicated by the arrow in a dotted line in FIG. 22, in response with multicast router identification information that the detection unit itself has. However, the invention is not limited to this method of examination, and any method may be employed as long as it allows detection of whether the upstream multicast router has been switched or not.

Figure 23:
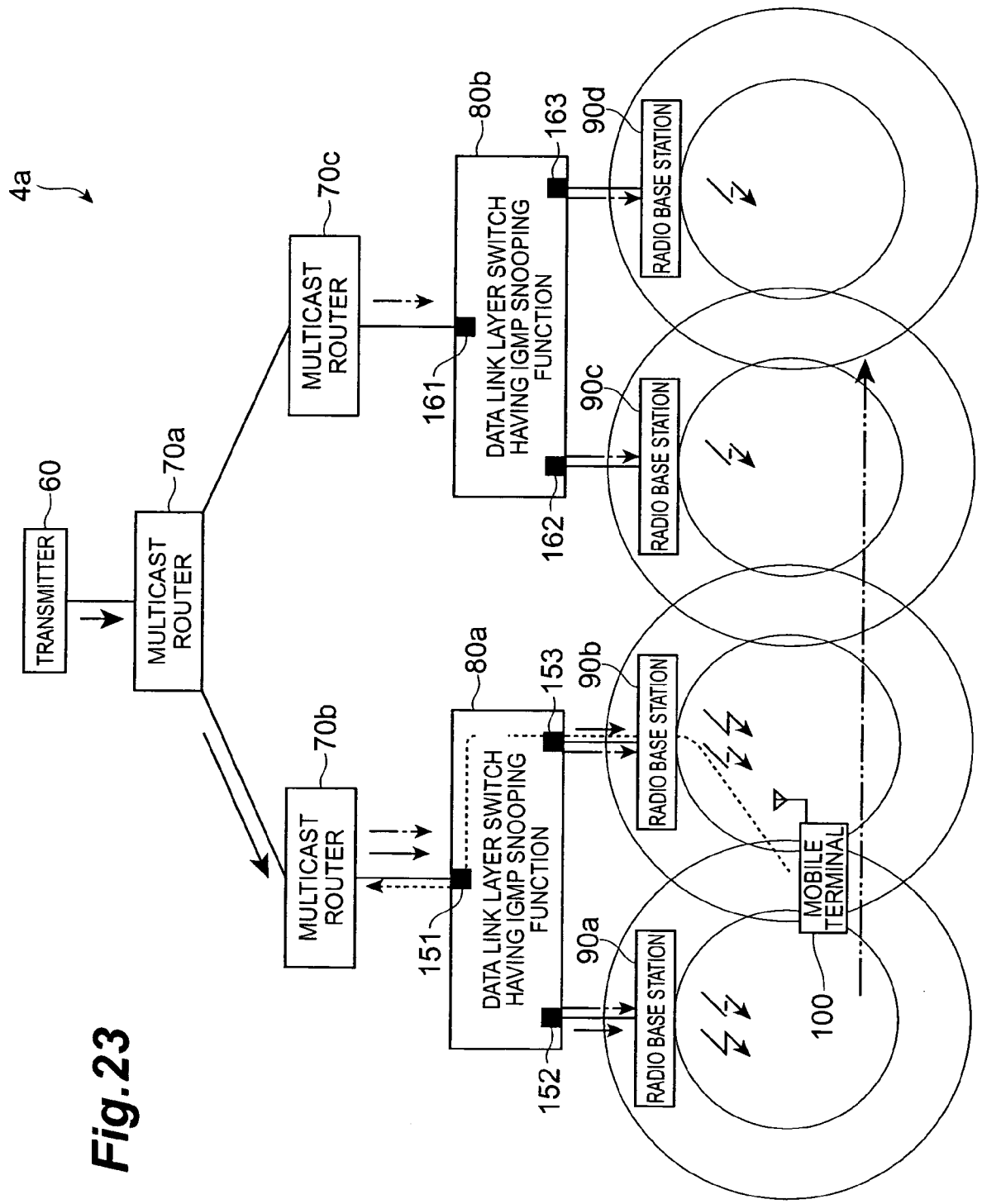
FIG. 23 is a view showing the configuration of the mobile communication system according to the fourth embodiment of the invention.

When the radio base station connected to the mobile terminal 100 is switched from the radio base station 90*a* to the radio base station 90*b*, the upstream multicast router is still the multicast router 70*b*. In such a case that the upstream multicast router remains unchanged, the mobile terminal 100 transmits a request for withdrawal from the multicast group G to the multicast router 70b as indicated by the arrow in a dotted line in FIG. 23.

Figure 24:
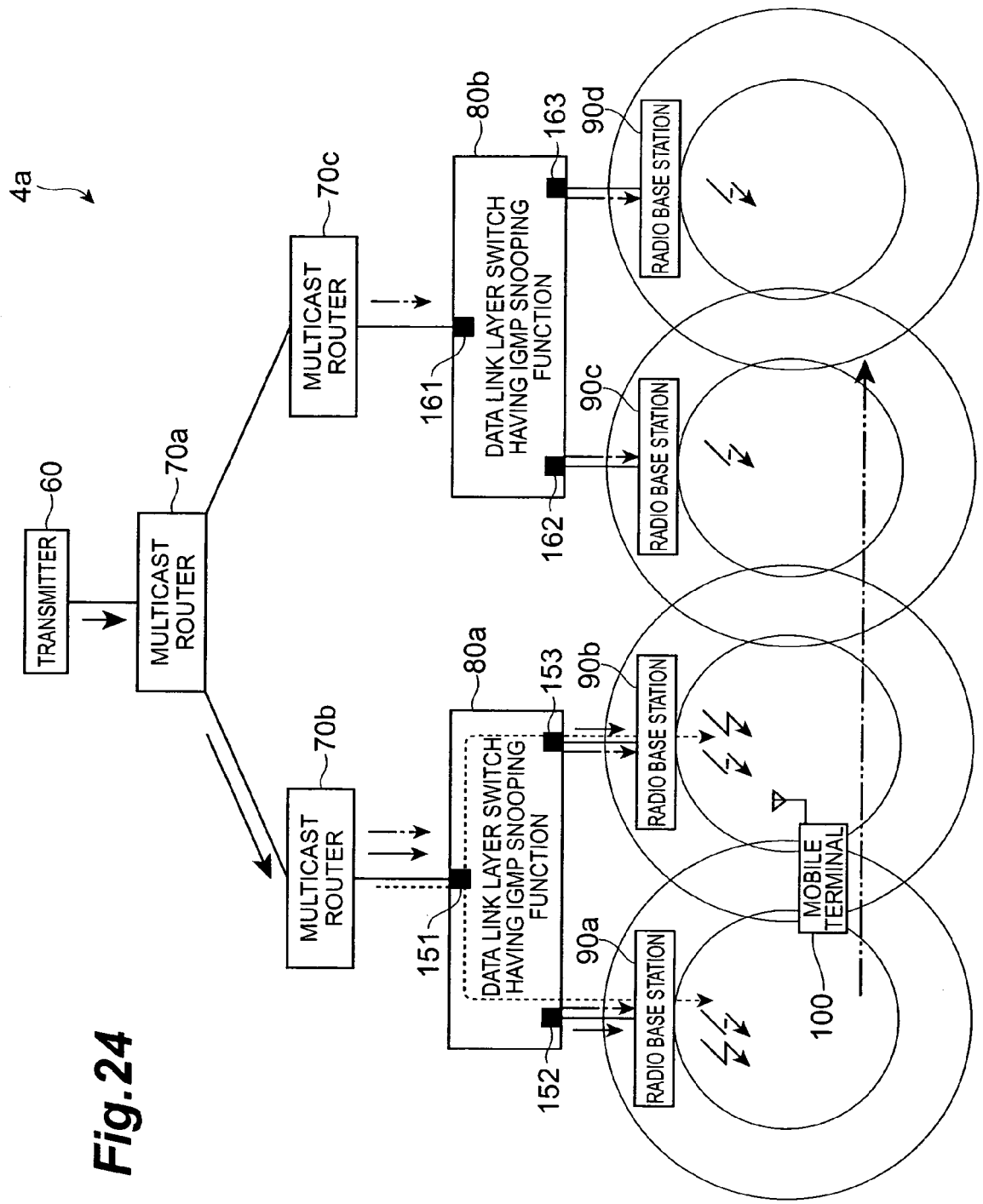
FIG. 24 is a view showing the configuration of the mobile communication system according to the fourth embodiment of the invention.

Upon receipt of the request for withdrawal from the multicast group G, a check request transmission unit (not shown) of the multicast router 70b transmits a presence check request as indicated by the arrow in a dotted line in FIG. 24 to check whether there is another receiver.

Figure 25:
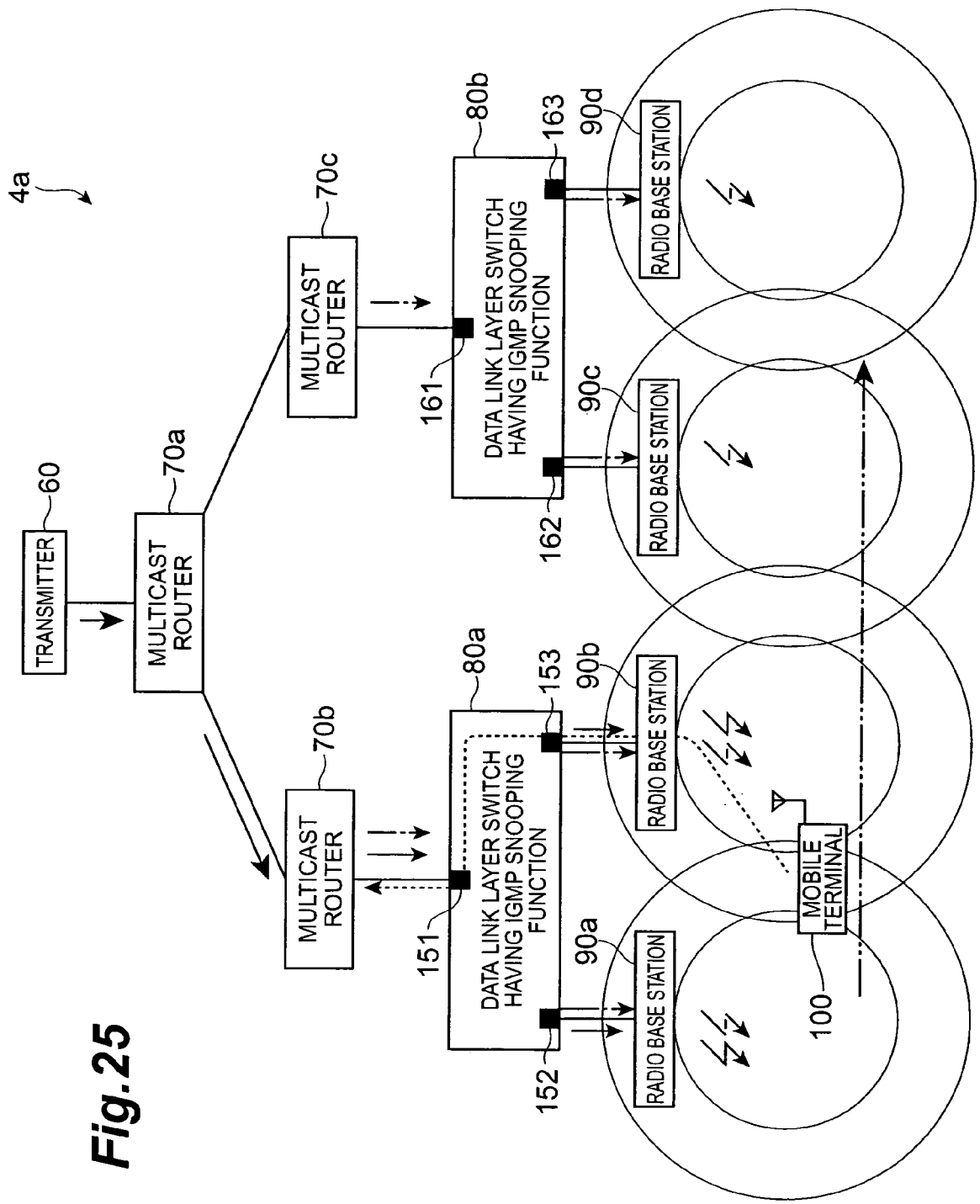
FIG. 25 is a view showing the configuration of the mobile communication system according to the fourth embodiment of the invention.

Since the mobile terminal 100 is a member of the multicast group G, when it receives the presence check request, it transmits a path establishing request through the port 153 of the data link layer switch 80a within a maximum response time as indicated by the arrow in a dotted line in FIG. 25. For simplicity, the path establishing request may alternatively be transmitted after the above-described request for withdrawal from the multicast group G in succession.

Figure 26:
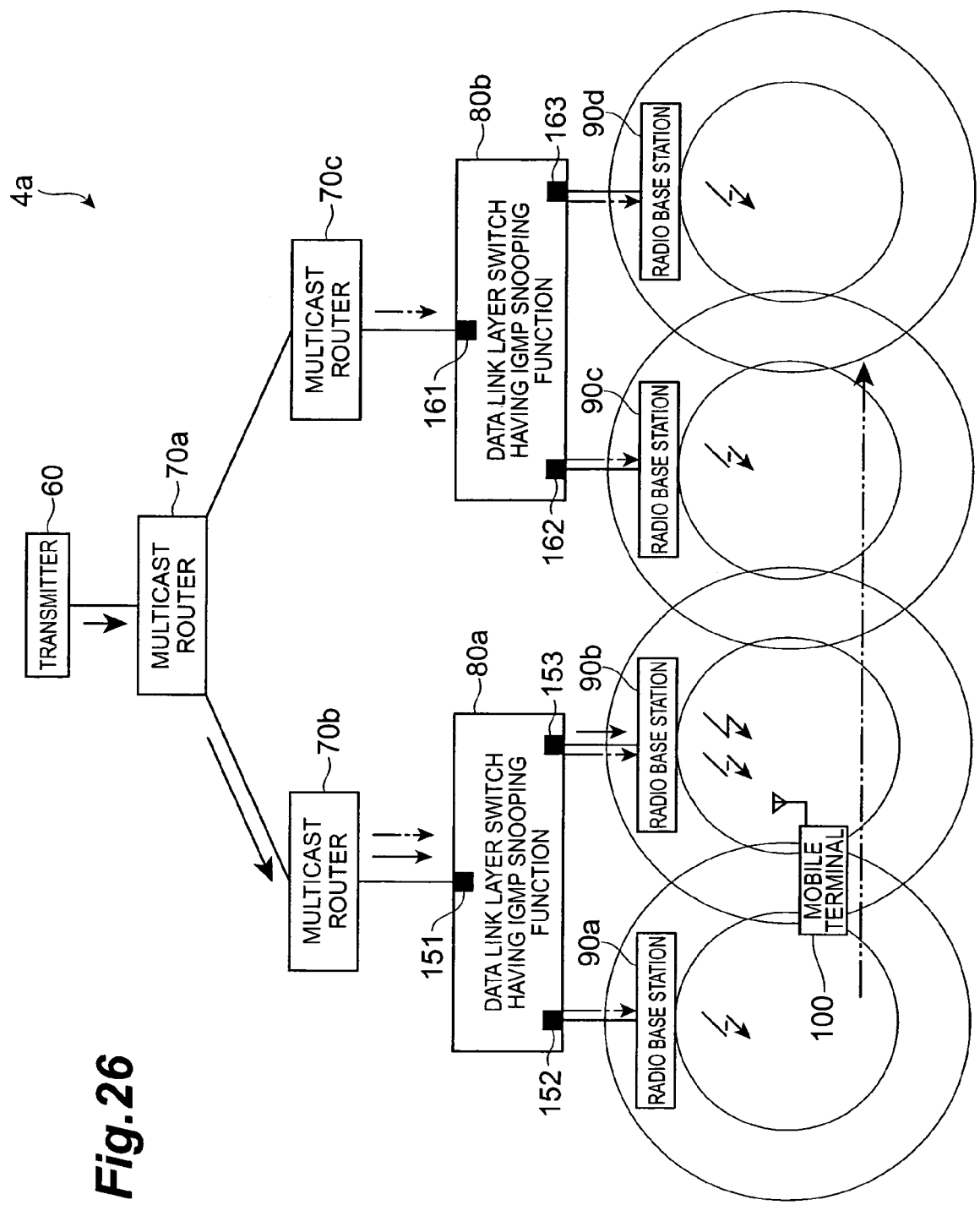
FIG. 26 is a view showing the configuration of the mobile communication system according to the fourth embodiment of the invention.

A distribution path reconfiguring unit (not shown) of the data link layer switch 80a records only the port 153 which has a response within the maximum response time described in the presence check request in the multicast distribution management table and does not record the port 152 which has previously been listed on the distribution table. Therefore, multicast packets addressed to the multicast group G will be thereafter distributed only to the port 153 as shown in FIG. 26.

Thus, the mobile terminal 100 can receive multicast packets immediately after it moves, and no multicast packet will be distributed to the path in which no receiver exists as a result of the movement. Therefore, multicast packets can be distributed only to paths in which receivers exist, and this allows efficient utilization of the band. When another receiver has existed downstream of the radio base station 90a, the receiver transmits a path establishing request in response to the presence check request from the multicast router 70b. Thus, there is no possibility that a multicast distribution path is deleted by mistake in the presence of a receiver.

Figure 27:
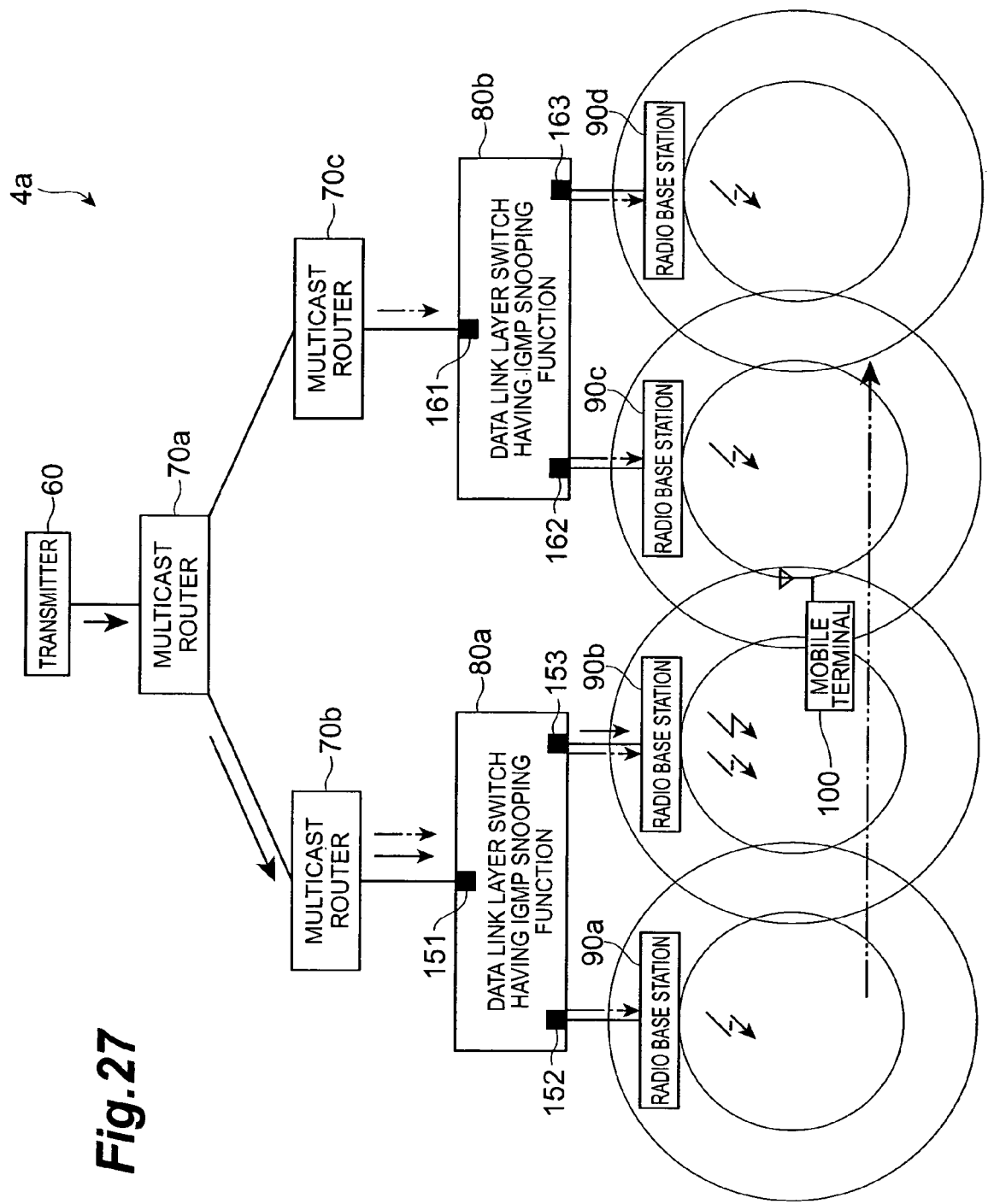
FIG. 27 is a view showing the configuration of the mobile communication system according to the fourth embodiment of the invention.

When the mobile terminal 100 further moves to a position which is in the reach of electric waves from both of the radio base stations 90b and 90c as shown in FIG. 27, the mobile terminal becomes able to receive advertisement packets from the multicast router 70c while receiving multicast packets through the radio base station 90b, and the router detection unit 1004 detects the presence of the multicast router 70c. Since the multicast router 70c has not recorded in the recording unit 1005 as a multicast router which has already established a path, the connection strength determination unit 1003 determines the strength of connection with the current radio base station 90b. In the state shown in FIG. 27, the mobile terminal 100 is present in an area in which the strength of connection with the radio base station 90b is equal to or higher than a predetermined threshold, and no particular process in performed also in this case. Referring to means for detecting the presence of a multicast router at the router detection unit 1004, for example, a multicast router may manage information of the IP address of the radio base station located at an end of the LAN managed by the router itself and the IP address of a multicast router to which a radio base station adjacent to the above radio base station is connected, and the information of each of the addresses may be provided to the mobile station. That is, any means may be employed as long as the mobile terminal can detect before it moves that there is a multicast router which is connected to a radio base station adjacent to the radio base station connected to the mobile terminal and which is different from the multicast router connected to the mobile terminal.

Figure 28:
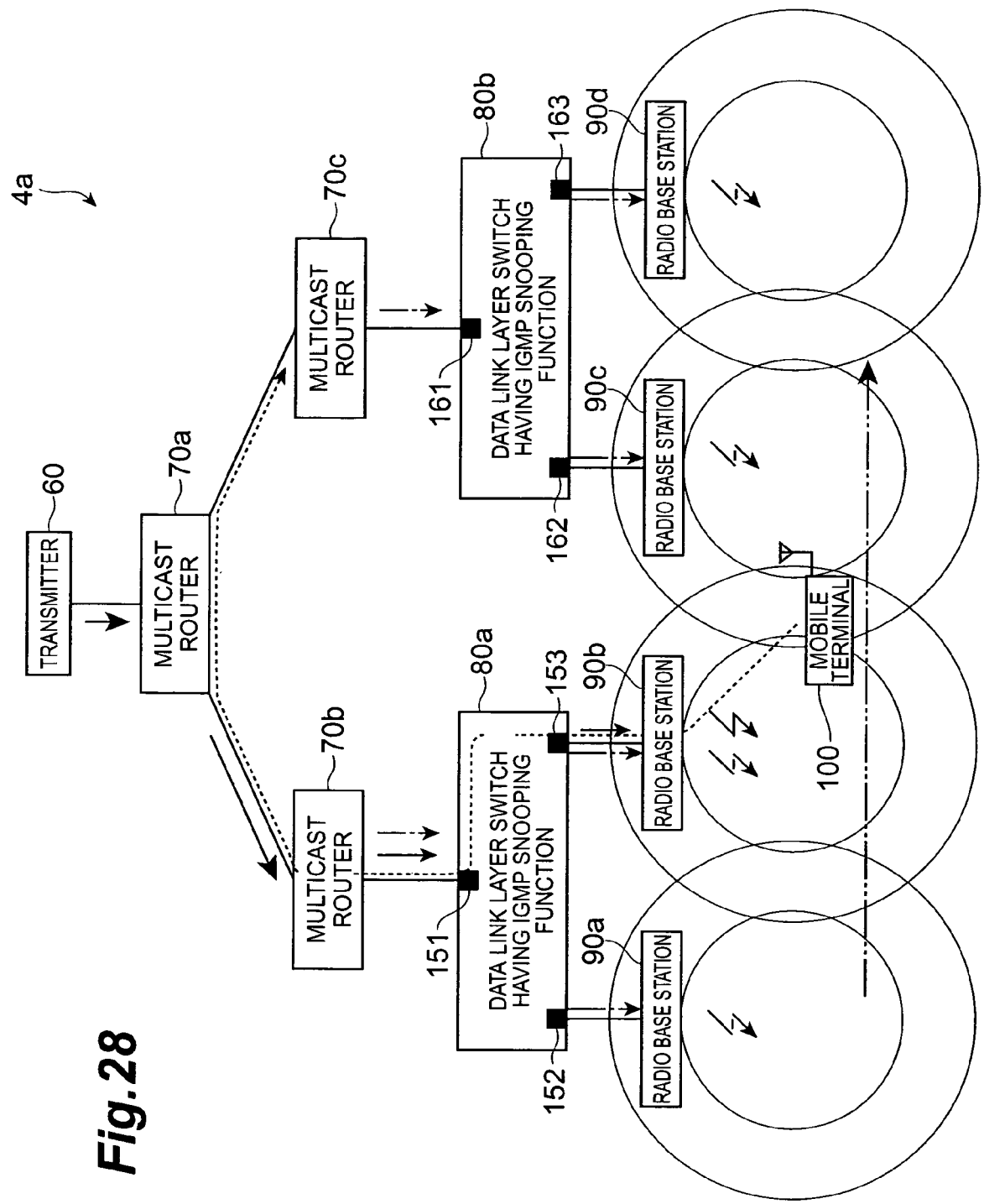
FIG. 28 is a view showing the configuration of the mobile communication system according to the fourth embodiment of the invention.

When the mobile terminal 100 further moves to an area in which the strength of connection with the radio base station 90b is lower than the predetermined threshold as shown in FIG. 28, the router detection unit 1004 detects the presence of the multicast router 70c again. At this time, the connection strength determination unit 1003 determines that the strength of connection with the current radio base station 90b is lower than the predetermined threshold. Therefore, the mobile terminal 100 determines that it is highly likely to move to a radio base station downstream of the multicast router 70c, and the transmission control unit 1008 instructs the establishment request transmission unit 1006 to transmit a path establishing request to the multicast router 70c. Specifically, as indicated by the arrow in a dotted line in FIG. 28, a path establishing request is transmitted to establish a multicast distribution path up to the multicast router 70c before the mobile terminal 100 moves. At this time, since a path establishing request can normally be transmitted only to the multicast router to which the requester itself is connected directly, the path establishing request is transmitted by encapsulating it into a unicast packet addressed to the multicast router 80b, for example. Then, the mobile terminal 100 records the multicast router 70c in the recording unit 1005 as a multicast router which has already established a path. The path establishing request may be transmitted using methods other than the method involving encapsulation. For example, the path establishing request may be directly transmitted to the multicast router 70c in a form different from that of normal packets provided that the multicast router 70c can recognize that there is a receiver requesting establishment of a path.

Figure 29:
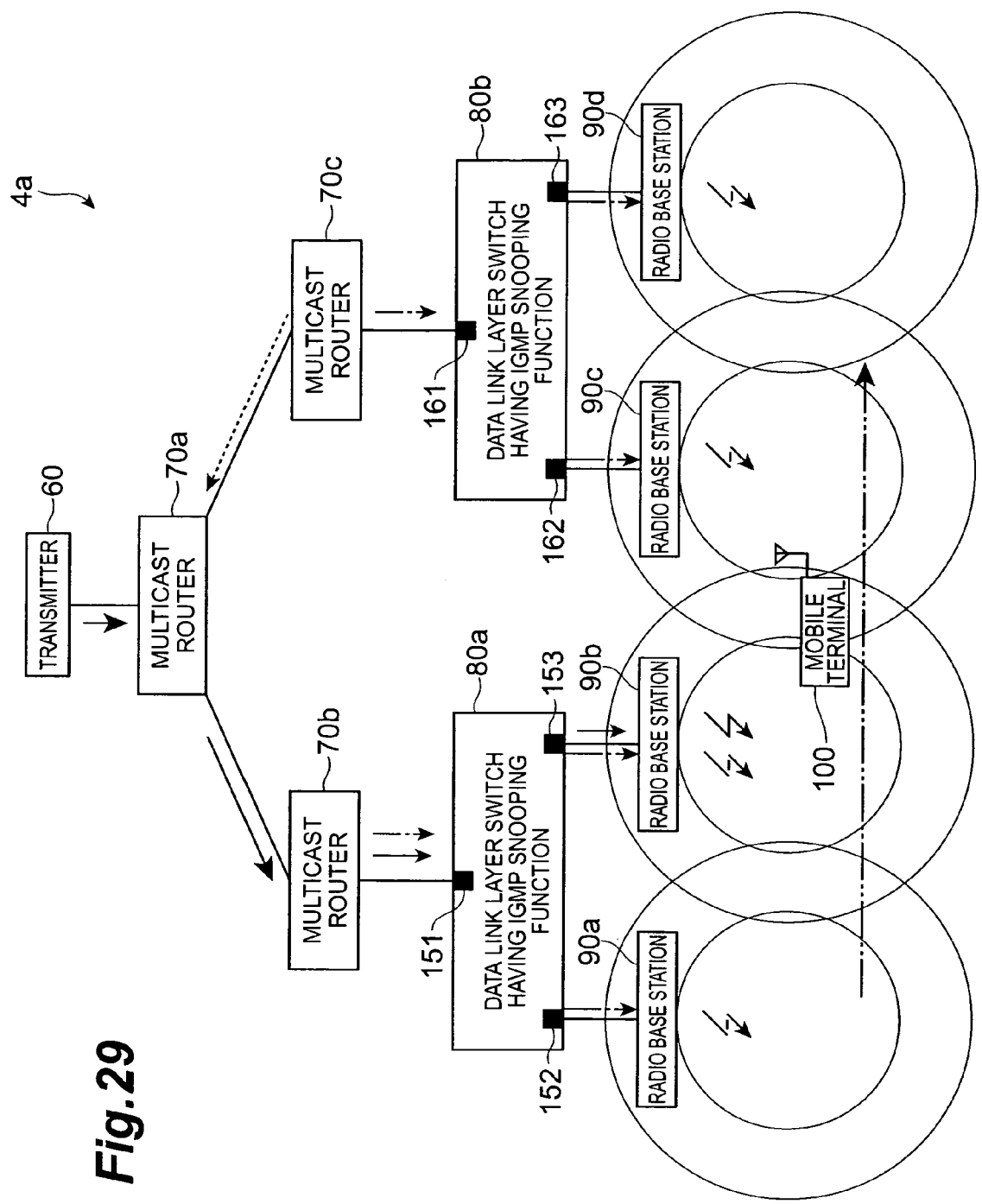
FIG. 29 is a view showing the configuration of the mobile communication system according to the fourth embodiment of the invention.
Figure 30:
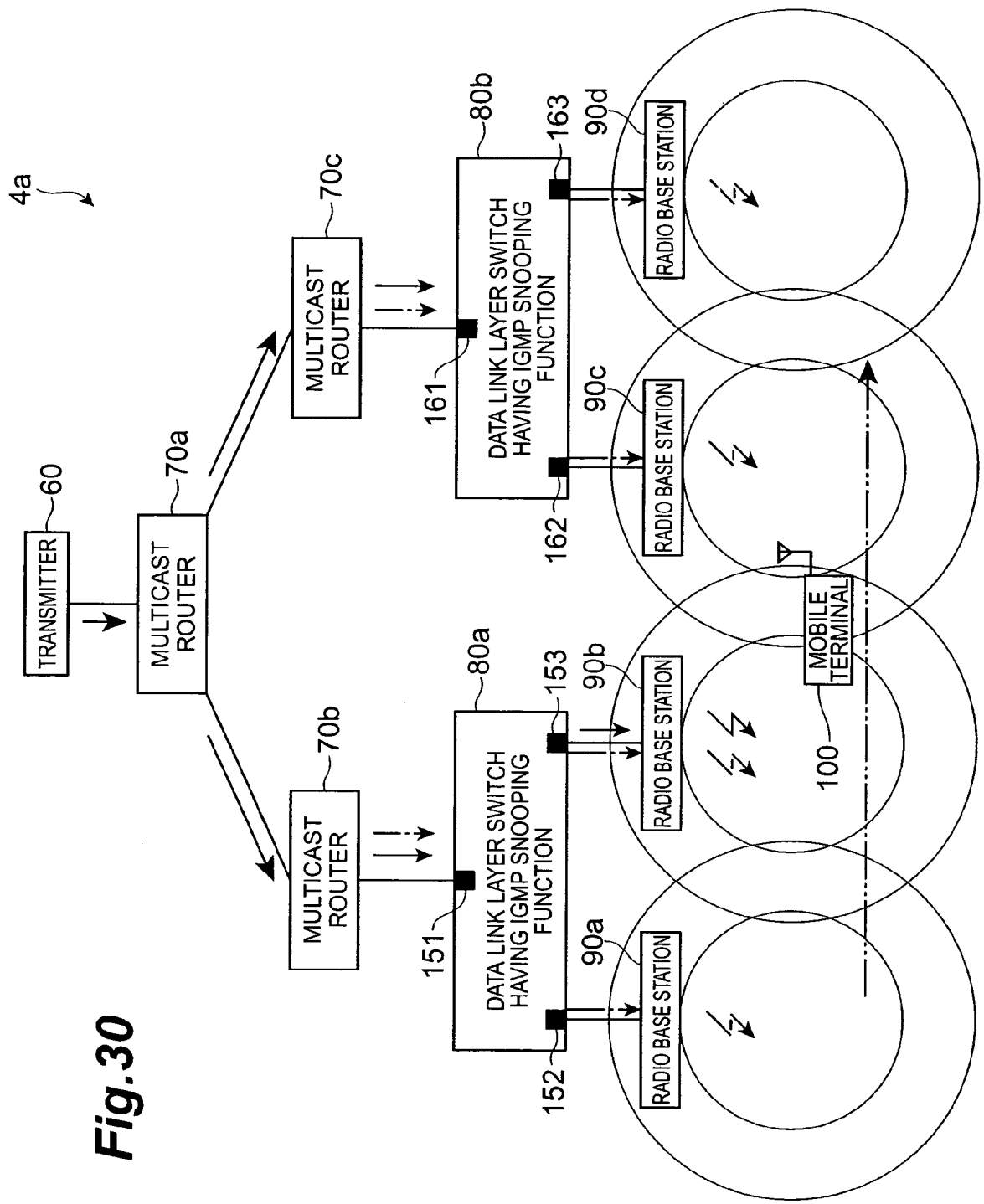
FIG. 30 is a view showing the configuration of the mobile communication system according to the fourth embodiment of the invention.

Since no route for distribution addressed to the multicast group G has been established at the multicast router 70c when the path establishing request is received, the multicast router 70c adds a description that it will distribute the requested multicast group G in its own multicast distribution path management table and transmits a path establishing request to the multicast router 70a upstream thereof as indicated by the arrow in a dotted line in FIG. 29. Thus, as shown in FIG. 30, packets addressed to the multicast group G are distributed to LANs downstream of the multicast router 70c. Since the data link layer switch 80b has received no path establishing request from receivers downstream thereof, it distributes packets addressed to the multicast group G to none of its ports, and no packet addressed to the multicast group G is transmitted to the radio base stations 90c and 90d. Thus, a multicast distribution path up to the multicast router 70c to which the mobile terminal 100 will move prior to the movement without any wasteful use of the band, and a delay time preceding the reception of multicast packets after the movement can be reduced. While the data link layer switch 80b stops distribution of packets addressed to the multicast group G in the above description, the invention is not limited to this mode. For example, since the multicast router 70c located upstream has received only the path establishing request from the mobile terminal 100 and has not received no path establishing request from receivers downstream thereof, the multicast router 70c may stop distribution of packets addressed to the multicast group G.

Figure 31:
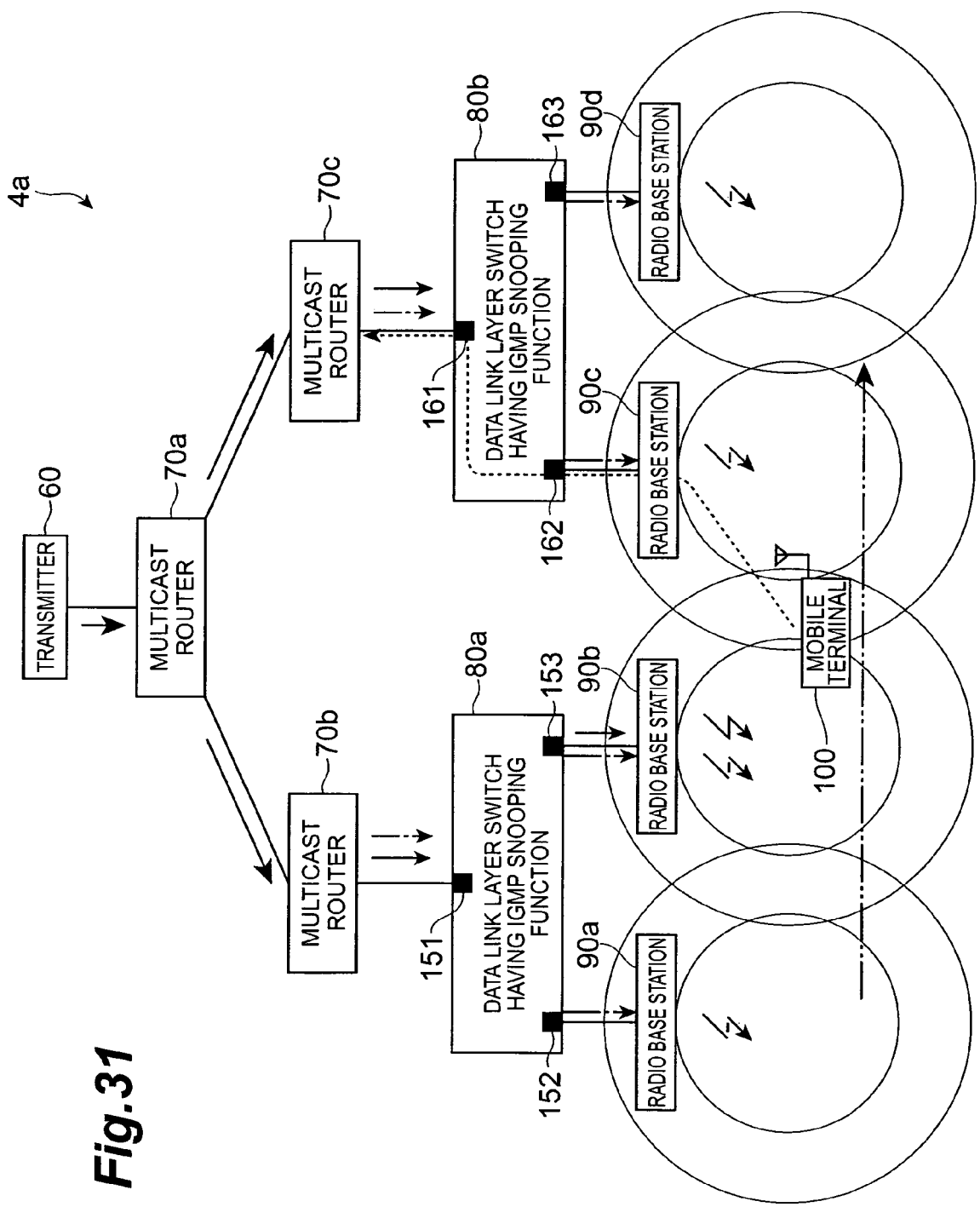
FIG. 31 is a view showing the configuration of the mobile communication system according to the fourth embodiment of the invention.
Figure 32:
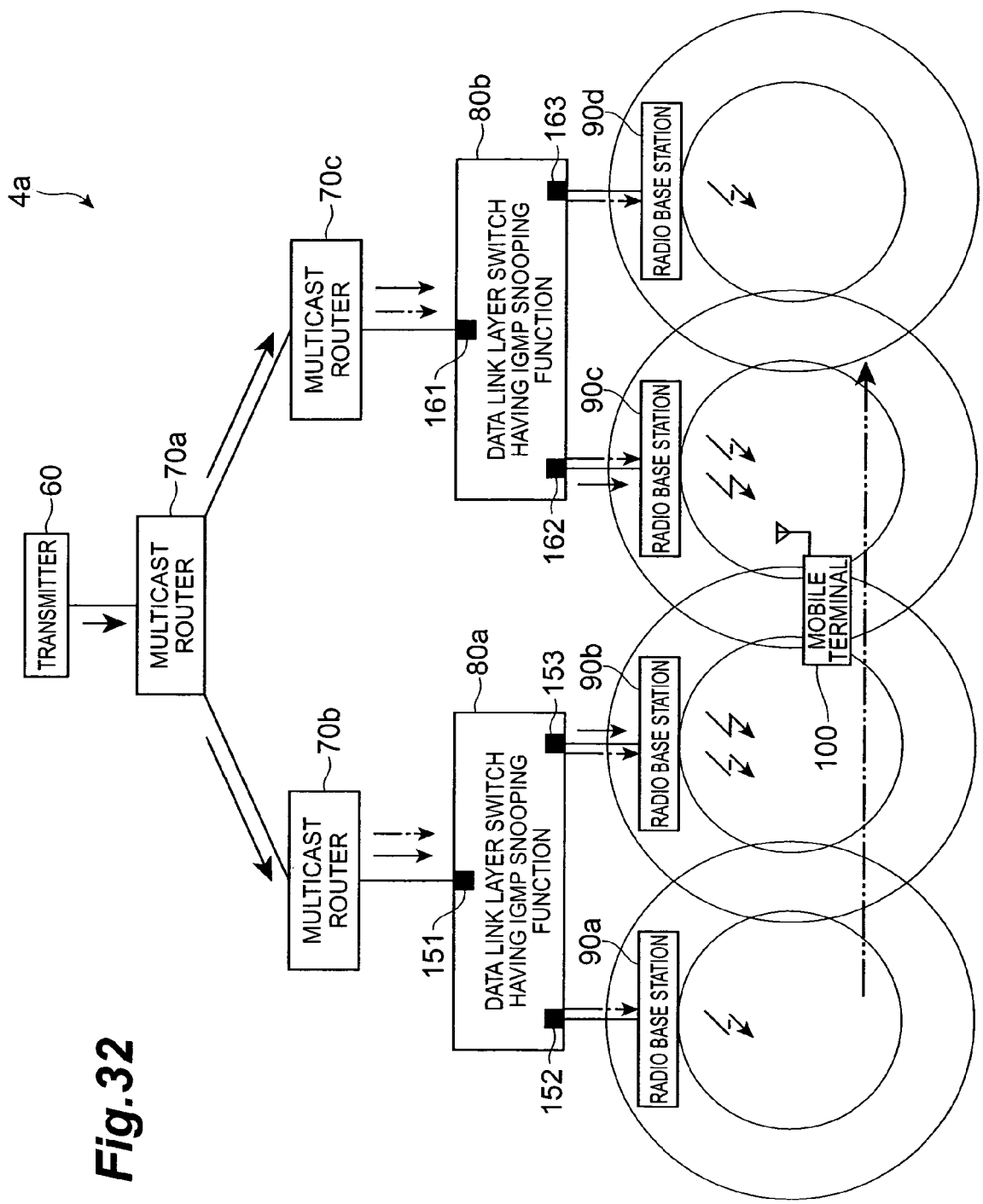
FIG. 32 is a view showing the configuration of the mobile communication system according to the fourth embodiment of the invention.

When the radio base station connected to the mobile terminal 100 is switched from the radio base station 90b to the radio base station 90c as a result of a further movement of the mobile terminal 100, as indicated by the arrow in a dotted line in FIG. 31, the mobile terminal 100 transmits a path establishing request through the radio base station 90c to receive multicast packets addressed to the multicast group G at the radio base station 90c at the new location. When the data link layer switch 80b receives the path establishing request at a port 162, it recognizes that a receiver requesting reception of the multicast group G has appeared downstream of the port 162 from the contents of the path establishing request. It records that there is a need for distributing multicast packets addressed to the multicast group G in the multicast distribution management table and transfers the received path establishing request to the multicast router 70c through a port 161. Since multicast distribution path has already established at the multicast router 70c, a multicast distribution path to the mobile terminal 100 is established only through a process of switching the data link layers. When a packet addressed to the multicast group G arrives at the port 161, since the data link layer switch 80b distributes the packet to the port 162, the mobile terminal 100 can receive the packet addressed to the multicast group G as shown in FIG. 32.

Figure 33:
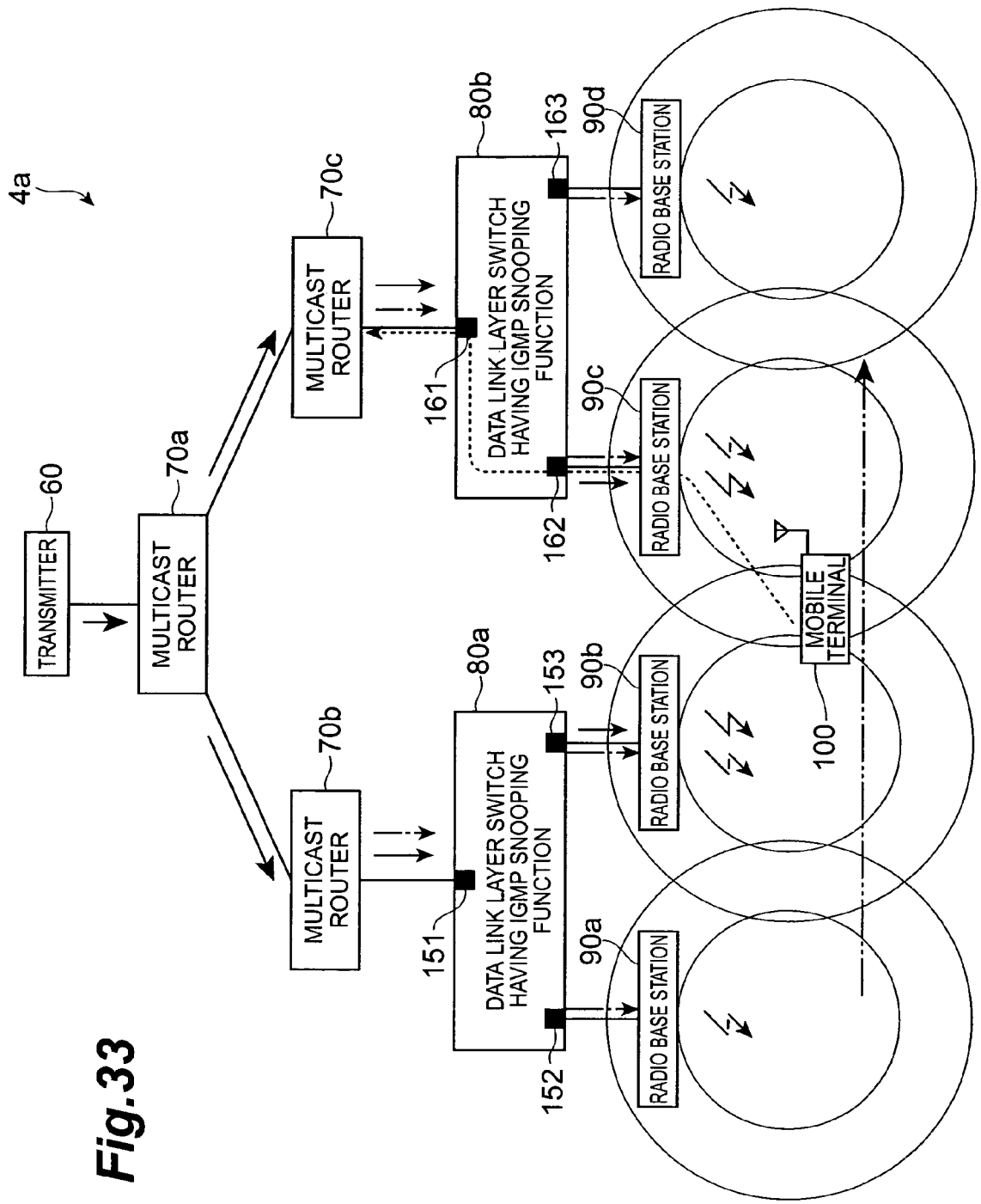
FIG. 33 is a view showing the configuration of the mobile communication system according to the fourth embodiment of the invention.
Figure 34:
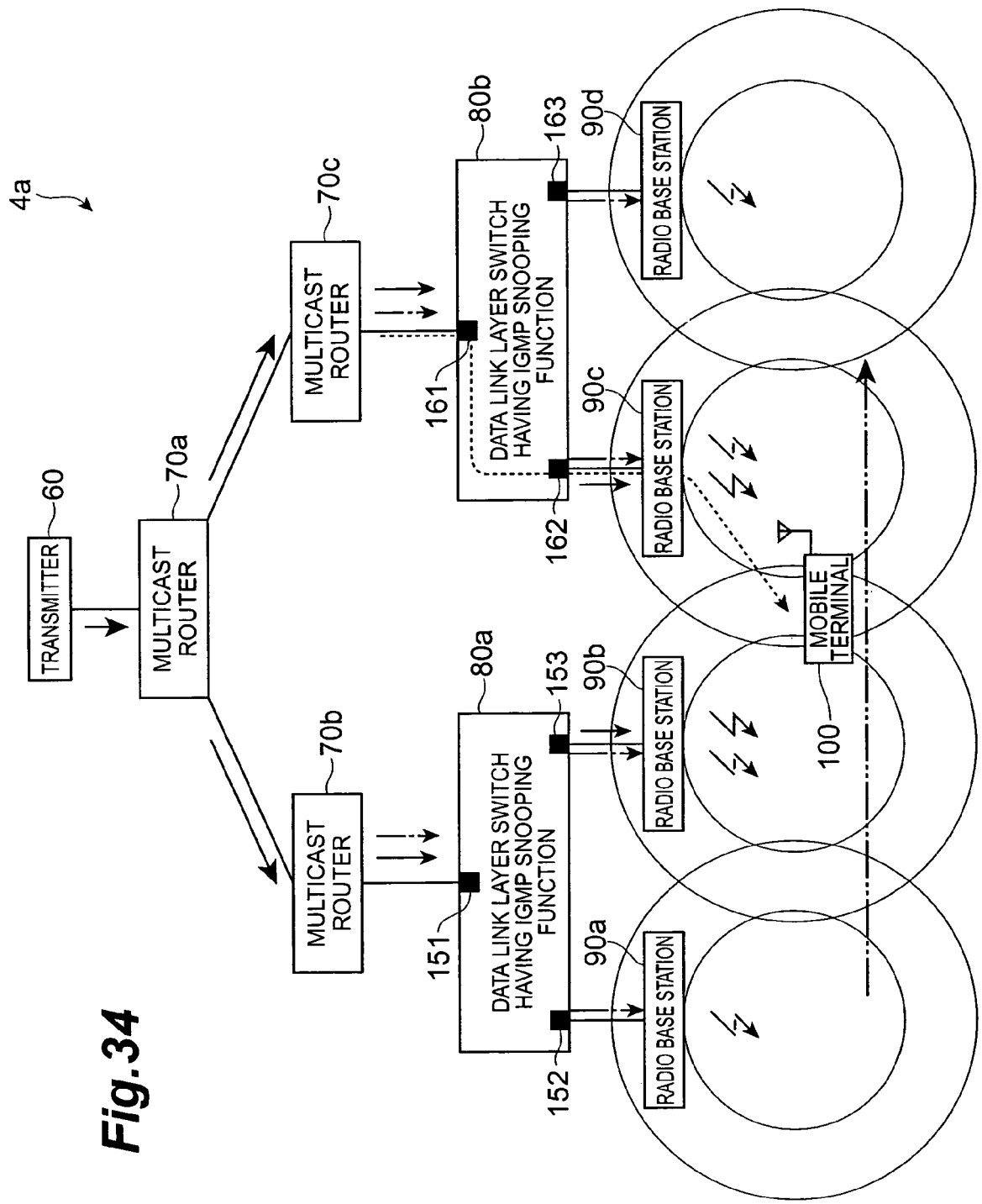
FIG. 34 is a view showing the configuration of the mobile communication system according to the fourth embodiment of the invention.

The mobile terminal 100 transmits an advertisement packet as indicated by the arrow in a dotted line in FIG. 33 to examine whether the multicast router upstream thereof has been switched from the previous multicast router. At this time, since the multicast router 70c transmits an advertisement packet in response as indicated by the arrow in a dotted line in FIG. 34, the router switching detection unit 1002 detects that the upstream multicast router has been switched from the multicast router 70b to the multicast router 70c.

Figure 35:
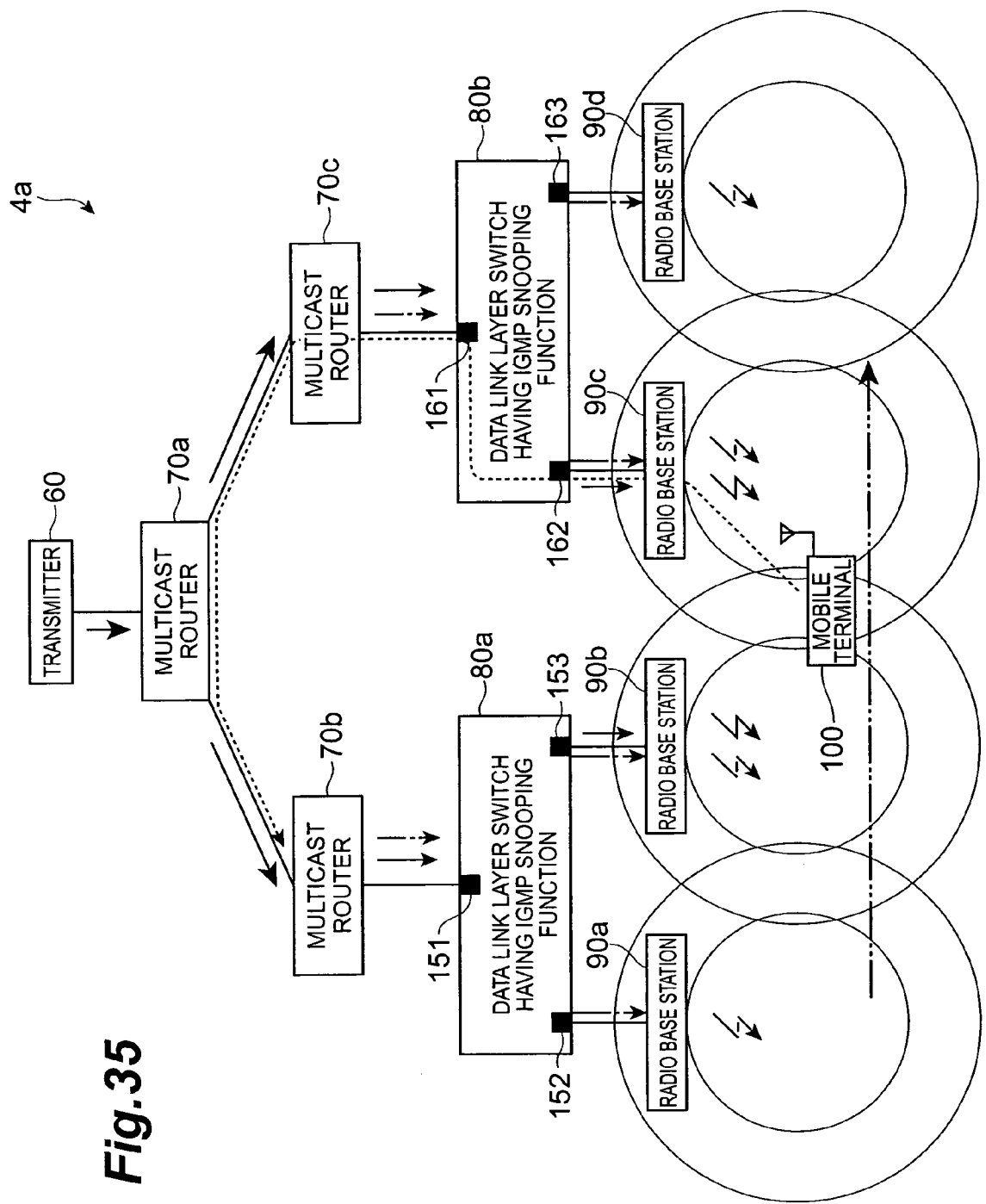
FIG. 35 is a view showing the configuration of the mobile communication system according to the fourth embodiment of the invention.

Therefore, as indicated by the arrow in a dotted line in FIG. 35, the mobile terminal 100 transmits a request for withdrawal from the multicast group to the multicast router 70b and deletes the multicast router 70b from multicast routers which have already established a path. At this time, since a request for withdrawal from a multicast group can be transmitted only to the multicast router to which the requester itself belongs, the request for withdrawal from the multicast group is transmitted by encapsulating it into a unicast packet addressed to the multicast router 70b, for example. In addition to this method, for example, a packet requesting withdrawal from the multicast group in a form different from that of normal packets may be directly transmitted to the multicast router 70b provided that the multicast router 70b can recognize the presence of a receiver which wishes to withdraw from the multicast group.

Figure 36:
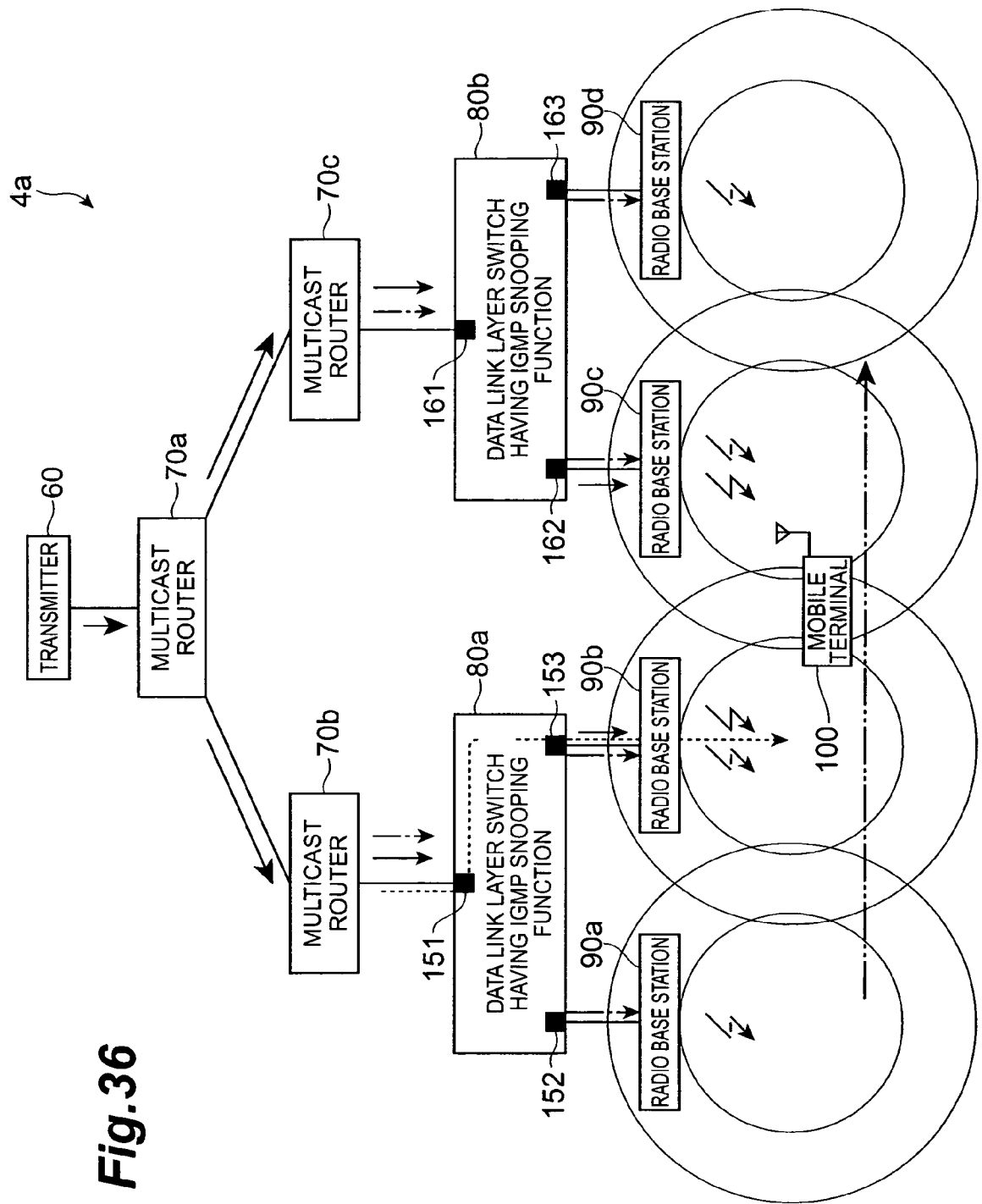
FIG. 36 is a view showing the configuration of the mobile communication system according to the fourth embodiment of the invention.
Figure 37:
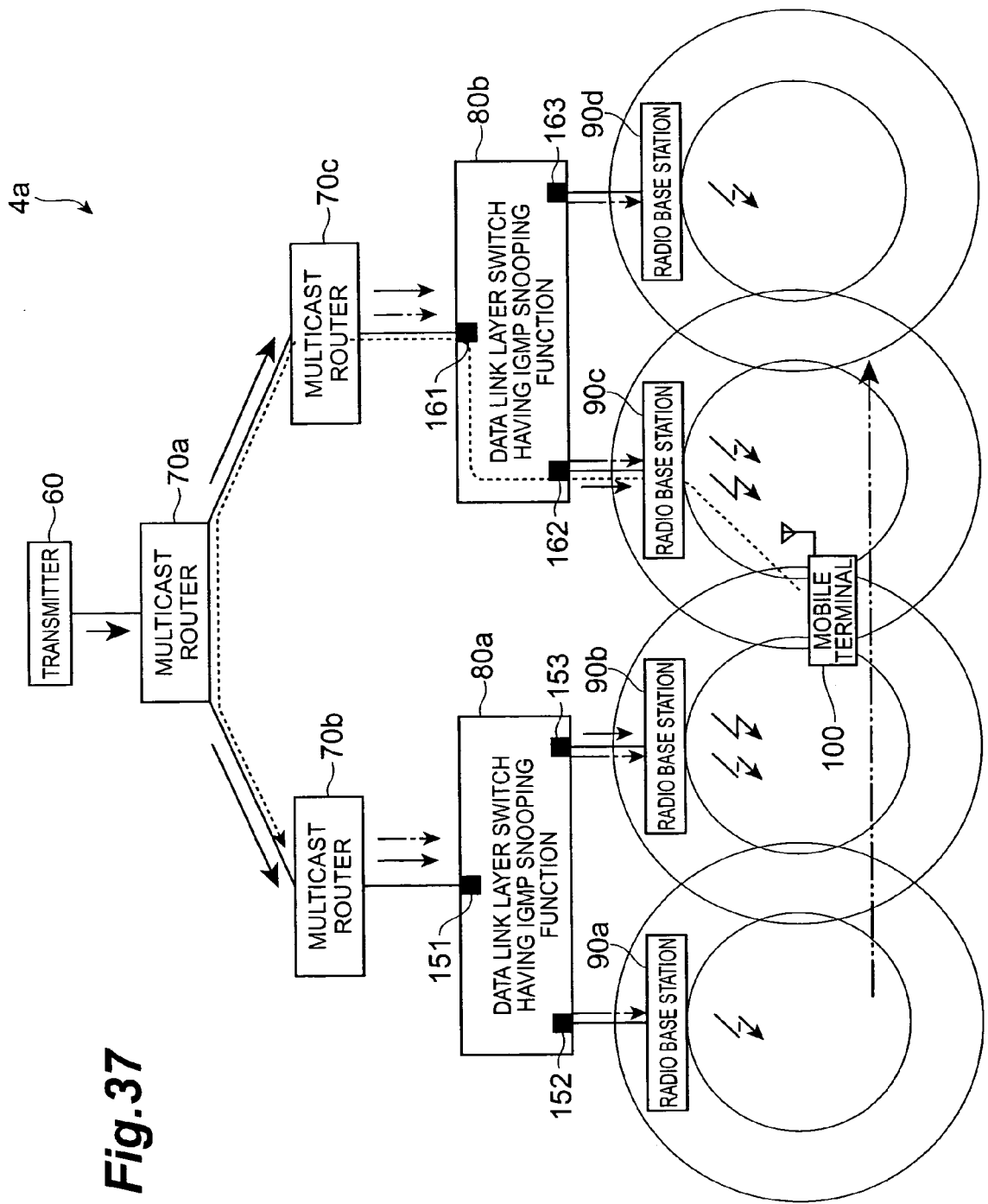
FIG. 37 is a view showing the configuration of the mobile communication system according to the fourth embodiment of the invention.

Upon receipt of the request for withdrawal from the multicast group, the multicast router 70b transmits a presence check request to check whether there is any other receiver, as indicated by the arrow in a dotted line in FIG. 36. Upon receipt of the presence check request, the mobile terminal 100 transmits a path establishing request to the multicast router 70b within a maximum response time as indicated by the arrow in a dotted line in FIG. 37 and records the multicast router 70b as a multicast router which has established a path again. While the path establishing request may be transmitted in response to the presence check request from the multicast router 70b, it may alternatively be transmitted after the above-described request for withdrawal from the multicast group in succession.

Figure 38:
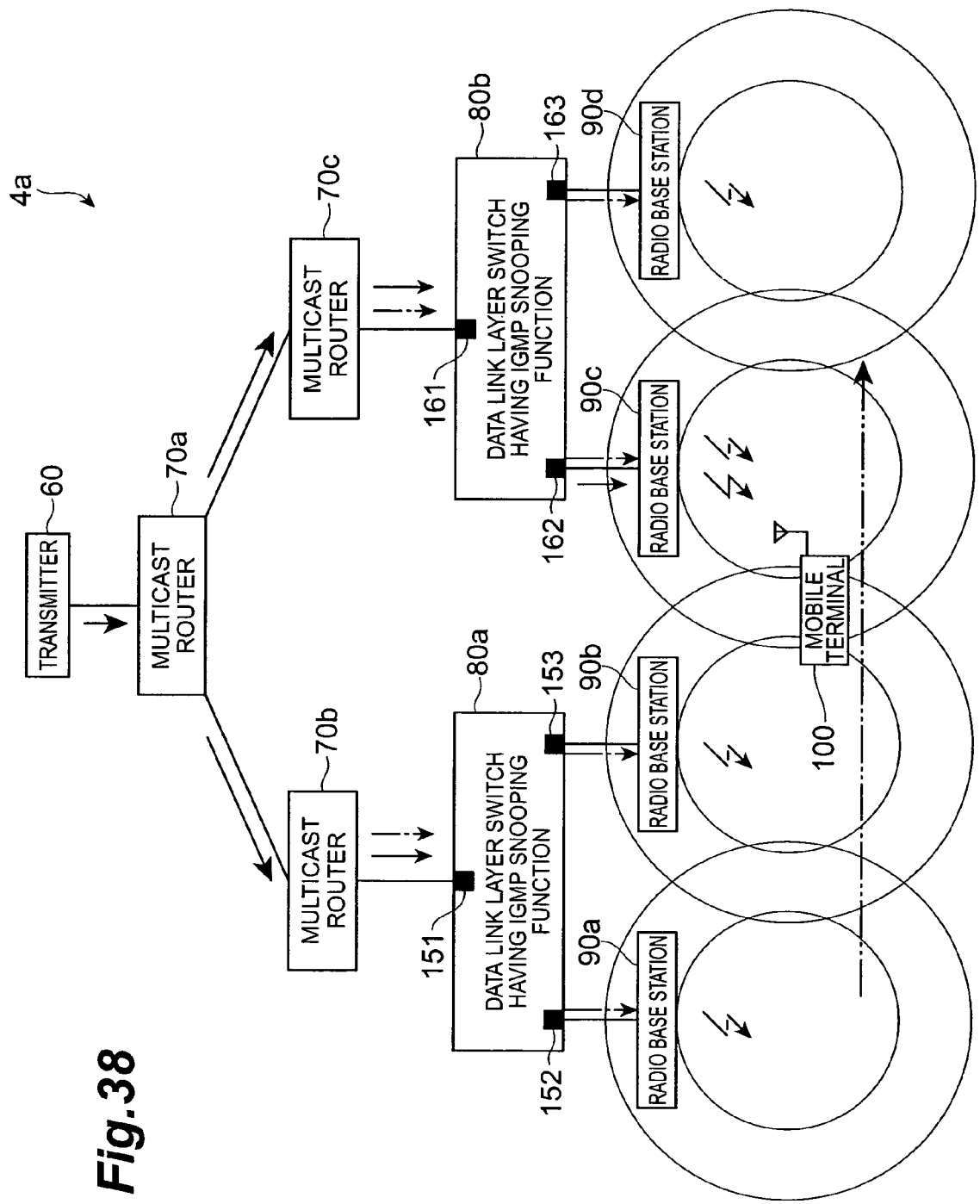
FIG. 38 is a view showing the configuration of the mobile communication system according to the fourth embodiment of the invention.

Since there is no multicast receiver downstream of the multicast router 70b, the presence check request is not responded to by a path establishing request from downstream, and the data link layer switch 80a delete the multicast distribution paths maintained by itself after the maximum response time elapses. While the multicast router 70b maintains a path for distribution addressed to the multicast group G because it has received the path establishing request from the mobile terminal 100. Therefore, as shown in FIG. 38, packets addressed to the multicast group G will thereafter be distributed from the multicast router 70b, but they will not be distributed downstream of the data link layer switch 80a. In this case, since the request for withdrawal is transmitted to the multicast router 70b and the path establishing request is thereafter transmitted to the same, it is possible to omit the process of re-recording the multicast router 70b as a multicast router which has established a path after deleting it once, and the recording unit 1005 may stop updating the record therein during the process.

In the above-described embodiment, the mobile terminal 100 transmits a request for withdrawal to the multicast router 70b and thereafter transmits a path establishing request to deletes only the multicast distribution path of the data link layer switch 80a and to maintain the multicast distribution path of the multicast router 70b. What is required is to cause the multicast router 70b to transmit a presence check request and to maintain the multicast distribution path of the multicast router 70b. For example, a special packet may be transmitted to request the multicast router 70b to transmit a presence check request and to maintain the multicast distribution path.

Thus, the mobile terminal 100 becomes able to receive multicast packets immediately after a movement even in a case wherein both of the radio base station and the multicast router connected to the same are switched, and no multicast packet will be distributed to paths downstream of the multicast router on which no receiver exists any more. It is therefore possible to distribute multicast packets only to paths in which receivers exist, thus allowing efficient utilization of the band. In this case again, when a receiver exists downstream of the multicast router 70b, since the receiver transmits a path establishing request in response to the presence check request from the multicast router 70b, the multicast distribution path will not be deleted by mistake in the presence of the receiver. In cases where the mobile terminal 100 changes its direction and moves into the area in which the strength of connection with the radio base station 90b is equal to or higher than the predetermined threshold again, since the multicast router 70b has maintained a multicast distribution path, the mobile terminal 100 can receive multicast packets immediately after the movement.

Figure 39:
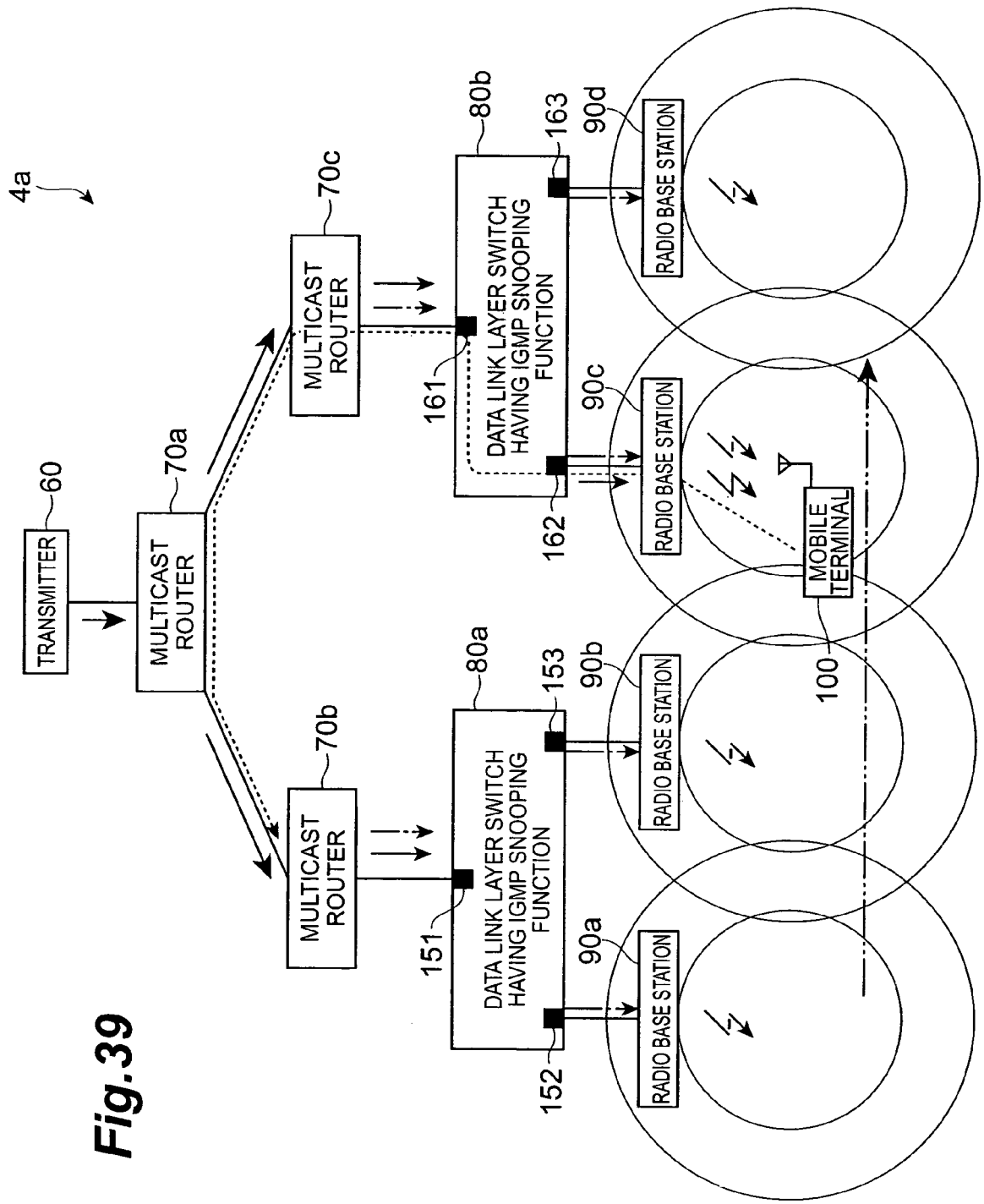
FIG. 39 is a view showing the configuration of the mobile communication system according to the fourth embodiment of the invention.

When the mobile terminal 100 moves further, and the connection strength determination unit 1003 determines that the strength of the connection with the radio base station 90c is equal to or higher than the predetermined threshold, the transmission control unit 1008 transmits a request for withdrawal from the multicast group G to all multicast routers which have established a path excluding the multicast router 70c that is connected and deletes the identification information of the multicast routers to which the request is transmitted from the record of multicast routers which have established a path in the recording unit 1005. In the present embodiment, since the multicast router 70b is the only multicast router that is not connected among the multicast routers which have established a path, a request for withdrawal from the multicast group is transmitted to the multicast router 70b as indicated by the arrow in a dotted line in FIG. 39.

Figure 40:
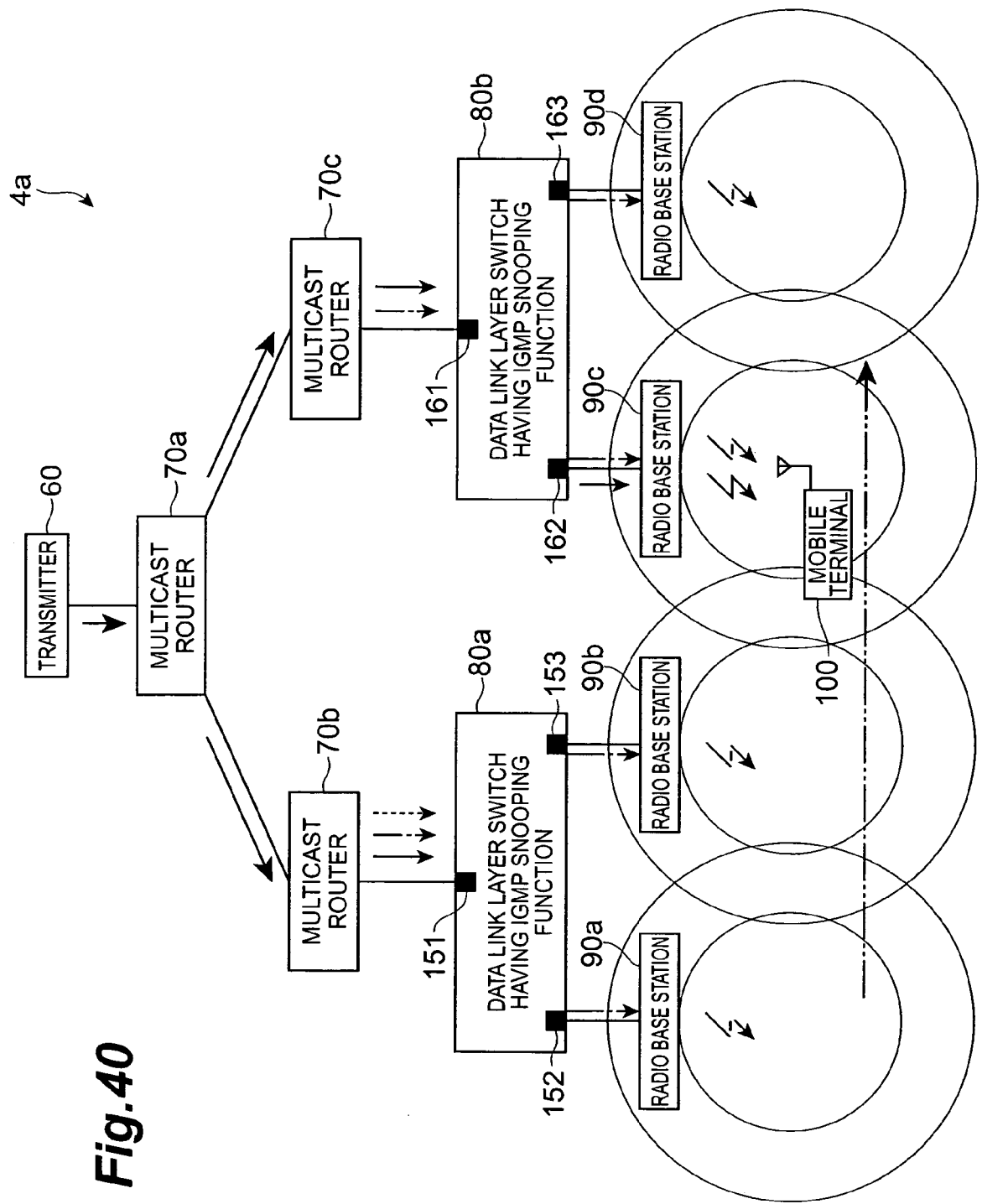
FIG. 40 is a view showing the configuration of the mobile communication system according to the fourth embodiment of the invention.

Upon receipt of the request for withdrawal from the multicast group, the multicast router 70b transmits a presence check request to check whether there is other receiver, as indicated by the arrow in a dotted line in FIG. 40. Since there is no multicast receiver downstream of the multicast router 70b, the presence check request is not responded to, and the multicast router 70b deletes the multicast distribution path that it has maintained after the maximum response time elapses. Even when the mobile terminal 100 receives the presence check request and the router detection unit 1004 detects the presence of the multicast router 70b, no path establishing request is transmitted because the strength of connection with the radio base station 90c connected to the terminal is equal to or higher than the predetermined threshold.

Figure 41:
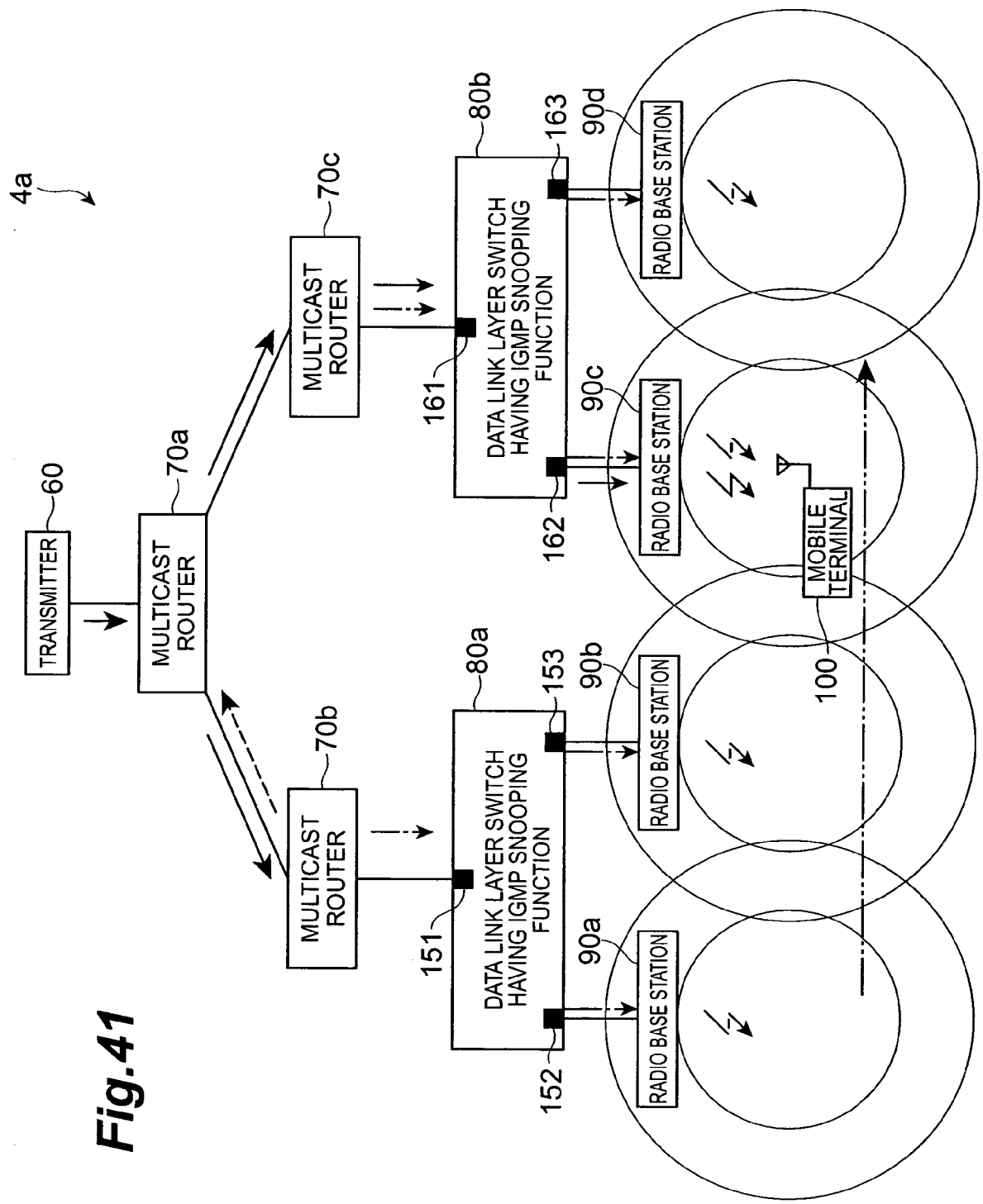
FIG. 41 is a view showing the configuration of the mobile communication system according to the fourth embodiment of the invention.

Thereafter, as indicated by the arrow in a dotted line in FIG. 41, the multicast router 70b transmits a request for deletion of multicast distribution paths to the multicast router 70a.

Figure 42:
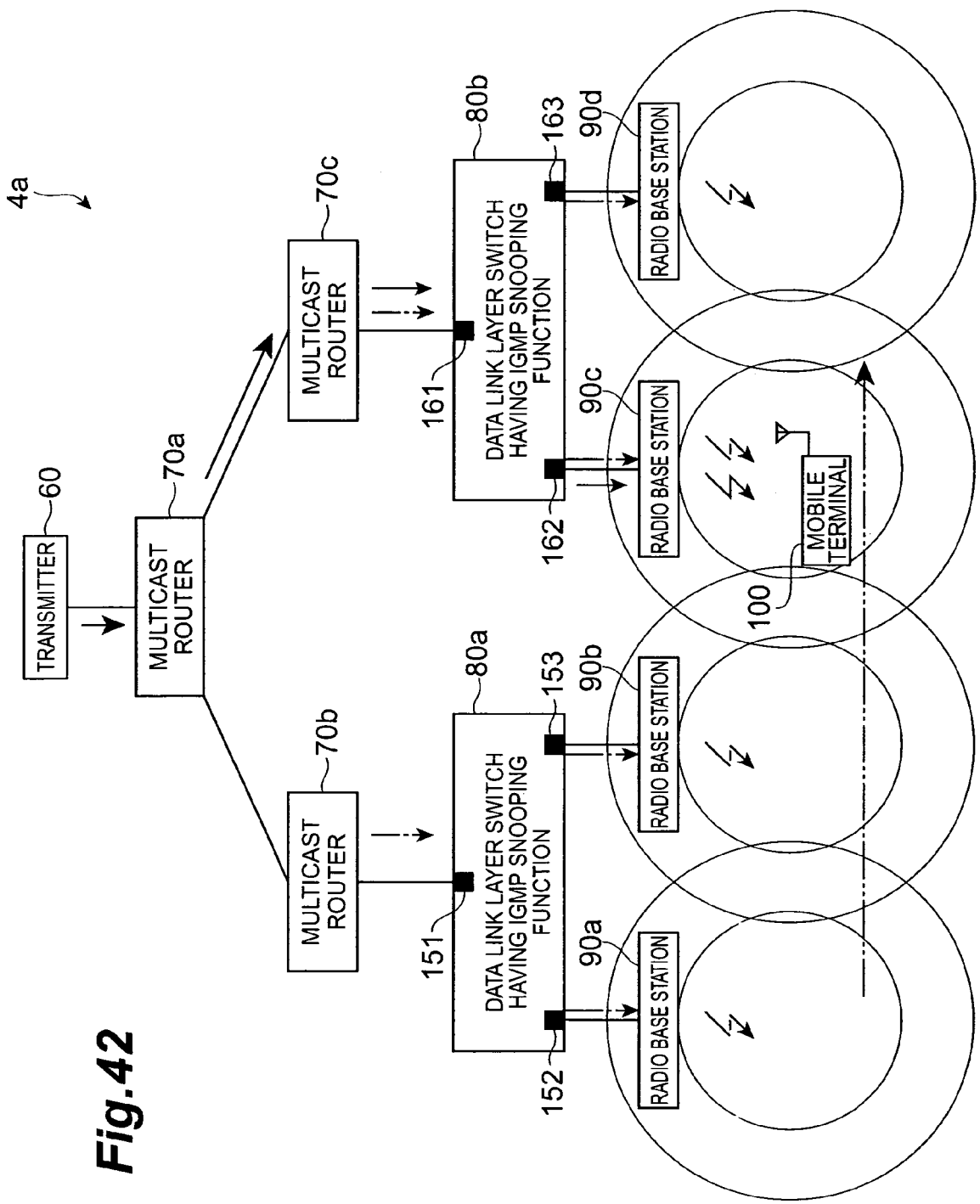
FIG. 42 is a view showing the configuration of the mobile communication system according to the fourth embodiment of the invention.

Upon receipt of the request for deletion of multicast distribution paths from the multicast router 70b, the multicast router 70a deletes multicast distribution paths associated with the path in which the multicast router 70b exists and stops distribution of multicast packets. Finally, multicast packets are distributed to the path in which the mobile terminal 100 exists as shown in FIG. 42.

Figure 44:
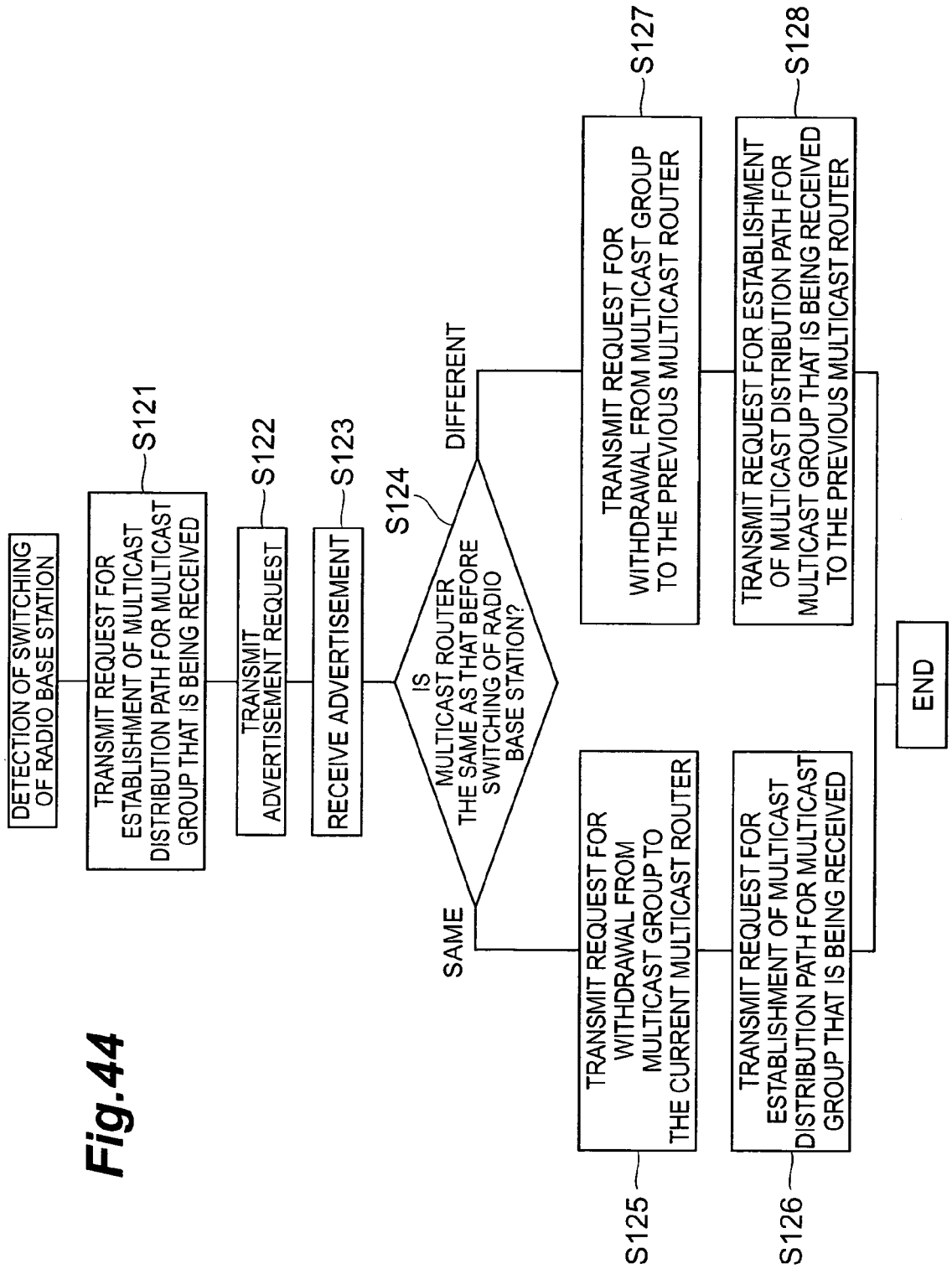
FIG. 44 is a flow chart showing a mobile communication method according to the fourth embodiment of the invention.
Figure 45:
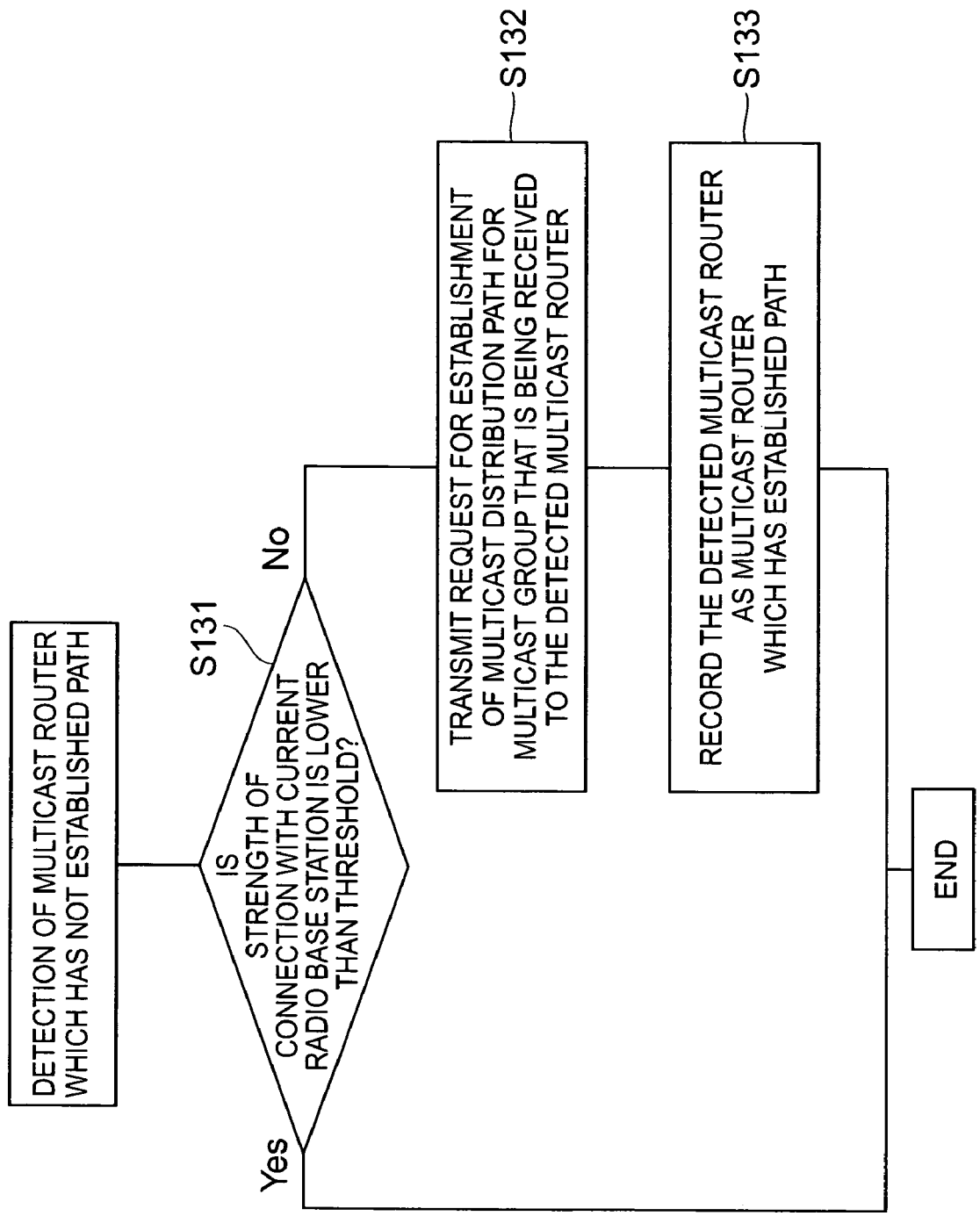
FIG. 45 is a flow chart showing the mobile communication method according to the fourth embodiment of the invention.
Figure 46:
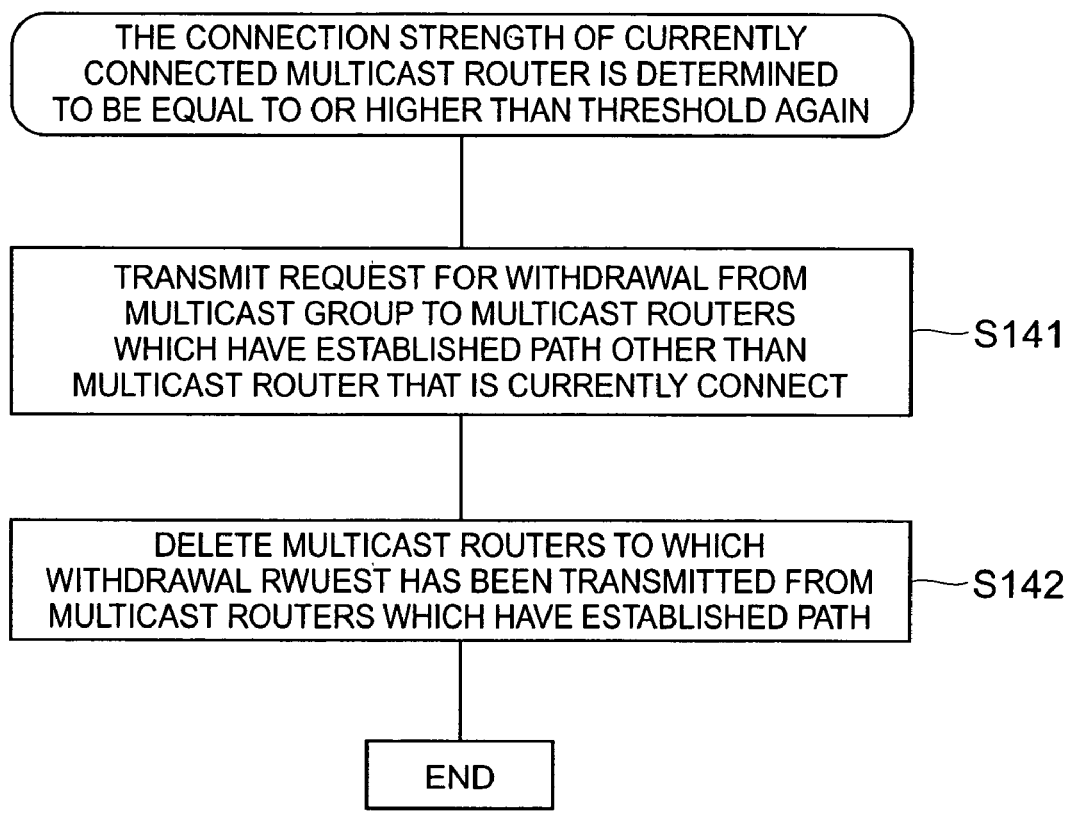
FIG. 46 is a flow chart showing the mobile communication method according to the fourth embodiment of the invention.

FIGS. 44, 45, and 46 are flow charts showing operations of the mobile terminal 100 shown in FIGS. 17 to 42. When the mobile terminal 100 detects that its radio base station has been switched, it transmits a path establishing request through the radio base station to which the switching has occurred (step S121) Next, the mobile terminal 100 transmits an advertisement request packet to the multicast router upstream thereof (step S122) and receives an advertisement packet as a response from the multicast router (step S123). Then, the mobile terminal 100 determines whether the multicast router connected to the same has been switched based on identification information included in the received advertisement packet (step S124). If the multicast router has not been switched, a request for withdrawal from the multicast group is transmitted to the current multicast router to delete the multicast distribution path to the previous radio base station (step S125). Thereafter, a path establishing request for the multicast distribution path is transmitted again (step S126). If the connected multicast router has been switched, a request for withdrawal from the multicast group is transmitted to the previous multicast router to delete the multicast distribution path at the previous multicast router (step S127). Thereafter, a path establishing request for the multicast distribution path is transmitted again to the previous multicast router (step S128).

When the mobile terminal 100 detects the presence of a multicast router which has not established a path, it determines whether the strength of connection with the radio base station connected to the same is equal to or higher than the predetermined threshold (step S131). If the connection strength is equal to or higher than the predetermined threshold, no particular process is performed. If the connection strength is lower than the threshold, a path establishing request for a multicast distribution path is transmitted to the detected multicast router (step S132), and the identification information of the detected multicast router is recorded as a multicast router which has already established a path (step S133).

When the mobile terminal 100 detects that the strength of connection with the radio base station in connection therewith has become equal to or higher than the predetermined threshold again after the above-described steps, it transmits a request for withdrawal from the multicast group to multicast routers which have established a path other than the multicast router connected to the same (step S141). Then, the mobile terminal 100 deletes the identification information of the multicast routers to which the withdrawal request has been transmitted from multicast routers which have established a path (step S142).

When the mobile terminal 100 follows those flow charts, it can start receiving multicast packets immediately after moving, and the multicast distribution path before the movement can be appropriately deleted to utilize the band efficiently. Further, since a multicast router transmits a presence check request before it deletes multicast distribution paths, no multicast distribution path will be deleted by mistake. Further, reception of multicast packets can be started immediately after a movement even when the radio base station is switched again to the radio base station downstream of the previous multicast router after switching of multicast routers.

In the above description, when the mobile terminal 100 detects switching of the radio base station, it first transmits a path establishing request and thereafter examines whether the multicast router has changed. The order of the operations may be reversed.

It is not essential that the threshold for connection strength used for determining whether to transmit a path establishing request when the presence of a multicast router other than the multicast router in connection is equal to the threshold for connection strength used for determining whether to transmit a withdrawal request, and different thresholds may be used. It is not essential that each of the thresholds is a constant value, and they may be values which dynamically change depending on, for example, the moving speed of a mobile terminal.

Fifth Embodiment

Figure 47:
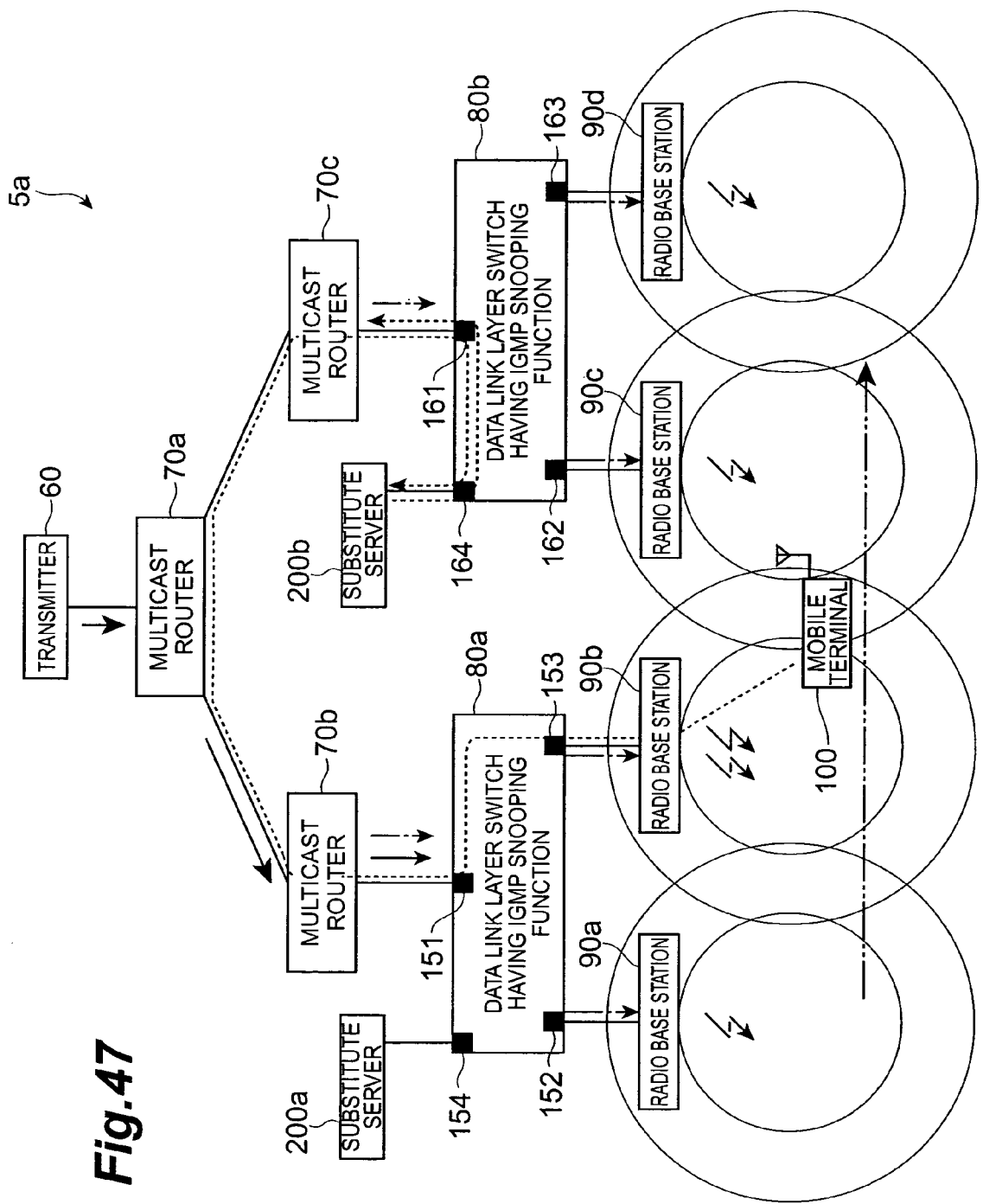
FIG. 47 is a view showing a configuration of a mobile communication system according to a fifth embodiment of the invention.

FIG. 47 is a conceptual view of a mobile communication system 5a according to a fifth embodiment of the invention. In this embodiment, substitute servers 200a and 200b which transmit a request for establishment of a path to a multicast group and a request for withdrawal from a multicast group on behalf of a mobile terminal 100 are provided downstream of multicast routers 70b and 70c. When the substitute server 200a or 200b receives a path establishing request and a request for withdrawal from a multicast group from the mobile terminal 100, it transmits a request for establishment of a path to the multicast group and a request for withdrawal from the same to the multicast router to which the server itself is connected. When an advertisement request packet is received from the mobile terminal 100, it transmits an advertisement packet in response.

In FIG. 35 described above, when the multicast router connected to the mobile terminal 100 is switched, the mobile terminal 100 transmits a path establishing request and request for withdrawal directly to the previous multicast router 70b. In the present embodiment, the path establishing request and withdrawal request are transmitted to the substitute server 200a. Upon receipt of the requests from the mobile terminal 100, the substitute server 200a transmits a path establishing request and a request for withdrawal to the multicast router 70b. Thus, when the connected multicast router has been switched to another, a request for establishment of a path to the multicast group and a request for withdrawal from the same are transmitted to the previous multicast router using the substitute server 200a. Since the request for establishment of a path to the multicast group and the request for withdrawal from the same thus reach the multicast router from the downstream side of the multicast packet distribution, it is possible to faithfully obey the general rule of multicast communication that a request for establishment a path to a multicast group and a request for withdrawal from the same must be made by the party who requests the establishment of a path and withdrawal. This is advantageous in that high conformity with other protocols associated with multicast communication can be achieved.

Sixth Embodiment

Figure 48:
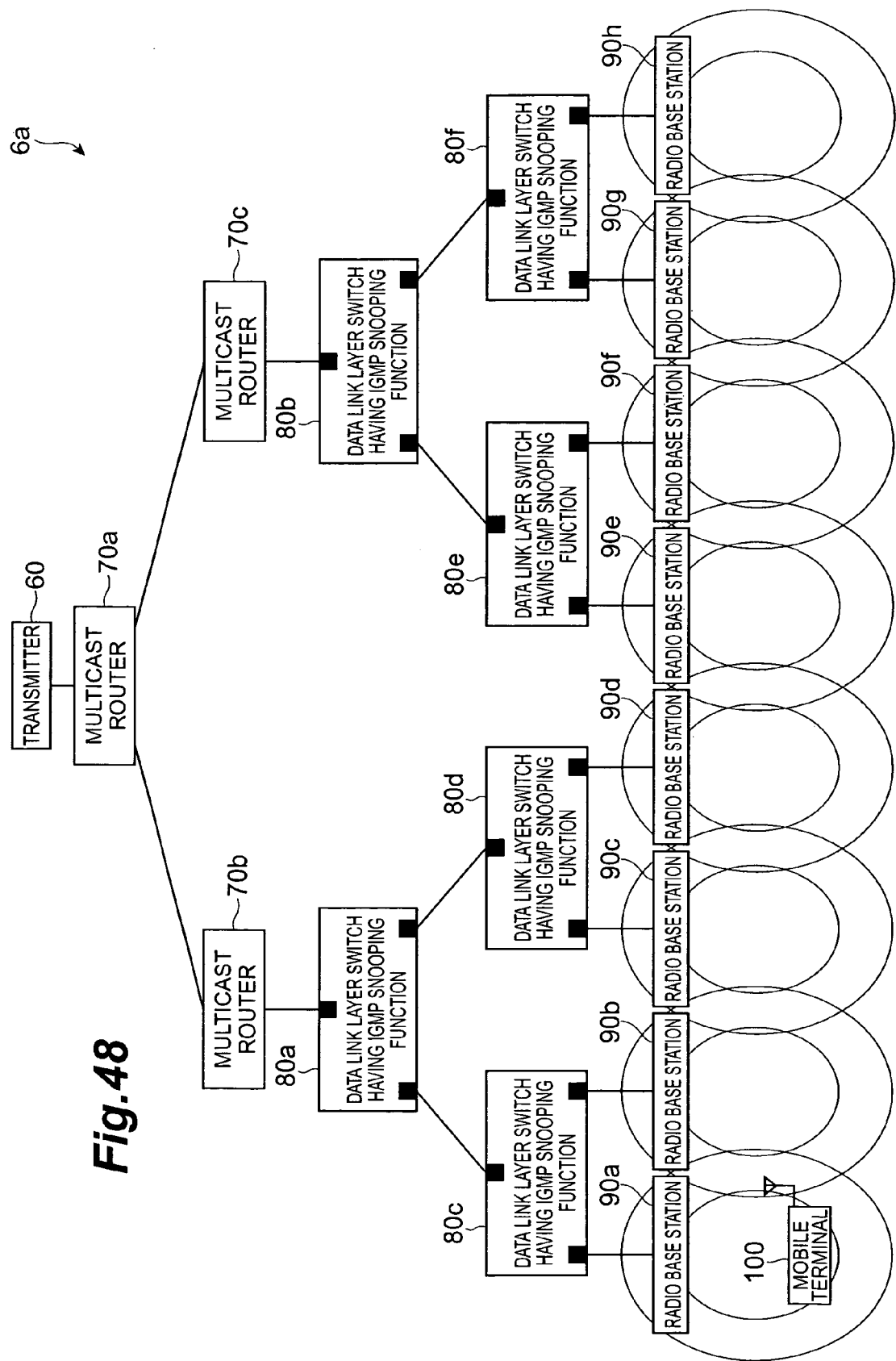
FIG. 48 is a view showing a configuration of a mobile communication system according to a sixth embodiment of the invention.

FIG. 48 is a conceptual view of a mobile communication system 6a according to a sixth embodiment of the invention. While only one data link layer switch is connected downstream of one multicast router in the above description, a plurality of data link layer switches may be connected in the form of a tree as shown in the drawing. Each data link layer switch independently performs processes associated with a multicast distribution management table of itself by examining the path establishing requests and the presence check requests as described above, and multicast packets can be thus distributed only to paths in which receivers exist.

As described above, in each of the above embodiments, when the mobile terminal 100 detects that the radio base station connected to the same has been switched, it examines whether the multicast router connected to the same has been also switched. When the connected multicast router has not changed, the mobile terminal 100 sequentially transmits a path establishing request, a withdrawal request, and another path establishing request to the multicast router of the network to which it is connected. When the multicast router connected to the same has changed, the mobile terminal transmits a path establishing request to the multicast router of the network to which it is connected and sequentially transmits a withdrawal request and a path establishing request to the multicast router of the previous network.

When the mobile terminal 100 detects the presence of a multicast router which has not established a multicast distribution path in a situation wherein the strength of connection with the radio base station connected to the terminal becomes lower than a predetermined threshold, it transmits a path establishing request to the multicast router. When the terminal moves to an area in which the strength of connection with the radio base station connected to the same becomes equal to or higher than the predetermined threshold again after the transmission, it transmits a withdrawal request to all multicast routers which have established a path excluding the multicast router to which it is connected.

Thus, after a movement of the mobile terminal 100, a delay time preceding the start of reception of multicast packets can be reduced; distribution of multicast packets to paths in which no multicast receiver exists can be stopped early; and unnecessary distribution of multicast packets can be reduced to prevent wasteful use of the band.

What is claimed is:

1. A mobile communication system comprising:
   a multicast router which receives an information signal addressed to a predetermined multicast group transmitted from a transmitter and which makes a copy of the received information signal and distributes it to a network downstream thereof when a mobile terminal belonging to the multicast group is present downstream of the multicast router;
   a data link layer switch which receives the information signal distributed from the multicast router and which distributes a copy of the received information signal only to a multicast distribution path in which a mobile terminal belonging to the multicast group is present;
   a radio base station which is connected to the data link layer switch and which distributes the information signal distributed by the data link layer switch to a radio network downstream thereof; and
   a mobile terminal which receives the information signal distributed by the radio base station,
   the mobile terminal comprising:
   station switching detection means which detects that the radio base station connected to the mobile terminal itself has been switched;
   router switching detection means which detects that the multicast router connected to the mobile terminal itself has been switched;
   establishment request transmission means which transmits a path establishing request for requesting at least the data link layer switch to establish a multicast distribution path for distributing the information signal to the radio base station connected to the mobile terminal itself;
   withdrawal request transmission means which transmits a withdrawal request for requesting at least the multicast router to withdraw from the multicast group to which the mobile terminal itself belongs; and
   transmission control means which transmits a first instruction signal for instructing the establishment request transmission means to transmit the path establishing request and a second instruction signal for instructing the withdrawal request transmission means to transmit the withdrawal request, depending on the detection by the station switching detection means, wherein:
   when the station switching detection means detects the switching of the radio base station but the router switching detection means does not detect the switching of the multicast router, the transmission control means sequentially outputs the first instruction signal, the second instruction signal, and the first instruction signal again; and
   when the station switching detection means detects the switching of the radio base station and the router switching detection means detects the switching of the multicast router, the transmission control means outputs the first instruction signal to transmit the path establishing request to a first multicast router which is the multicast router connected to the mobile terminal after the switching of the multicast router and thereafter outputs the second instruction signal to transmit the withdrawal request to a second multicast router which is the multicast router connected to the mobile terminal before the switching of the multicast router.

2. A mobile communication system according to claim 1, wherein the data link layer switch comprises:
   path establishing means which establishes a multicast distribution path in a path according to the path establishing request when the path establishing request is received; and
   distribution path reconfiguration means which distributes a presence check request to a network downstream thereof when the presence check request is received and reconfigures the multicast distribution path according to a path establishing request returned in response to the distribution.

3. A mobile terminal belonging to a multicast group and receiving an information signal transmitted on a multicast basis through a multicast router, a data link layer switch, and a radio base station, comprising:
   station switching detection means which detects that the radio base station connected to the mobile terminal itself has been switched;
   router switching detection means which detects that the multicast router connected to the mobile terminal itself has been switched;
   establishment request transmission means which transmits a path establishing request for requesting at least the data link layer switch to establish a multicast distribution path for distributing an information signal to the radio base station connected to the mobile terminal itself;
   withdrawal request transmission means which transmits a withdrawal request for requesting at least the multicast router to withdraw from the multicast group connected to the mobile terminal itself, to which the mobile terminal belongs; and
   transmission control means which transmits a first instruction signal for instructing the establishment request transmission means to transmit the path establishing request and a second instruction signal for instructing the withdrawal request transmission means to transmit the withdrawal request, in response to the, detection by the station switching detection means, wherein:

when the station switching detection means detects the switching of the radio base station but the router switching detection means does not detect the switching of the multicast router, the transmission control means sequentially outputs the first instruction signal, the second instruction signal, and the first instruction signal again; and when the station switching detection means detects the switching of the radio base station and the router switching detection means detects the switching of the multicast router, the transmission control means outputs the first instruction signal to transmit the path establishing request to a first multicast router which is the multicast router connected to the mobile terminal after the switching of the multicast router and thereafter outputs the second instruction signal to transmit the withdrawal request to a second multicast router which is the multicast router connected to the mobile terminal before the switching of the multicast router.

4. A mobile communication method for a mobile terminal belonging to a multicast group to receive an information signal transmitted on a multicast basis through a multicast router, a data link layer switch, and a radio base station, the method comprising:

a station switching detection step at which station switching detection means of the mobile terminal detects that the radio base station connected to the mobile terminal itself has been switched;

a router switching detection step at which router switching detection means of the mobile terminal detects that the multicast router connected to the mobile terminal itself has been switched;

a first updating step at which, when the station switching detection means detects the switching of the radio base station but the router switching detection means does not detect the switching of the multicast router, establishment request transmission means of the mobile terminal transmits a path establishing request for requesting the data link layer switch to establish a path for distributing an information signal to the radio base station connected to the mobile terminal itself, at which withdrawal request transmission means of the mobile terminal successively transmits a withdrawal request for requesting the multicast router to withdraw from the multicast group to which the mobile terminal itself belongs, and at which the establishment, request transmission means transmits the path establishing request; and a second updating step at which, when the station switching detection means detects the switching of the radio base station and the router switching detection means detects the switching of the multicast router, the establishment request means transmits the path establishing request to a first multicast router which is the multicast router connected to the mobile terminal after the switching of the multicast router, and the withdrawal request transmission means transmits the withdrawal request to a second multicast router which is the multicast router connected to the mobile terminal before the switching of the multicast router.

5. A mobile communication system comprising:
a multicast router which receives an information signal addressed to a predetermined multicast group transmitted from a transmitter and which makes a copy of the received information signal and distributes it to a network downstream thereof when a mobile terminal belonging to the multicast group is present downstream of the multicast router;

a data link layer switch which receives the information signal distributed by the multicast router and which distributes a copy of the received information signal only to a multicast distribution path in which a mobile terminal belonging to the multicast group is present;

a radio base station which is connected to the data link layer switch and which distributes the information signal distributed by the data link layer switch to a radio network downstream thereof; and a mobile terminal which receives the information signal distributed by the radio base station, the mobile terminal comprising:

station switching detection means which detects that the radio base station connected to the mobile terminal itself has been switched;

router switching detection means which detects that the multicast router connected to the mobile terminal itself has been switched;

establishment request transmission means which transmits a path establishing request for requesting at least the data link layer switch to establish a multicast distribution path for distributing the information signal to the radio base station connected to the mobile terminal itself;

withdrawal request transmission means which transmits a withdrawal request for requesting at least the multicast router to withdraw from the multicast group to which the mobile terminal itself belongs; and transmission control means which transmits a first instruction signal for instructing the establishment request transmission means to transmit the path establishing request and a second instruction signal for instructing the withdrawal request transmission means to transmit the withdrawal request, in response to the detection by the station switching detection means and the router switching detection means, wherein:

when the station switching detection means detects the switching of the radio base station but the router switching detection means does not detect the switching of the multicast router, the transmission control means sequentially outputs the first instruction signal, the second instruction signal, and the first instruction signal again; and when the station switching detection means detects the switching of the radio base station and the router switching detection means detects the switching of the multicast router, the transmission control means outputs the first instruction signal to transmit the path establishing request to a first multicast router which is the multicast router connected to the mobile terminal after the switching of the multicast router and thereafter sequentially outputs the second instruction signal and the first instruction signal to transmit the withdrawal request and the path establishing request to a second multicast router which is the multicast router connected to the mobile terminal before the switching of the multicast router.

6. A mobile communication system according to claim 5, wherein the mobile terminal further comprises:

connection strength determination means which determines whether the strength of connection with the radio base station connected to the mobile terminal itself is equal to or higher than a predetermined threshold;

router detection means which detects the presence of the multicast router connected to another radio base station adjacent to the radio base station; and recording means which records information identifying the multicast router which has established a multicast distribution path depending on the establishment request transmission means, wherein:

in cases where the connection strength determination means determines that the strength of connection with the radio base station being connected is lower than the predetermined threshold when the router detection means detects the presence of a multicast router which is not recorded in the recording means, the transmission control means outputs the first instruction signal to the multicast router which has been detected, and records information identifying the multicast router which has been detected in the recording means; and in cases where the connection strength determination means determines that the strength of connection with the radio base station being connected has become equal to or higher than the predetermined threshold again after recording the information identifying the multicast router which has been detected, the transmission control means outputs the second instruction signals to all multicast routers excluding the connected multicast router and deletes information identifying the multicast router to which the second instruction signal has been output from the recording means.

7. A mobile terminal belonging to a multicast group and receiving an information signal transmitted on a multicast basis through a multicast router, a data link layer switch, and a radio base station, comprising:

station switching detection means which detects that the radio base station connected to the mobile terminal itself has been switched;

router switching detection means which detects that the multicast router connected to the mobile terminal itself has been switched;

establishment request transmission means which transmits a path establishing request for requesting at least the data link layer switch to establish a multicast distribution path for distributing an information signal to the radio base station connected to the mobile terminal itself;

withdrawal request transmission means which transmits a withdrawal request for requesting at least the multicast router to withdraw from the multicast group connected to the mobile station itself, to which the mobile terminal belongs; and transmission control means which transmits a first instruction signal for instructing the establishment request transmission means to transmit the path establishing request and a second instruction signal for instructing the withdrawal request transmission means to transmit the withdrawal request, in response to the detection by the station switching detection means and the router switching detection means, wherein:

when the station switching detection means detects the switching of the radio base station but the router switching detection means does not detect the switching of the multicast router, the transmission control means sequentially outputs the first instruction signal, the second instruction signal, and the first instruction signal again; and when the station switching detection means detects the switching of the radio base station and the router switching detection means detects the switching of the multicast router, the transmission control means outputs the first instruction signal to transmit the path establishing request to a first multicast router which is the multicast router connected to the mobile terminal after the switching of the multicast router and thereafter sequentially outputs the second instruction signal and the first instruction signal to transmit the withdrawal request and the path establishing request to a second multicast router which is the multicast router connected to the mobile terminal before the switching of the multicast router.

8. A mobile terminal according to claim 7, further comprising:

connection strength determination means which determines whether the strength of connection with the radio base station connected to the mobile terminal itself is equal to or higher than a predetermined threshold;

router detection means which detects the presence of the multicast router connected to another radio base station adjacent to the radio base station; and recording means which records information identifying the multicast router which has established a multicast distribution path with the establishment request transmission means, wherein:

in cases where the connection strength determination means determines that the strength of connection with the radio base station being connected is lower than the predetermined threshold when the router detection means detects the presence of a multicast router which is not recorded in the recording means, the transmission control means outputs the first instruction signal to the multicast router which has been detected, and records information identifying the multicast router which has been detected in the recording means; and in cases where the connection strength determination means determines that the strength of connection with the radio base station being connected has become equal to or higher than the predetermined threshold again after recording the information identifying the multicast router which has been detected, the transmission control means outputs the second instruction signals to all multicast routers excluding the connected multicast router and deletes information identifying the multicast router to which the second instruction signal has been output from the recording means.

9. A mobile communication method for a mobile terminal belonging to a multicast group to receive an information signal transmitted on a multicast basis through a multicast router, a data link layer switch, and a radio base station, the method comprising:

a station switching detection step at which station switching detection means of the mobile terminal detects that the radio base station connected to the mobile terminal itself has been switched;

a router switching detection step at which router switching detection means of the mobile terminal detects that the multicast router connected to the mobile terminal itself has been switched;

a first updating step at which, when the station switching detection means detects the switching of the radio base station but the router switching detection means does not detect the switching of the multicast router, establishment request transmission means of the mobile terminal transmits a path establishing request for requesting the data link layer switch to establish a path for distributing an information signal to the radio base station connected to the mobile terminal itself, at which withdrawal request transmission means of the mobile terminal successively transmits a withdrawal request for requesting the multicast router to withdraw from the multicast group to which the mobile terminal itself belongs, and at which the establishment request transmission means transmits the path establishing request; and a second updating step at which, when the station switching detection means detects the switching of the radio base station and the router switching detection means detects the switching of the multicast router, the establishment request means transmits the path establishing request to a first multicast router which is the multicast router connected to the mobile terminal after the switching of the multicast router, at which the withdrawal request transmission means successively transmits the withdrawal request to a second multicast router which is the multicast router connected to the mobile terminal before the switching of the multicast router, and at which the establishment request transmission means further transmits the path establishing request to the second multicast router thereafter.

10. A mobile communication method according to claim 9, further comprising:

a connection strength determination step at which connection strength determination means of the mobile terminal determines whether the strength of connection with the radio base station connected to the mobile terminal itself is equal to or higher than a predetermined threshold;

a router detection step at which router detection means of the mobile terminal detects the presence of the multicast routers connected to the radio base station and another radio base station adjacent to the radio base station;

a recording step at which recording means of the mobile terminal records information identifying the multicast router which has established a multicast distribution path with the establishment request transmission means;

a third updating step at which, in cases where the connection strength determination step determines that the strength of connection with the radio base station being connected is lower than the predetermined threshold when the router detection step detects the presence of a multicast router which is not recorded in the recording means, the transmission control means outputs the first instruction signal to the multicast router which has been detected and records information identifying the multicast router which has been detected in the recording means; and a fourth updating step at which, in cases where the connection strength determination step determines that the strength of connection with the radio base station being connected has become equal to or higher than the predetermined threshold again after recording the information identifying the multicast router which has been detected, the transmission control means outputs the second instruction signals to all multicast routers excluding the connected multicast router and deletes information identifying the multicast router to which the second instruction signal has been output from the recording means.

* * * * *